(12) United States Patent
Karr et al.

(10) Patent No.: US 7,936,271 B2
(45) Date of Patent: May 3, 2011

(54) ANTI-TAMPER CARGO CONTAINER LOCATOR SYSTEM

(75) Inventors: Lawrence J. Karr, Santa Monica, CA (US); Kevin C. Murphy, Los Angeles, CA (US); Paul D. DeRocco, Pacific Palisades, CA (US)

(73) Assignee: Roundtrip LLC, Los Angeles, CA (US)

( * ) Notice: Subject to any disclaimer, the term of this patent is extended or adjusted under 35 U.S.C. 154(b) by 365 days.

(21) Appl. No.: 12/324,615

(22) Filed: Nov. 26, 2008

(65) Prior Publication Data

US 2009/0201152 A1 Aug. 13, 2009

Related U.S. Application Data

(60) Provisional application No. 60/990,277, filed on Nov. 26, 2007.

(51) Int. Cl.
*G08B 13/14* (2006.01)
(52) U.S. Cl. ............ 340/572.4; 340/539.13; 340/539.16
(58) Field of Classification Search .............. 340/539.1, 340/539.11, 539.13, 539.16, 539.17, 572.1, 340/572.4, 572.7, 572.8, 10.33; 342/42; 235/375, 385, 492
See application file for complete search history.

(56) References Cited

U.S. PATENT DOCUMENTS

| | | | |
|---|---|---|---|
| 5,418,537 A | 5/1995 | Bird | 342/357 |
| 5,418,736 A | 5/1995 | Widigen et al. | 364/786 |
| 5,528,232 A | 6/1996 | Verma et al. | 340/825.49 |
| 5,565,858 A * | 10/1996 | Guthrie | 340/10.33 |
| 5,576,716 A | 11/1996 | Sadler | 342/357 |
| 5,774,876 A * | 6/1998 | Woolley et al. | 705/28 |
| 5,804,810 A * | 9/1998 | Woolley et al. | 235/492 |
| 5,892,441 A * | 4/1999 | Woolley et al. | 340/539.26 |
| 5,959,568 A * | 9/1999 | Woolley | 342/42 |
| 6,946,956 B2 | 9/2005 | Hayashi et al. | 340/539.13 |
| 7,046,657 B2 | 5/2006 | Harrington et al. | 370/350 |
| 7,130,293 B2 | 10/2006 | Hanada et al. | 370/342 |
| 7,269,427 B2 | 9/2007 | Hoctor et al. | 455/456.2 |
| 7,499,711 B2 | 3/2009 | Hoctor et al. | 455/456.1 |
| 7,672,690 B2 | 3/2010 | Hsu et al. | 455/552.1 |
| 2003/0212602 A1 | 11/2003 | Schaller | 705/22 |

(Continued)

FOREIGN PATENT DOCUMENTS

KR 10-2007-0057601 7/2007

OTHER PUBLICATIONS

International Search Report, PCT/US2009/056626, dated Jun. 14, 2010.

(Continued)

*Primary Examiner* — Van T. Trieu
(74) *Attorney, Agent, or Firm* — Merchant & Gould

(57) ABSTRACT

The present disclosure relates to location and communication systems that can be utilized for locating cargo containers using tags with a radio communication subsystem in the form of a transponder or micro-transponder. Each cargo container tag (CCT) is capable of communicating with either other cargo container tags or a base-station (BS) locator devices. The tags can be arranged for tracking the opening and closing of doors on individual cargo containers using radio communication methods. Lost cargo container can be located using communications from a base station and the cargo container tags. CCT devices can also detect intrusions and/or tampering with cargo containers, and store a variety of collected data for later retrieval.

73 Claims, 40 Drawing Sheets

U.S. PATENT DOCUMENTS

| | | | |
|---|---|---|---|
| 2005/0283411 A1 | 12/2005 | Rhea | 705/28 |
| 2006/0055552 A1 | 3/2006 | Chung et al. | 340/686.1 |
| 2006/0173756 A1 | 8/2006 | Benight | 705/28 |
| 2006/0282340 A1 | 12/2006 | Morand et al. | 705/28 |
| 2007/0001809 A1 | 1/2007 | Kodukula et al. | 340/10.1 |
| 2007/0069895 A1 | 3/2007 | Koh | 340/572.1 |
| 2007/0085677 A1 | 4/2007 | Neff et al. | 340/539.22 |
| 2007/0126583 A1 | 6/2007 | Maniwa et al. | 340/572.2 |
| 2007/0291690 A1* | 12/2007 | Twitchell, Jr. | 370/328 |
| 2010/0066531 A1 | 3/2010 | Karr | 340/539.1 |

OTHER PUBLICATIONS

International Search Report, PCT/US2008/085017, dated Mar. 13, 2009.

* cited by examiner

430 →

440 →

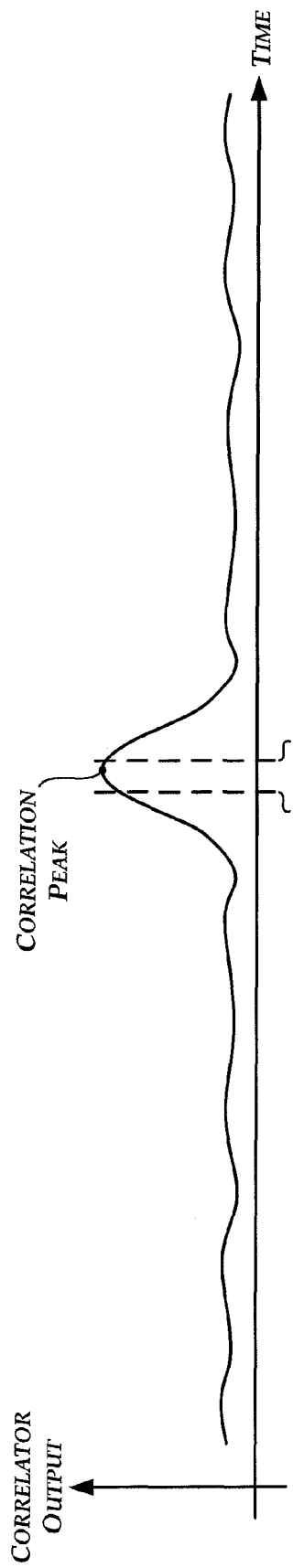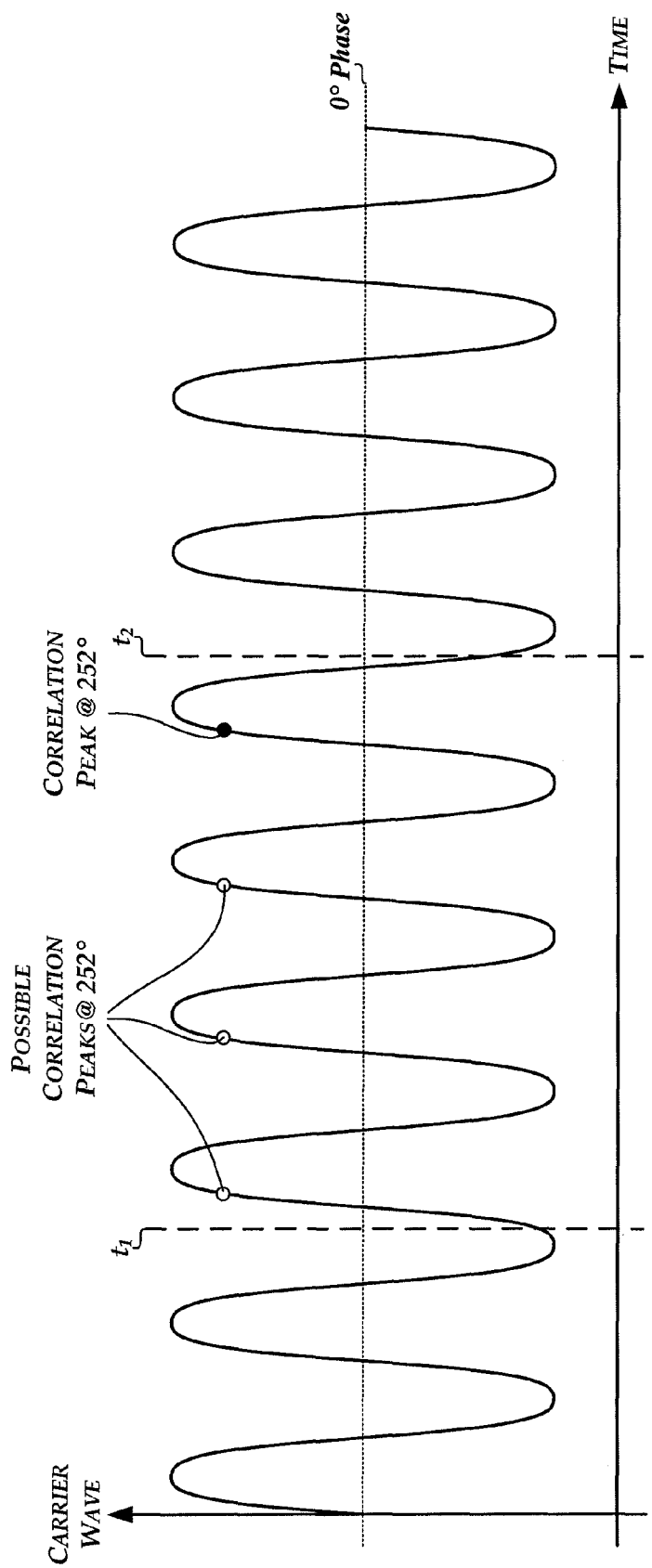

| Locator Number | Operational Status | Physical Location | Accessible Tags | Group Assignments |
|---|---|---|---|---|
| Locator 1 | OK | Position 1 | Tag 1, Tag 2, Tag 3 ... Tag N | Group 1, Group 2, Group 3 ... Group M |
| Locator 2 | OK | Position 2 | Tag 2 | Group 1 |
| Locator 3 | Not Responding | *Position 3* | Unknown | Group 1, Group 3, Group 4 |
| Locator 4 | OK | Position 4 | Tag 1, Tag 2, Tag 5 | Group 1, Group 2 |
| ... | ... | ... | ... | ... |
| Locator Y | OK | Position Y | Tag 1, Tag 2, Tag 3 ... Tag N | Group 1, Group 2, Group 3 ... Group M |

*FIG. 19C*

| TAG NUMBER | OPERATIONAL STATUS | PHYSICAL LOCATION | GROUP ASSIGNMENTS |
|---|---|---|---|
| TAG 1 | OK | LOCATION 1 | GROUP 2 |
| TAG 2 | NOT RESPONDING | *LOCATION 2* | GROUP 1, GROUP 2, GROUP 3 ... GROUP M |
| TAG 3 | OK | UNKNOWN | NONE |
| TAG 4 | OK | LOCATION 4 | GROUP 1, GROUP 3 |
| ... | ... | ... | ... |
| TAG N | OK | LOCATION Y | GROUP 1, GROUP 2, GROUP 3 ... GROUP M |

FIG. 19D

ANTI-TAMPER CARGO CONTAINER LOCATOR SYSTEM

RELATED APPLICATIONS

This patent application claims the benefit under 35 USC §119(e) of U.S. Provisional Patent Application No. 60/990,277, titled "ANTI-TAMPER CARGO CONTAINER LOCATOR SYSTEM, filed Nov. 26, 2007, and also claims the benefit under 35 USC §120 of U.S. patent application Ser. No. 12/210,115, titled "LOCATOR INVENTORY SYSTEM", which was filed Sep. 12, 2008 now U.S. Pat. No. 7,864,045, both of which are hereby incorporated by reference.

FIELD OF THE INVENTION

The present disclosure relates generally to location and communication systems for locating cargo containers and other objects. More particularly the disclosure relates to the use of cargo containers that are tagged with transponders or micro-transponder devices. Each cargo container tag is capable of communicating with either other cargo container tags or base-station locator devices. The cargo container tags can be arranged for tracking the opening and closing of doors on individual cargo containers, and also tracking the movement of cargo containers, using radio communication methods (e.g., RF communications) as will be described.

BACKGROUND

Some methods for locating an object are known in the art. A missing vehicle locator system is described in U.S. Pat. No. 5,418,736 issued to Bird. The vehicle locator system uses one or more GPS systems in conjunction with a GPS antenna, a receiver/transmitter, a telephone with associated antennas, and a modem mounted in a vehicle whose position is to be monitored. A paging request is issued and received by a paging responder in the vehicle. The paging request causes the modem to interrogate the GPS receiver to determine the current position of the vehicle. The current position of the vehicle is transmitted via a cellular telephone link to notify a vehicle location service center of the current location of the vehicle. Other known location determination techniques include the use of a Loran or a Glonass satellite based system.

Another object location system is described in U.S. Pat. No. 5,576,716 to Sadler for locating lost or stolen property. This location system includes a GPS module, a microcomputer, a modem, and a telephone, all of which must be installed in the vehicle. The system described regularly and automatically computes the position of the property for transmission via the phone link to a central receiver/transmission station.

Low power transmissions are subject to signal corruption due to noise, static, and signal interference. Extracting information from a signal in the presence of such interference and noise is very difficult when the information signal is of the same order of magnitude as the noise sources. The presently described invention identifies various noise problems from the conventional solutions and provides a new and novel system, method, and apparatus that is arranged to extract signals from a transmission using very low power in a small scale object location system.

BRIEF DESCRIPTION OF THE DRAWINGS

Non-limiting and non-exhaustive embodiments are described with reference to the following drawings:

FIGS. 10C-10D are diagrams illustrating example correlation peaks for an example receiver;

FIGS. 19C-19D illustrate example data structures for storing information about locators and tags.

DETAILED DESCRIPTION

Figure 1A:
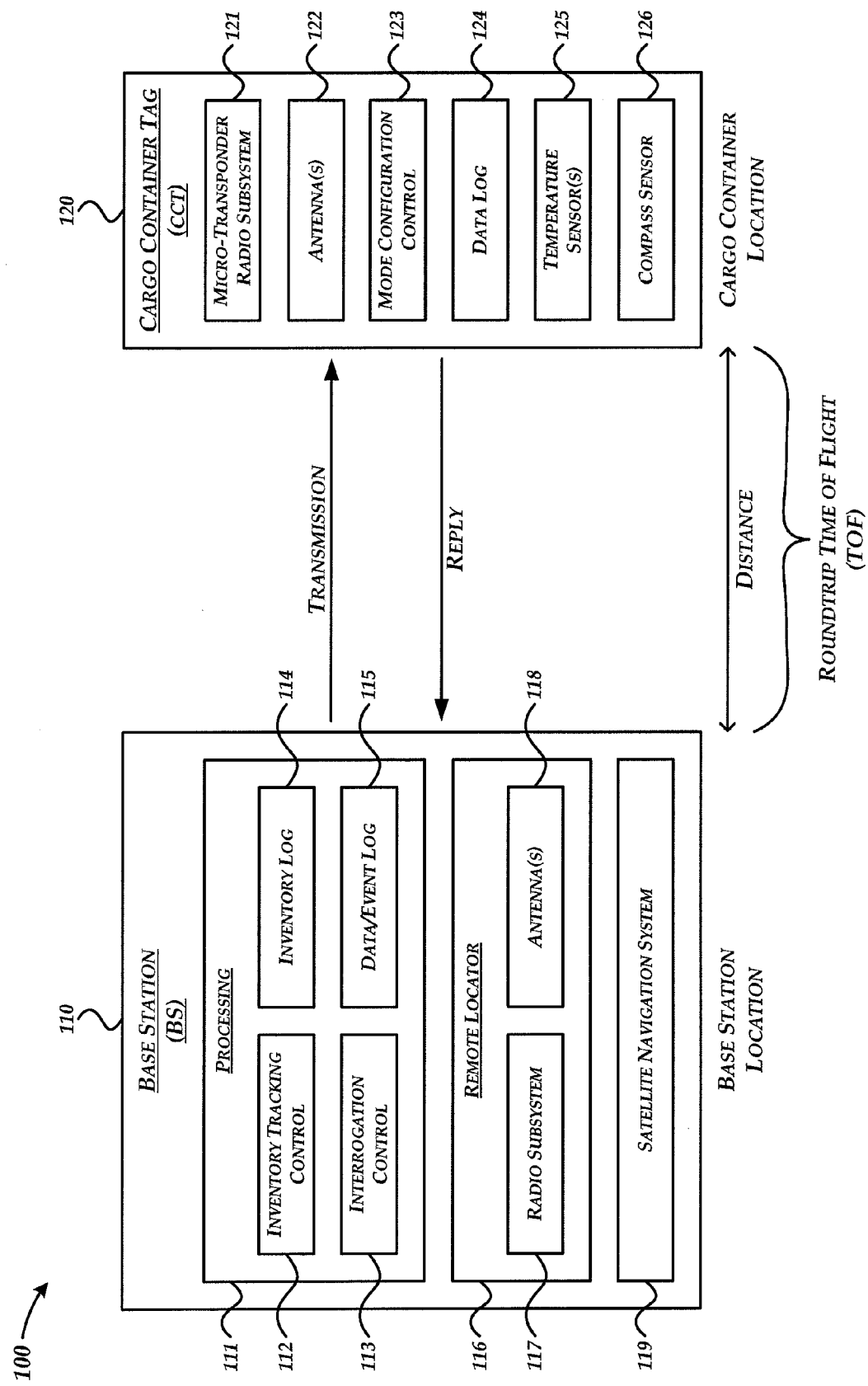
FIGS. 1A-1D are block diagrams illustrating example systems that are arranged for operation as an anti-tamper cargo container locator system.

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

Briefly stated, the present disclosure relates to location and communication systems that can be utilized for locating cargo containers using tags with a radio communication subsystem in the form of a transponder or micro-transponder. Each cargo container tag (CCT) is capable of communicating with either other cargo container tags or base-station (BS) locator devices. The tags can be arranged for tracking the opening and closing of doors on individual cargo containers using radio communication methods. Lost cargo container can be located using communications from a base station and the cargo container tags. CCT devices can also detect intrusions and/or tampering with cargo containers, and store a variety of collected data for later retrieval.

While a single tag may be sufficient to allow the tracking or finding of cargo containers, the presence of two tags can be used as a basis for intrusion and tampering detection by permitting the tags to communicate with each other using internal and external antennas. One example approach to detecting entry to a container is by mounting the end tag on the door, as opposed to the rear end, so that any motion in that door alters the distance between the two tags. However, the end of the standard container actually has two doors, either of which may be opened, so simple distance measurement may not be enough.

Two CCT devices can be used on a single cargo container to improve reliability of sensing and locating cargo containers, or to provide an internal measurement mechanism for detecting the opening or closing or doors in the cargo container. In one example, a first CCT is placed near the inner edge at the top of one of the doors, and a second CCT tag is placed on a side wall in the cargo container. The tags can be activated periodically (e.g., every few seconds) to communicate with one another and to act as short range locators that determine a distance based on the round-trip time of flight (TOF) from transmission and reception of a reply. The distance between the tags will necessarily increase whenever that door is opened. The opening or closing events can be observed and logged by recording the distance between the tags along with some sort of time or date stamp. This combined with the rather accurate real time clocks in each CCT and the storage in both tags of all events, can yield a redundant high reliability record of all openings and closings of cargo containers. Antennas can be arranged to radiate energy through mechanical mechanisms in the cargo container such as a bolt, rivet or other fastener mechanism that mounts the CCT to a wall of the cargo container, or through slot antennas cut into the metal walls of the container.

Each CCT device can also be arranged to utilize multiple antennas. For example, one antenna can be an antenna that propagates signals outside of the cargo container such as through a bolt, while another antenna can be arranged to propagate signals inside of the cargo container. Since cargo containers are typically arranged as metal boxes, the walls of the cargo container form a Faraday cage that forms a shield between the tags. In other words, the signal path between the tags will be greatly attenuated in magnitude when the door the cargo container is closed. However, when the cargo-container doors are even slightly opened the signal paths increase dramatically (about 20 dB) and the tags can easily determine that the door has opened. The same principal applies to situations where the cargo container is opened by a hole cut in one of the walls. An intrusion alarm can thus be designed by monitoring signals for Doppler and Multi-path signal reflections, capitalizing on the Faraday cage characteristics of the cargo container. The same principal applies to ventilated metal containers, which should still have enough attenuation to work since the ventilation is through narrow slots.

Many cargo containers do not have all-metal floors, which potentially makes them less satisfactory Faraday cages. However, a cargo container that is resting on the ground is a satisfactory Faraday cage since UHF signals do not propagate very well through pavement and/or the underlying earth. Moreover, cargo containers that are not laying at rest on some form of earth are typically stacked on either another cargo container's metal roof, or on other conductive surfaces such as the hold or deck of a ship. Thus, when a cargo container is in all locations other than placed on a truck chassis, the Faraday cage model should hold true and opening and closing of the cargo container can be detected by the CCT devices. The event of opening and closing a stationary cargo container can be detected using the faraday cage model as previously described. Moreover, in instances where the cargo container is being lifted or moved (e.g., by a crane in a cargo shipping yard, on a truck, on a railroad car, etc.), the event can be detected since the signal profile (or signature) of a door open/closed event on the ground will have a different signal profile (e.g., frequency spectrum/amplitude profile) from a lifting or moving of the container.

Each CCT device can also include a compass sensor. One compass sensor can be used to detect modulations in the magnetic field observed by CCT device affixed to the door, while another compass sensor can be used to detect modulations in the magnetic field observed by the CCT device affixed to the side of the container. For some situations where the door is closed, the compass sensors should have substantially different magnetic field effects. However, in situations where the door is open, the compass sensors should detect similar magnetic field effects. The compass sensor can also be used to assist in tracking the movement of the cargo container through a path of travel by activating a tracking mode in the cargo container tag and periodically recording compass readings while the tracking mode is active. The tracking mode can also be selectively activated based on a detected conditions such as movement of the cargo container (elevation above the ground, placing on the ground, placing on a railcar, placing on another cargo container, etc.), opening of the cargo container door, closing of the cargo container door, etc.

Each CCT device can also include a temperature sensor. In some examples, the temperature sensor can be used to detect or alarm a potential fire in a cargo container. In some other examples, the temperature sensor can be used to detect a failing refrigerator cargo container when the temperature rises above some predetermined threshold. In other examples, the temperature sensor can be used to detect a condition that may harm the cargo such as perishable foods in excessive heat or cold conditions. Humidity sensors can also be used for similar purposes such as to prevent excessive moisture or dew that may damage dry goods, produce, or other goods. Motion sensors can be used to detect movement inside the cargo container such as from a stowaway, loose cargo, or vermin. Light sensors can be used to detect light inside the cargo container such as from a door opening, a hole, or from a stowaway activating a light source.

The initial phase of transmitter in the CCT device is matched or at least tracks the received phase of signals received from a transmission by the BS device, plus any correction for time and frequency offset.

As will be described, the CCT device (also referred to as a transponder) and the BS device (also referred to as a locator) each include a receiver and a transmitter. The communication signals from the transmitters are encoded with a unique ID code. In some examples, a group ID code can be used so that a base station (BS) can address multiple CCT devices at the same time such as might be desirable in an inventory tracking system. The communication signal consists of a sequence of encoded transmissions, where each sequence is arranged to provide a portion of clock synchronization and calibration information. Each receiver validates the ID code for the transmission, and decodes information. The frequency, phase, and starting time of the coded transmission sequence is determined by the transmission sequence itself such that clock recovery can be performed without additional information.

Frequency and phase information in the CCT device is initially recovered from one portion of the transmission from the BS device, and further refined using a bootstrapping process. Timing location within the frame (e.g., coarse timing) is recovered in another portion of the transmission from the BS device. After the timing, phase and frequency are recovered, data reception can be scheduled with a degree of certainty. The data is extracted and a reply message is transmitted from the CCT device back to the BS device, where similar signal processing functions are performed. The carefully corrected round-trip time of flight (TOF) and the recovered phase of the transmission sequence is used to identify distance between the CCT device and the BS device.

The presently described systems have the ability to identify location of a CCT device with two or more BS devices utilizing an asymmetric transmission system. The signals captured by the CCT device will typically not be aligned in time with the start and end of a complete pattern in the sequence (e.g., a 2047 chip sequence). One or more of the BS devices are arranged to transmit repeated patterns over time in the sequence. The CCT device is arranged to cyclically capture a complete pattern in the sequence, even though the captured pattern may not be rotated in time relative to the start and end of a complete pattern. A circular correlator can be used to evaluate the captured signals such that the captured signals are properly identified by the CCT device, despite the rotation status of the pattern. Since the CCT device does not have a priori knowledge of the timing related to transmission and reception from the BS device, circular correlations of the received transmissions are used by the CCT device to determine the fine and coarse timing. A circular correlation is a correlator that operates on a sequence of fixed length, where the sequence may be circularly shifted in time such that the beginning of the original sequence may be received in the shifted sequence after the end of the original sequence. While a general correlator may not give valid timing information, the circular correlation will provide valid timing information when the captured signals are not aligned in time with the start and end of a complete pattern.

The presently described asymmetric transmission system can be configured such that the CCT device receives a relatively high power transmission of a structured signal from the BS device, while the reply or acknowledgement transmission from the CCT device to the BS device is a very low power transmission. An example CCT device is configured to operate in a very low power "inactive" mode or "sleep mode", where the CCT device "activates" or "wake-ups" for brief intervals to listen for the transmission from a BS device. The CCT device correlates each piece of its received structured signals to determine if these signals are coded with an identification code (ID Code) that is specifically associated with the CCT device. The CCT device also determines the precise frequency, timing, phase, and cadence for which a reply transmission can be transmitted back to the BS device from the received structured signals. The reply transmission that is transmitted from the CCT device to the BS device is a very low power transmission of short duration (a short structured signal) such that significant battery life is conserved. Although the reply transmission is a very low power transmission, the BS device is arranged to utilize an integration and circular correlation technique to increase the signal-to-noise level of the captured reply transmission.

In the presently described systems, a reply transmission signal is transmitted back to the BS device from a CCT device, where the CCT device synthesizes timing, frequency, phase, and cadence for the reply transmission from signals that are received by the CCT device from the BS device. The frequency of the reply transmission from the CCT device differs from the original frequency from the BS device's transmission by a Doppler shift (ignoring other noise and minor error sources). As such, the BS device can predict the reply transmission frequency with a very small margin of error. The potential uncertainty of the reply transmission frequency is small enough so that the phase rotation over several tens of transmission sequences is much less than one turn (one phase rotation through 360 degrees). This allows the BS device to sample the reply transmission and add (or integrate); either in the analog domain or the digital domain, the respective samples from reply transmission sequence. Since noise sums as a square root and signal sums linearly, the signal-to-noise ratio for the captured signal is increased, allowing reception of a much lower level signal than would otherwise be the case without the use of exhaustive computation.

The CCT device replies with a transmitted phase which is either matched to the phase of the received locator signal (a zero degree phase difference), or additively related to the phase of the received locator signal. The BS device is therefore able to precisely determine the round trip phase shift, and determine distance in terms of carrier cycles. For example, as illustrated in FIG. 10C a BS device receives a reply transmission from an CCT device and identifies a correlation peak within a time interval of $t_1$ to $t_2$. The time interval ($t_1$ to $t_2$) exactly corresponds to one cycle of the carrier wave shown in FIG. 10D. For example, a 915 MHz carrier wave has a period of approximately 1.093 nano-seconds. The phase of the carrier wave at the time of a correlation peak in this example corresponds to about 70% of the time interval ($t_1$ to $t_2$) or about 252 degrees. This phase determination becomes useful when the signal-to-noise ratios at the CCT device and at the BS device are sufficiently great to allow the selection of a particular carrier cycle. Since a carrier cycle at 915 MHz for instance is a distance of about 33 centimeters, the distance determination without carrier phase identification must be accurate to about 33 centimeters to allow selection of a particular carrier phase. For example, 100 cycles of a 915 MHz carrier wave corresponds to a distance of about 32.8 meters). Distance measurements can then be refined in accuracy to within a small fraction of a carrier cycle (a centimeter or two) using the phase information. For example, a phase of 252 degrees corresponds to a distance of about 23 centimeters for a carrier frequency of 915 MHz. Thus, the described system has two accuracy states, one for the number of cycles that occur before a correlation peak is found, and one for the precise phase of the carrier signal when the correlation peak is detected. For example, 100 cycles of a 915 MHz carrier wave with a detected phase of 252 degrees corresponds to about 33 meters of distance. When multiple independent distance estimates resulting from interrogations by several base stations are consolidated together, the distance estimates can be improved often to the point where the phase navigating, interferometric based measurements becomes possible with exceptional accuracy.

These and other features will become apparent from the disclosure that follows herein.

Example System Diagrams

FIGS. 1A-1D are block diagrams illustrating example systems that are arranged for operation as an anti-tamper cargo container locator system arranged in accordance with at least some features of the present disclosure.

FIG. 1A illustrates a base station (BS) device (110) that is arranged in communication with a cargo container tag (CCT) device (120). BS device 110 includes a processing block (111), a remote locator block (116), and a satellite navigation system block (119). CCT device 120 is arranged as a cooperate locator tag that operates in any number of operating modes to communicate with BS device 110 via a wireless radio communication.

Processing block 111 can include any variety of application level features via either hardware or software based solutions. In one example, processing block 111 includes an inventory tracking control block (112) so that the processing system can track the location of cargo containers such as through an inventory log (114). In another example, processing block 111 includes an interrogation control block (113) so that the processing system can interrogate CCT devices for additional information such as may be stored in a data/event log (115). These examples are merely provided as example applications, but any other application may be equally applicable without departing from the spirit of the present disclosure.

Remote locator block 116 includes a radio subsystem block (117) that is arranged for transmitting and receiving radio communication signals via one or more antennas (118). In some examples, the functions of the remote locator block (116) and the processor block (111) can be combined together in a single integrated block. In other examples, the functions of the remote locator block (116) the processor block (111) are independent of one another.

An optional satellite navigation system (119) can also be included in the BS device (110) so that absolute locations of cargo containers can be determined. For example, the processing block (111) can be arranged to collaborate with the satellite navigation system (119) to determine the absolute coordinates of the cargo container and store the data in the inventory log (114). In some other examples, the processing block (111) can be arranged to store the absolute coordinates of the base-station or the cargo-container when an event (e.g., door opened, door closed, etc.) is detected.

The CCT device (120) can include a micro-transponder radio subsystem block (121), one or more antennas (122), a mode configuration control block (123), a data log block (124), one or more temperature or environmental sensor (125) devices, and a compass sensor (126). The mode configuration control block (123) can be used to dynamically configure the CCT device (120) into any variety of operating modes such as for programming purposes, receiver and transmitter transmission methods, data reporting functions, to name a few. The radio subsystem block (121) is arranged to cooperate with the antenna (122) so that communications between the BS device (110) and the CCT device (120) are facilitated.

The temperature sensor (125) and/or any other environmental sensors such as a humidity sensor, a fire sensor, a dewpoint sensor can be used to detect environmental conditional within the cargo container to prevent spoilage of food products (e.g., grains, fruits, vegetables, meats, etc.) and/or destruction of property through heat, cold or moisture. The compass sensor (126) can be used to detect modulations in the magnetic field observed by CCT at its affixed location in the cargo container as previously discussed.

The data log block (124) can be used by the CCT device to store measurements from any of the sensors (compass, temperature, humidity, etc.) in the cargo container tag, distance measurements, as well as characteristics signatures for signal profiles such as for a door open and door closed detection, and other data logging operations for events.

The BS device (110) transmits a signal to a CCT device (120), which transmits a responsive reply transmission. The BS device (110) is arranged to calculate a distance between the BS and the CCT using the round-trip time-of-flight (TOF) between the transmission and the receipt of a reply. The absolute geographic position of the BS device (110) can be determined using satellite navigation information, while the position of the CCT device (120) relative to the BS device (110) can be determined from the round-trip TOF information (depending on the number of antennas utilized in the BS and the CCT).

As will be described, the BS device and the CCT device each include a receiver and a transmitter. The communication signals from the transmitters are encoded with a unique ID code. The communication signal consists of a sequence of encoded transmissions, where each sequence is arranged to provide a portion of clock synchronization and calibration information. Each receiver validates the ID code for the transmission, and decodes information. The frequency, phase, and starting time of the coded transmission sequence is determined by the transmission sequence itself such that clock recovery can be performed without additional information. The CCT device can be affixed to or embedded within the cargo container as may be required.

The satellite navigation system (119) can be of any variety such as GPS, Loran, Glonass, and Galileo based satellite navigation systems. The system can be provided as a single chip solution, a chip set, or integrated together with one or more other functional blocks as may be desired.

The processing block (111) can be comprised of any variety of processor including processor cores or integrated circuits. Example processors include any one of a micro-processor, a micro-controller, a complex instruction set computer (CISC) processor, a reduced instruction set computer (RISC) processor, an application specific integrated circuit (ASIC), or a programmable logic device (PLD).

The necessary software and/or firmware for the processor block (111) can be provided in a memory circuit (not shown) or some other storage medium (e.g., hard disk drive, optical disk, etc.). Example memory circuits include random access memory (RAM) circuits, dynamic random access memory (DRAM) circuits of all varieties and static random access memory (SRAM) circuits, to name a few. Some example memory circuits are read-only memory (ROM) circuits, while others can be programmable read-only memory circuits (PROM) such as EPROMs, EEPROMS, and other non-volatile memories (NVM) such as flash-type memories and other varieties.

The BS device (110) may also include any variety of user interface means (not shown) such as user inputs from a keyboard, keypad, joystick, button, a microphone, or another reasonable user input means. Also, the user interface means may include any variety of output means such as an audio device, a display device, or any other reasonable output means.

Figure 1B:
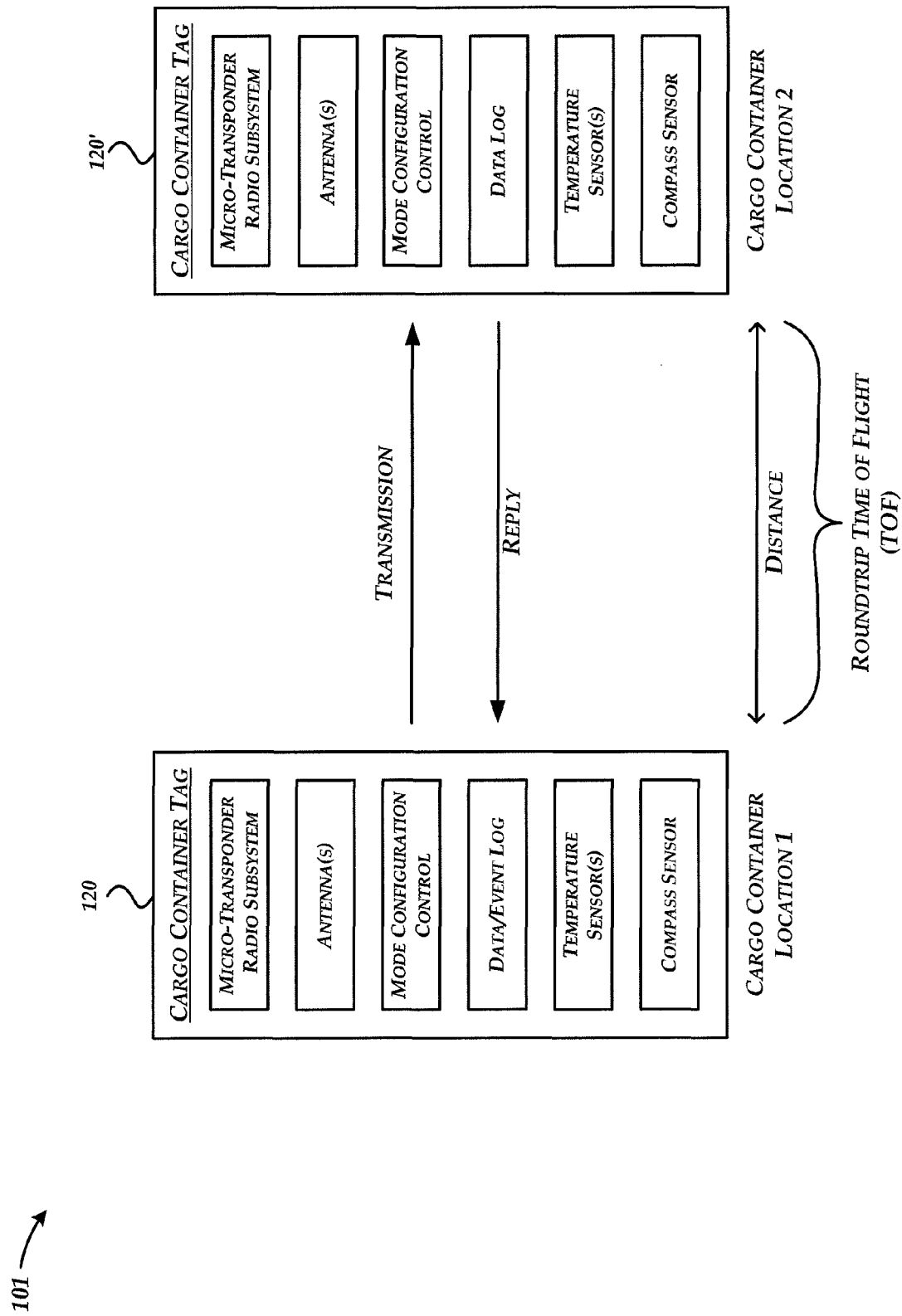

FIG. 1B illustrates a system (101) where two CCT devices (120, 120') can be configured to communicate with one another within a cargo container. One of the CCT devices will operate similar to the BS device (110) of FIG. 1A, where a transmission is sent to the other CCT device, and a reply is then processed to determine a round-trip TOF distance measurement.

Figure 1C:
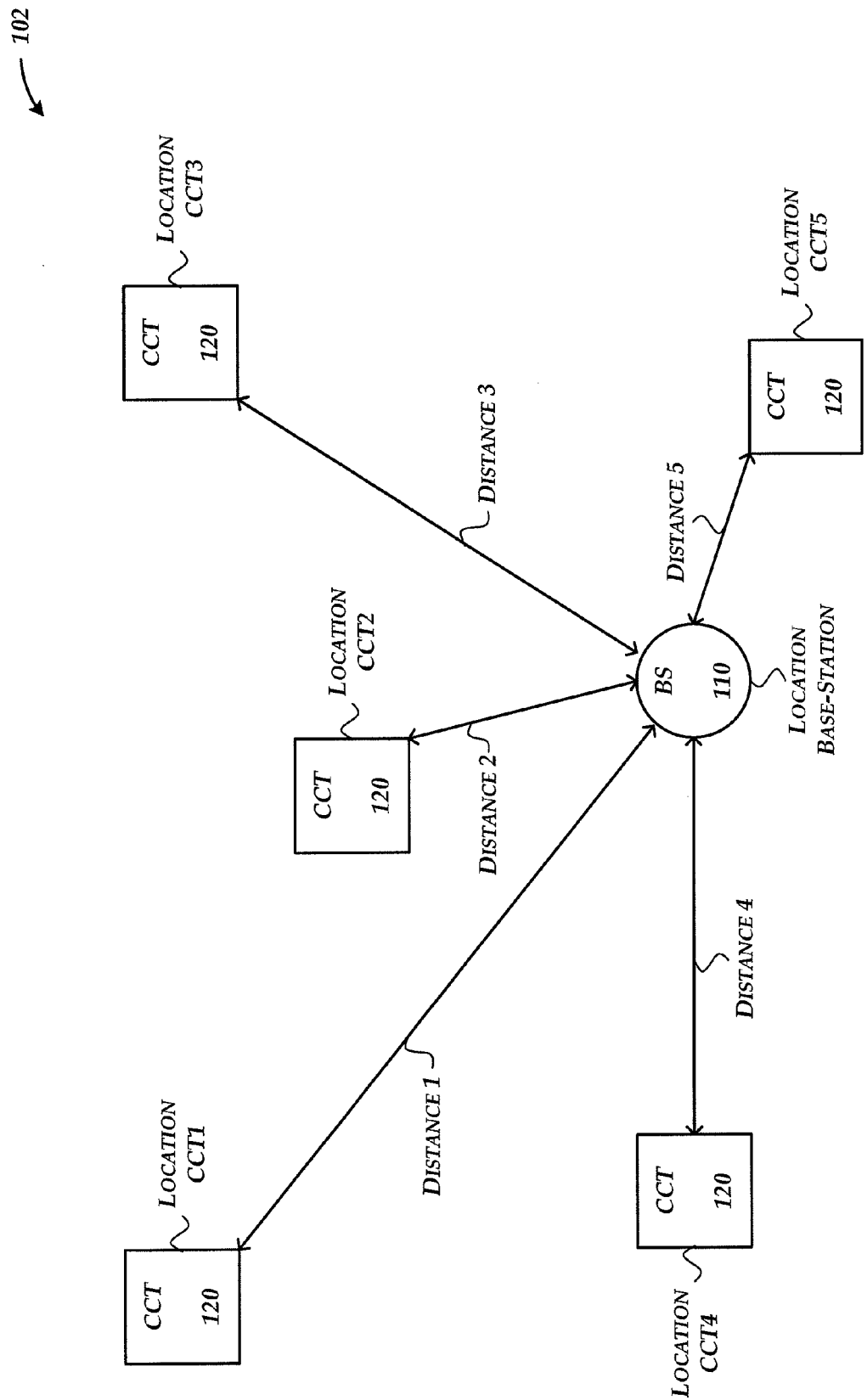

FIG. 1C illustrates a system (102) where any number of CCT devices (120) can be arranged to communicate with a common BS device (110) for tracking and data logging/security purposes. The multiple CCT devices may also be configured in some examples to collaboratively determine an exact location of a particular CCT device. For example five CCT devices (120) are each located at a different geographic position (e.g., Location CCT1-Location CCT5) relative to the location (Location BS) of the BS device (110). Each CCT device can then be requested to make a distance measurement (e.g., Distance 1-Distance 5), and report the distance measurements to some form of central processing such as a server within the communication network (e.g., see FIG. 1D). The locations of the CCT devices and the distance measurements together can form a set of geographically arranged overlapping circles that include a common point that corresponds to the location of the particular CCT. The overall method of determining the position will be described in further detail below with respect to FIGS. 4A-4E.

Figure 1D:
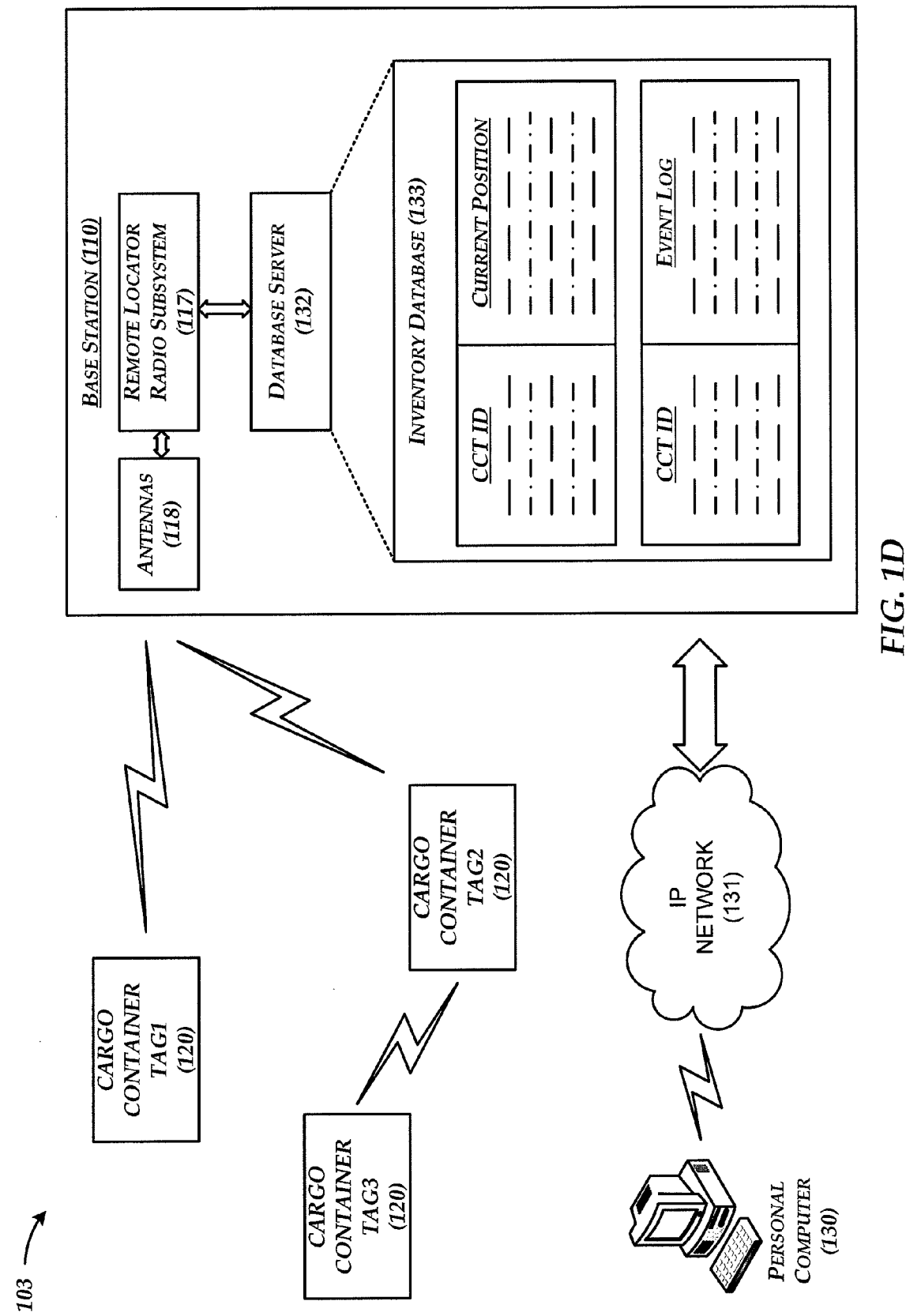

FIG. 1D illustrates an operating environment (103) where a series of cargo container tags (120) are arranged in communication with a common base station (110) that is also accessible via an internet protocol (IP) network connection. The IP network connection (131) can be accessed via a personal computer (130) or some other terminal that allows access to the various functions of the base station (110). In this example system, processing functions are handled in part by a database server (132) that maintains an inventory database (133) of all cargo container tags (CCT).

Each cargo container tag (CCT) that is tracked by the inventory database (133) has a unique identifier (CCT ID) that is used as an index into the database. In some examples, the database tracks current geographic positions of each cargo container tag (CCT). In other examples, the database can be used to track other events such as opening and closing of a door, lifting or moving a cargo container, etc.

Each CCT device (120, TAG1, TAG3, etc.) can either communicate directly with the base station device (110), or with other CCT devices (e.g., TAG2 and TAG3 communicate with one another). In some examples, a CCT device may be arranged to relay a message from a different CCT device. Once enough measurements are assembled, the server can determine the precise geographic location of a particular cargo container based on measurements related to the CCT devices affixed to the cargo container.

In some other examples, a search request can be submitted to the BS device (110) such as from a personal computer (or computing device) via an internet protocol (IP) network based communication. In some alternate examples, the communication can be established to the BS device (110) via some other mechanism such as an SMS message (not shown) that is initiated over the internet or perhaps a pre-recorded voice message using a Voice-over IP (VoIP) communication methodology. The server can again execute a location process to search for the identified cargo container, and report the search results back to the personal computer (or computing device). Many other examples are also contemplated, and the above-described networked systems are merely provided as illustrative examples.

Example Operating Environment

Figure 2A:
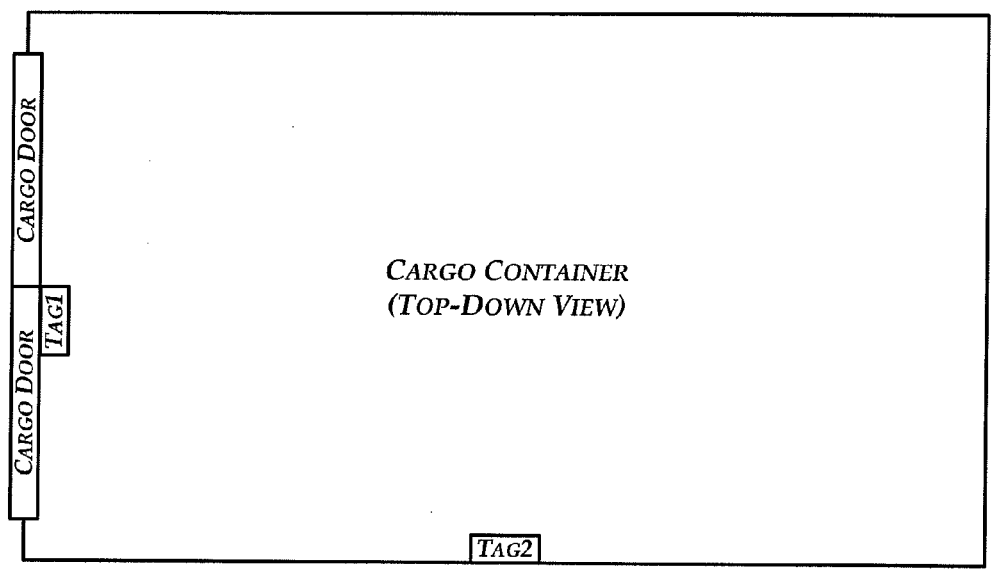
FIGS. 2A-2B are diagrams illustrating example operating environments for an anti-tamper cargo container locator system.
Figure 2B:
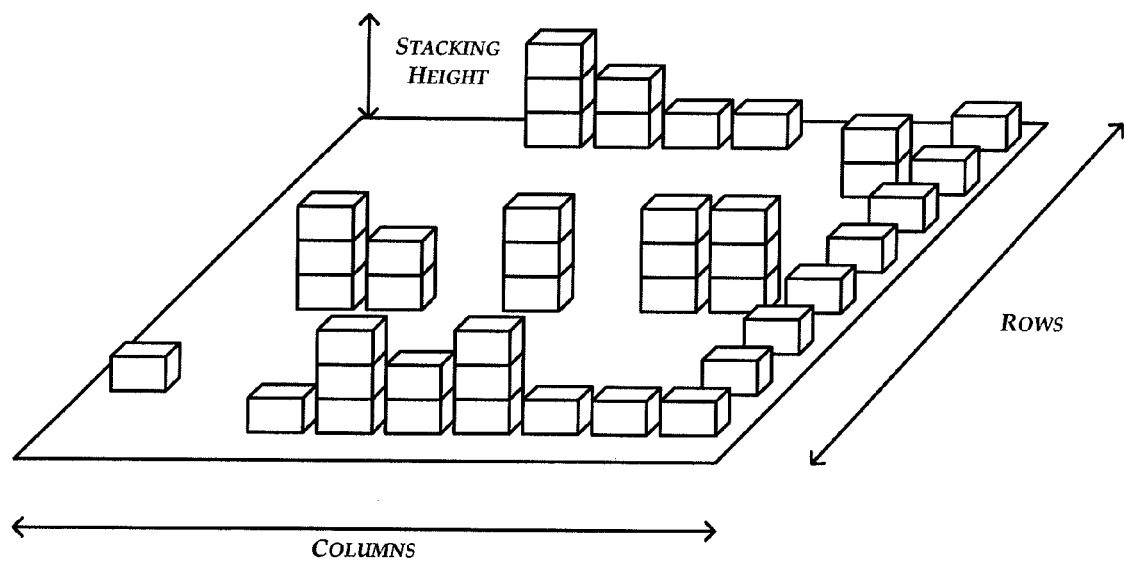

FIGS. 2A-2B are diagrams illustrating example operating environments for an anti-tamper cargo container locator system arranged in accordance with aspects of the present disclosure.

FIG. 2A illustrates a cargo container from a top-down view. The cargo container includes two ends, where one end includes a set of double doors. On one of the doors near the top midline of the container (typically the right hand door), a CCT device (TAG1) is affixed. A second CCT device (TAG2) is affixed a long wall of the cargo container near the top of the wall at a centerline of the cargo container. The distance and orientation of the CCT devices (TAG1, TAG2) is such that the Euclidean distance between the two tags changes as the door opens.

FIG. 2B illustrates an arrangement of cargo containers as they may appear in a freight yard, a loading dock, a deck or cargo hold of a ship, or some similar structure. Cargo containers are arranged in rows and columns, and stacked vertically according to some stacking height criteria.

When containers are placed on ships, they are stacked on top of each other, the stacks are placed next to each other with no gap, and these ranks of stacks are arranged along the length off the ship so that each container's long axis is parallel to the long axis of the ship. The only significant gap lies between these ranks, so the best radio location for the tag is on the end of the container.

When containers are stacked in a freight yard, they are either stacked the same as on ship, with gaps between the ranks of containers allowing radio visibility to the container ends, or they are stacked in rows the long way, with gaps along the sides of the containers allowing radio visibility to the sides.

When containers are stacked on single-length flatbed trucks or rail cars, both the side and the end are radio-accessible, although when half-length (e.g., twenty-foot) containers are doubled up, it's possible that the door end could be obscured, so the side is the only face that is guaranteed accessible. For this example, containers should have two tags, one mounted on the end of the container and the other mounted on the side. The cost of an extra tag is small compared to the cost of the container, and insignificant compared to the shipping fees the container will earn during its life.

Example Benefits of Electronic Monitoring

One benefit of electronic monitoring is to provide an automated or semi-automated way to find and locate a lost cargo container. Another benefit is in provided an automated way to detection intrusion or tampering with a cargo container, similar to using seals on container doors. Although the electronic system does not physically prevent intrusion, a record of the intrusion is made so that the cargo can be inspected thoroughly on delivery. Great cost savings can also be realized since a huge numbers of containers that haven't been tampered with can be delivered to their destinations without special inspection. Electronic monitoring also has several advantages over conventional seals and locks.

Electronic monitoring is physically more convenient because no removable device is used. An electronic log is kept inside the tags of all detectable events, including door openings, so the external locating device that reads this log can tell if such an event occurred in the time since the container was loaded.

As long as the cargo containers are in communication (via a cargo container tag device) with a base station (e.g., while on a ship, in a freight yard, etc.), intrusion or tampering can be detected immediately and raise an alarm. Physical seals can only reveal tampering when a visual check of the cargo container is made.

Cutting a hole in the side of a cargo container, in order to steal valuable contents without opening the door, can raise an immediate alarm, since the electronic system can detect changes in the shielding provided by the cargo container, not just the opening of a door.

Motion of anything inside the cargo container can be detected. A human stowaway moving around inside a cargo container could be detected. So could any significant shift in the cargo, which might indicate possible damage.

Since the tag has the ability to log events in its memory, the addition of inexpensive sensors (e.g., temperature sensor, humidity sensor, etc.) can log other interesting conditions, such as extremes of temperature or mechanical shock.

Example Tags

Figure 3A:
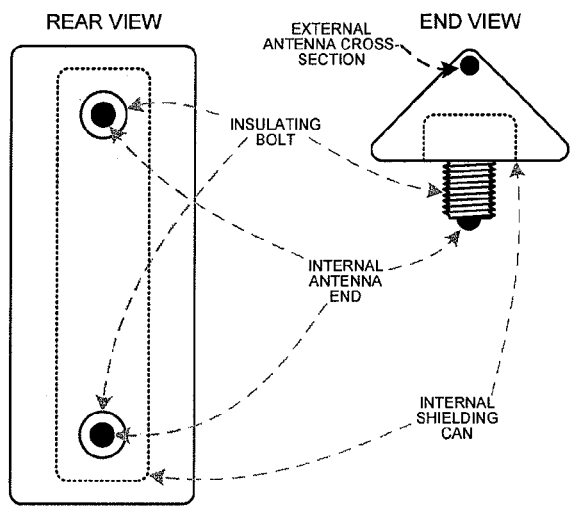
FIGS. 3A-3C are diagrams illustrating example cargo container tags arranged for use in an anti-tamper cargo container locator system.
Figure 3B:
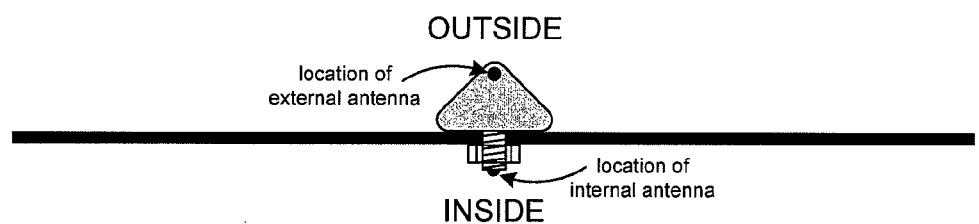
Figure 3C:
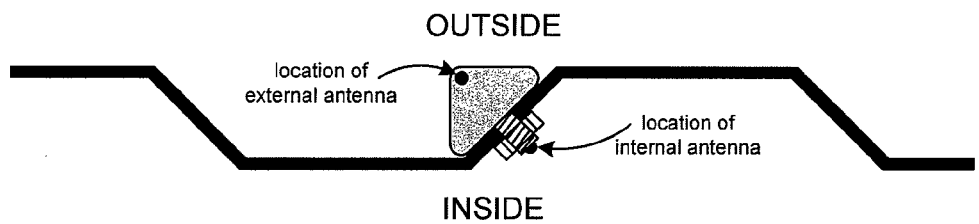

FIG. 3A-3C are diagrams illustrating example cargo container tags arranged for use in an anti-tamper cargo container locator system in accordance with at least some features of the present disclosure.

FIG. 3A illustrates an example housing CCT device that is molded into a fairly indestructible housing made out of high-impact plastic that is impervious to the elements. A heavy duty bolt is used to affix the CCT to the cargo container. The bolts can be made out of the same plastic, with metal rods inside them extending slightly into the interior of the container. A pair of the rods in the bolts can provide a crude dipole antenna inside the cargo container. A shielded can placed inside the housing can isolate this dipole from the outside world, keeping it separate from the external antenna, which can be a more conventional dipole antenna that is molded inside the housing near an external surface.

The sides of cargo containers are coarsely corrugated, so the tag that mounts on the side can fit into a recess of this corrugation to prevent damage when the container is placed directly against another container (See FIG. 3C). Some doors are not corrugated (See FIG. 3B), but the tag can still be mounted on a recessed part of the door, as long as it doesn't stick out any further than the door handles.

In some examples a slot-type antenna can be used in place of the bolt variety antenna previously described. A slot antenna may be preferred in some implementations since the slot antenna can simply be formed by a slit in the metal that is filled in with a non-conductive material. Since the slot antenna is difficult to identify, it is more difficult to tamper with the antenna to disable the associated CCT device.

Example Satellite Navigation Operation

FIGS. 4A-4E are diagrams illustrating the locator operations for an anti-tamper cargo container locator system, arranged in accordance with some features of the present disclosure.

Figure 4A:
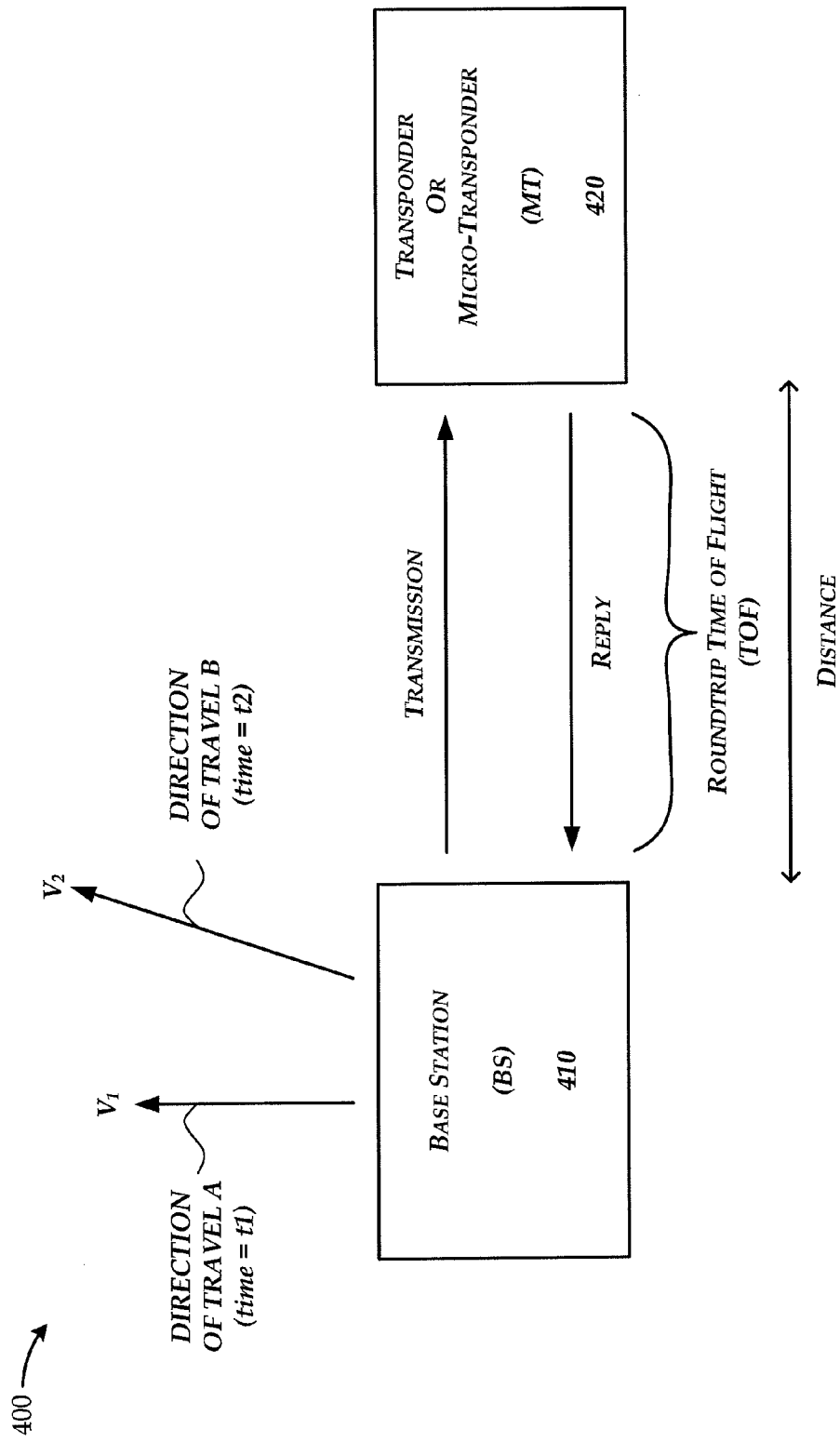
FIGS. 4A-4E are diagrams illustrating the locator operations for an anti-tamper cargo container locator system.

FIG. 4A illustrates a locator system (400) where a BS device (110) is configured to operate as a locator that communicates with a CCT device (420) such as may be found in a cargo container, affixed thereto, etc. The BS device (410) in this example is moved in any arbitrary direction when the locator mode is active. This movement can be accomplished by a rotating antenna, a phased antenna, or by a multiplexer that selects one of multiple antennas that are spaced apart by about a quarter wavelength.

During a first instance of time (e.g., time=t0) the direction to the CCT device is designated as direction A, while in a second instance of time (time=t1) the direction is designated as direction B. The velocity of the BS device (410) corresponds to a first velocity (V1) when the direction of travel corresponds to direction A, and a second velocity (V2) when the direction of travel corresponds to direction B. These velocities for the BS device (410) are retrieved from the satellite navigation system (e.g., GPS), as are the known geographic positions (e.g., lat/long) of the BS device (310).

Figure 4B:
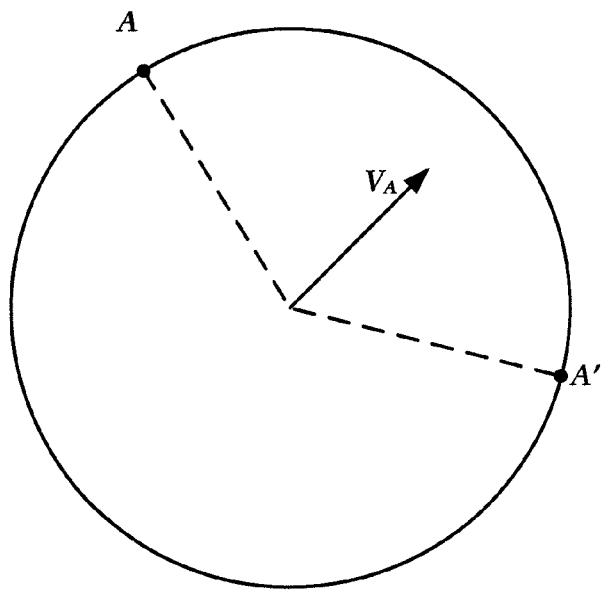

FIG. 4B is a graphical diagram (430) illustrating a first velocity vector (VA). Velocity vector VA is positioned from an origin at the center of a circle, and extending in-between two points A and A'. Points A and A' correspond to the apparent velocity associated with the directional vector that is determined by the processor via the locator logic, which occurs at the same time that velocity V1 is retrieved from the satellite navigation system.

Figure 4C:
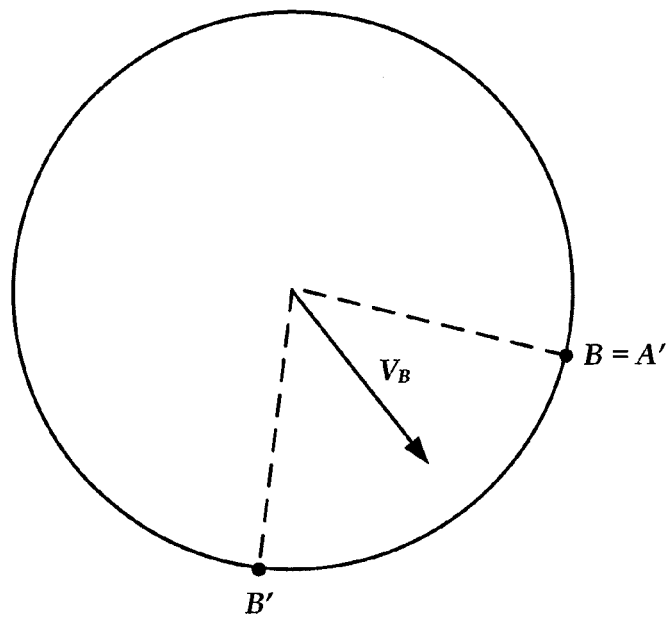

FIG. 4C is a graphical diagram (440) illustrating a second velocity vector (VB). Velocity vector VB is similarly positioned from an origin at the center of a circle, and extending in-between two points B and B', wherein points B and B' correspond to the apparent velocity occurring at the same time that velocity V2 is retrieved from the satellite navigation system.

The direction of the CCT device (420) relative to the BS device (410) corresponds to the common direction between these two velocity vectors (VA, VB). Since A' and B are mapped to the same location, the ambiguity in direction is resolved and the other directions are discarded. This process is accomplished by analyzing the true velocity of the CCT device/BS device with respect to the earth's reference system, and correlating this velocity with the apparent frequency and cadence shift of the signal from the selected transponder.

Figure 4D:
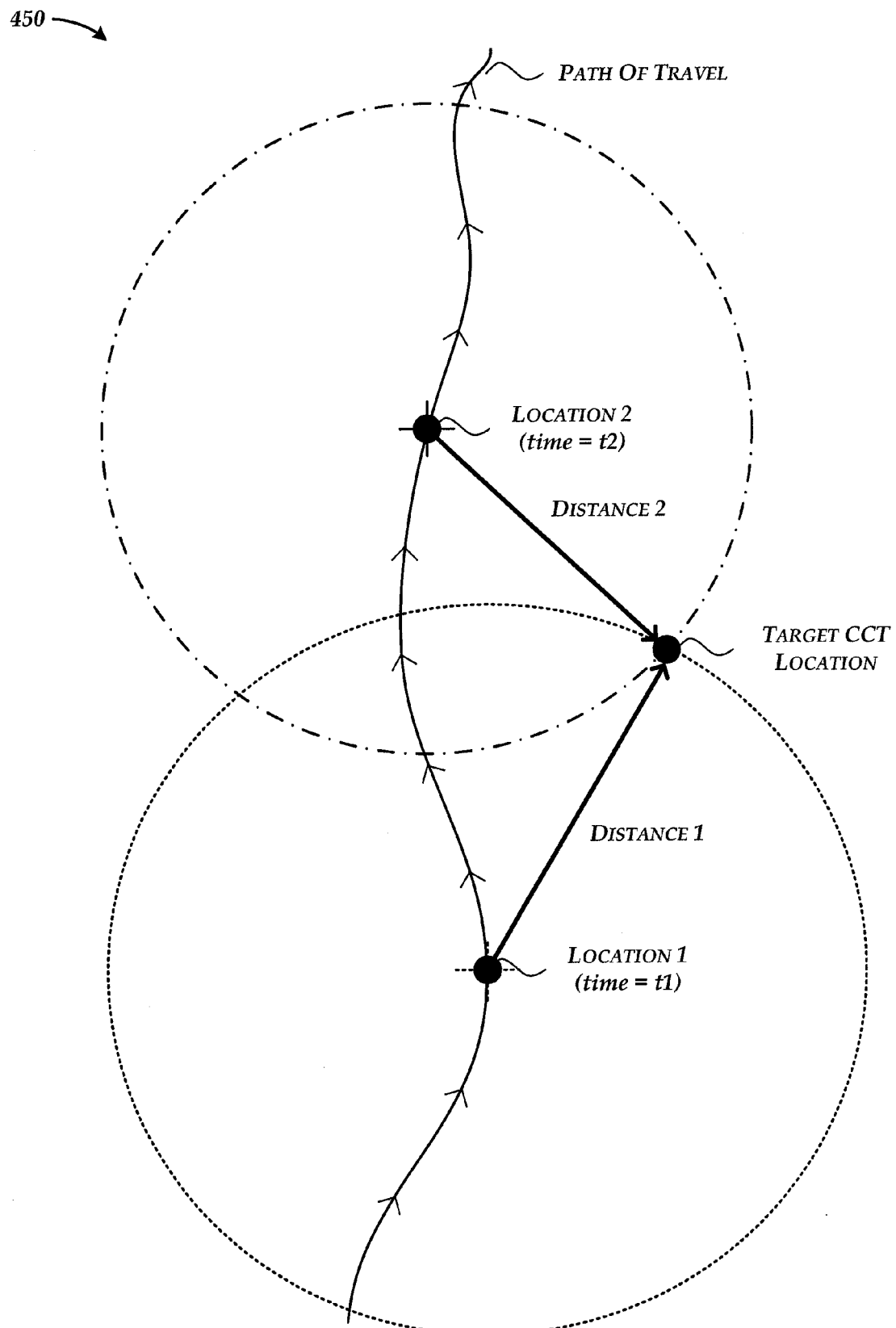

FIG. 4D is a graphical diagram (450) illustrating a location determination from a BS device that performs a series of distance measurements as the BS device (or the CCT device relative to the BS device) moves through a path of travel. At time=t1, the BS device is located at a first location (LOCATION 1) and calculates a first distance measurement (DISTANCE 1) based on a time-of-flight (TOF). At time=t2, the BS is located at a second location (LOCATION 2) and calculates a second distance measurement (DISTANCE 2) based on a time-of-flight (TOF). The circles illustrated in FIG. 4D illustrate a constant distance about the location of the CCT at that point in time. The two circles intersect at two points, where one point corresponds to the location of the transponder. It is important to note that an ambiguity exists at another intersection point, which can easily be resolved by additional measurements as the path of travel continues.

Figure 4E:
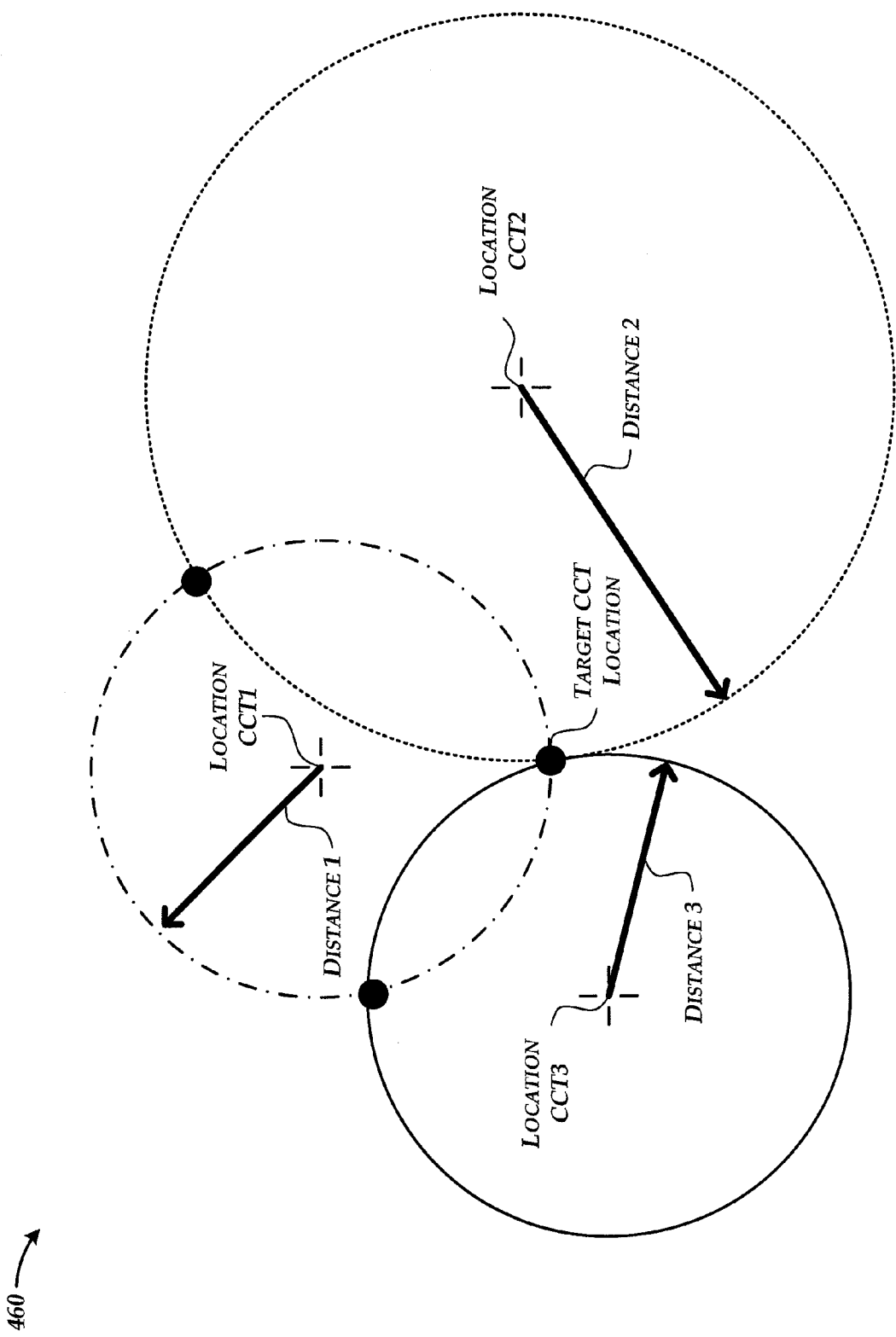

FIG. 4E is a graphical diagram (450) illustrating a location determination from either one BS device that performs a series of distance measurements as the BS device moves through three points along a path of travel (relative to the CCT), or via multiple CCT devices that report their location and distance measurement such as described previously for FIGS. 2A-2C. A first CCT (CCT1) is located a first location (Location CCT1), and measures a first distance (DISTANCE 1) to the transponder. A second CCT (CCT2) is located a second location (Location CCT2), and measures a second distance (DISTANCE 2) to the transponder. A third CCT (CCT3) is located a third location (Location CCT3), and measures a third distance (DISTANCE 3) to the transponder.

Three circles are illustrated to demonstrate a constant radius of distance about the location at the time of measurement by a BS device (or CCT device). Although each circle may overlap at two places, leaving an ambiguity in the exact location of the transponder, the use of all three measurements together results in a single location of the transponder (CCT device location). As such the above description illustrates that a network of CCT devices communicating either through a server or directly to one another can easily be used as an opportunistic model to collaboratively identify the transponder's precise location.

General Concepts of Transmission Coding

Transmissions between the base station (BS) device and the cargo container tag (CCT) device(s) are coded transmissions. In one example, the transmission consist of packets of 2047 QPSK symbols, using a code that provides 2048 such codes with maximum orthogonality. For this example, each packet encodes eleven bits of information. FFT-based correlation can detect the presence of such signals even when buried beneath the noise. Each CCT device has a unique identifier (e.g., 33-bit serial number) that is encoded into the transmission over multiple packets. Thus, reception of multiple packets is required to communicate the entire coded serial number before any of the transmission is recognized by the CCT device before it can transmit a response.

An FFT-based correlation mechanism can not only detect the reception of a particular code, but can detect its time, and also its relative carrier phase. The initial communication consists of a continuous repetition of packets containing a first portion of the serial number (e.g., the first eleven bits), so a single packet time's worth of data captured asynchronously during this period will produce a correlation peak that shows the time offset between the receiver's and transmitter's packet period.

The BS device and the CCT device each include a crystal oscillator. The crystal oscillator is for digitally synthesizing the transmission frequency for communicating between the devices. The BS device has a tight tolerance on its crystal oscillator so that the frequency is within about ±1 ppm range of the exact value, over temperature and lifetime. The CCT device does not have a tightly controlled crystal frequency and instead is arranged to maintain a relatively constant error by having the CCT device intentionally introduce phase roll into the patterns so they can be correlated in the receiver.

A temperature response of the CCT device's crystal oscillator can be accurately characterized at manufacturing time. A temperature sensor is coupled as closely as possible to the crystal so that the temperature of the crystal can be carefully tracked. The CCT device can then be arranged to detect when the residual error is starting to get significant (one or two ppm), at which point it can recalculate the patterns it can correlate against to account for the changed amount of phase roll. When it actually receives a signal from a BS device, it receives multiple copies spaced out over time, which allows it to make the much more precise measurement of the phase roll, and then exactly duplicate it when it transmits its response.

Once this packet timing has been established, the receiver in the CCT device can receive further packets synchronously with using the recovered transmitter's packet timing. The transmitter from the BS device can then attach additional data to the packets by arbitrarily rotating them within their packet times. One example implementation allows up to ten bits of arbitrary information to be appended to each synchronously received packet, and these bits can be used to encode commands or other information.

Example Characteristics of a Cargo Container's Interior

The interior of a cargo container is a reverberant chamber, and correlation against the transmitted codes in the receiver will produce an image of the impulse response of this chamber, which will depend greatly upon what's inside the container. In general, the direct path will be the strongest spike, but not necessarily so; in practice, the software should look for the earliest correlation that exceeds a threshold, and interpret that as the direct path.

An empty container will have a single strong impulse representing the direct path, followed by a fairly long, smoothly decaying impulse response, since there is nothing to absorb the radio energy. (While there is actually a short silence between the direct path and the first reflection, it won't show up in the impulse response because it will always be shorter than one sample period, representing forty feet of delay.) A container loaded with something absorptive will have a short impulse response mostly indicating the direct path. (The chance of having a good direct path can be increased by mounting the tags near the top of the container, where there is most likely to be an internal air space.) At the extreme, a container filled with something like washing machines could produce a long complicated impulse response without a very strong initial spike representing a direct path.

Whatever the impulse response of the cargo container, it should be stable between the time the container is loaded and unloaded. Any variation in the response indicate that something has changed in the internal environment, and can be taken as an indication either of intrusion, or of some cargo shifting inside the container; if the cargo is properly tied down, then a change in the impulse response becomes a reliable indicator of intrusion.

Example Process Flows for Anti-Tamper System

FIGS. 5A-5D are flow charts illustrating example process flows for an anti-tamper cargo container locator system arranged in accordance with the present disclosure.

Figure 5A:
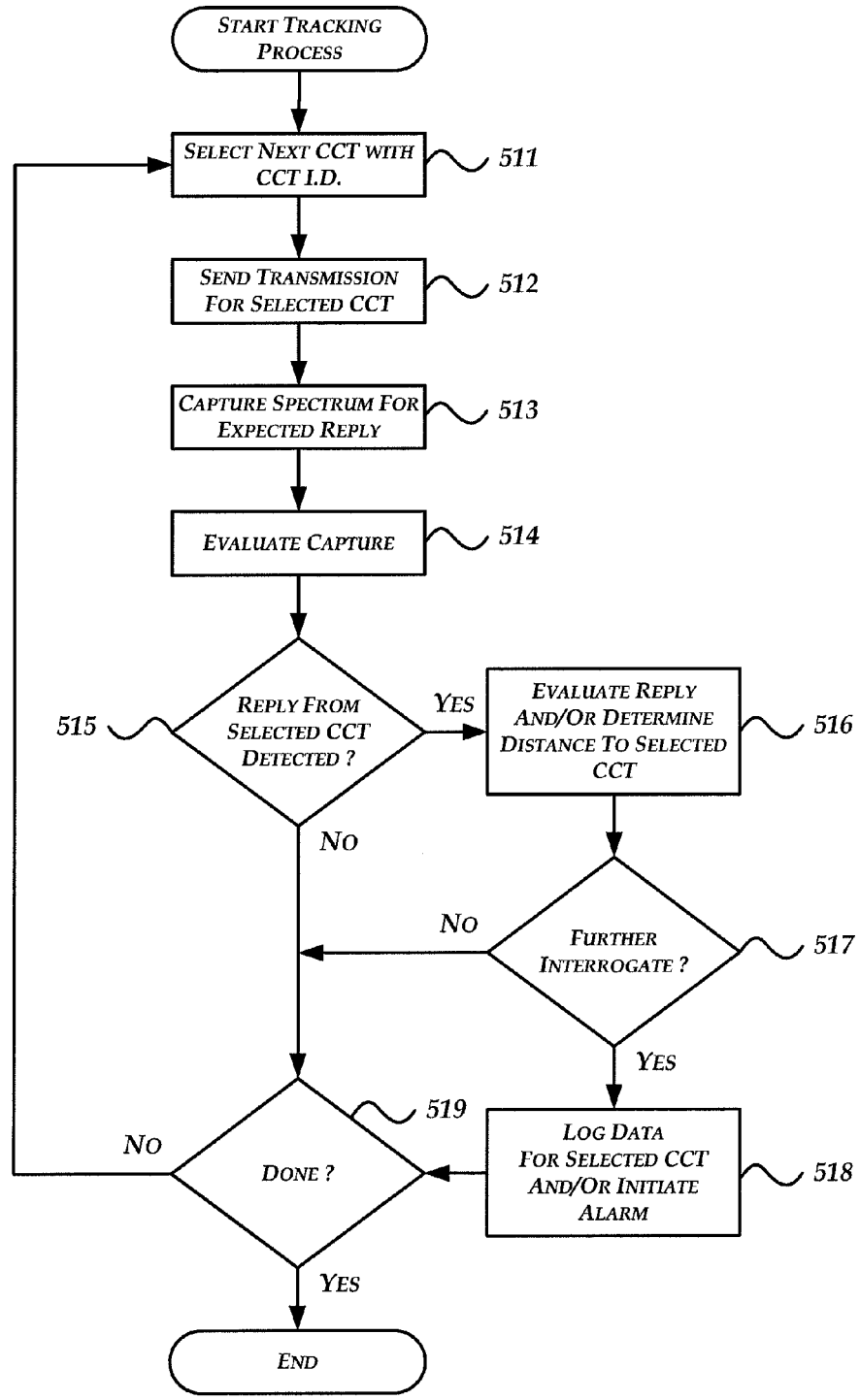
FIGS. 5A-5D are flow charts illustrating example process flows for an anti-tamper cargo container locator system.

As illustrated by FIG. 5A, a first process (510) can be used by the BS device to collect information from each of the CCT devices so that the location of each CCT device can be tracked over time. Process 510 includes processing blocks 511-519. After the tracking process is initiated, processing begins at block 511 (Select Next CCT with CCT I.D.) where the BS device is arranged for selecting each cargo container tag for interrogation (e.g. one at a time in a loop). Each cargo container tag is associated with a unique identifier (CCT I.D.). Continuing to block 512 (send Transmission for Selected CCT), the BS device is arranged for sending a transmission from the BS device to the selected CCT device, where the transmission is encoded with the unique identifier (CCT I.D.) and the transmission is emitted by the BS device using the radio communication subsystem and the antenna(s). At block 513 (Capture Spectrum for Expected Reply), the BS device is configured for capturing radio signals from the radio signal spectrum associated with an expected reply from the selected CCT device. Continuing to block 514 (Evaluate Capture), the BS device is arranged for evaluating the captured radio signals from the radio signal spectrum and to determine if a valid reply transmission was received from the selected CCT device at decision block 515 (Reply from Selected CCT Detected?). Processing continues from decision block 515 to block 516 (Evaluate Reply and/or Determine Distance to Selected CCT) when a valid reply transmission is detected as received from the selected CCT device. Otherwise processing continues from decision block 515 to decision block 519 when no valid reply transmission is detected.

At block 516, the BS device is arranged for evaluating the received reply transmission and/or determining a distance (and/or a direction) of the selected CCT device relative to the BS device based on the round-trip TOF between the transmission and the received reply. In some examples, the reply transmission may include additional data encoded therein for recording. In some other examples, the reply transmission may include alerts for the occurrence of an event that is detected by the CCT device. In still other examples, the reply transmission may include a current operational status of the CCT device. Example events can include alarm conditions such as door open, fire detected, temperature exceeded high-temperature threshold, temperature below low-temperature threshold, water detected in cargo container, humidity greater than threshold, humidity below threshold, etc.

In some examples, velocities and positions are retrieved from the satellite navigation system of the BS device at block 516 to identify the current location of the BS device. This may be important for identifying an exact location of the cargo container at the time that data is received from the CCT device indicating a unauthorized entry into the container. Apparent velocities can be identified with the system, and the direction and distance from the BS device to the CCT device are determined using the described correlation operations.

Processing continues from block 516 to decision block 517 (Further Interrogate?), where the BS device determines if further interrogation is necessary based on the received reply transmission. Processing flows from decision block 517 to decision block 519 (Done?) when no further interrogation is necessary. Otherwise, processing flows from decision block 517 to block 518 when no further interrogation is necessary. At block 518 (Log Data for Selected CCT and/or Initiate Alarm) the BS device is arranged for logging any pertinent data for the selected CCT device (e.g., distance and direction determinations, received data, etc.) and/or initiating an alarm condition when required. The BS device may also log its own data at this time such as the current time, current date, GPS position of the BS device (e.g., indicates the current port or shipping yard for a cargo container), calculated distance and direction to the CCT device, etc. Processing continues from block 518 to decision block 519.

At decision block 519 (Done?) the BS device is arranged for determining if additional processing is required such as for additional CCT devices that are being tracked. When additional transmissions are required by the BS device processing flows back to block 511, otherwise processing is terminated.

Figure 5B:
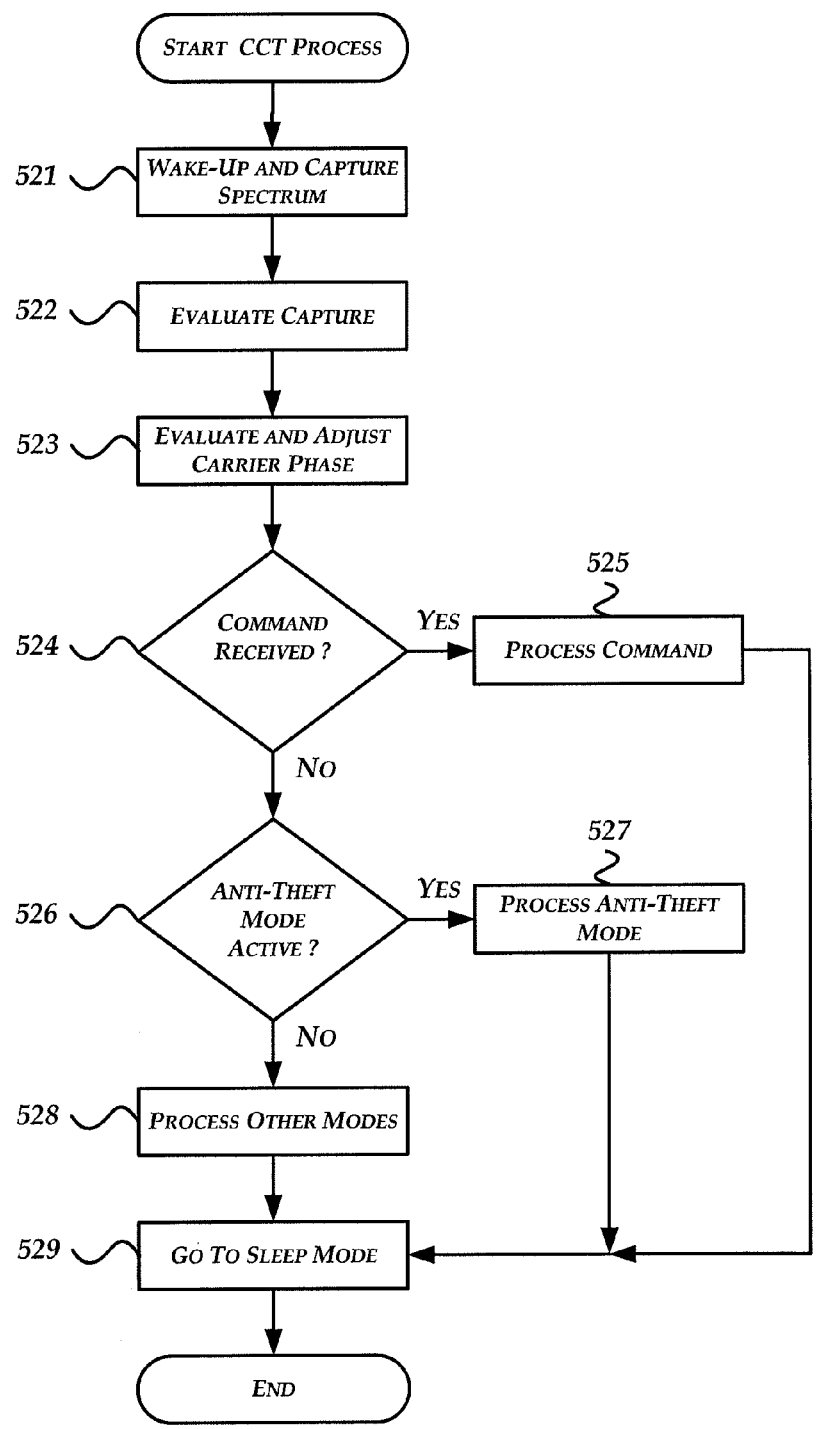

As illustrated by FIG. 5B, a second process (520) can be used by the CCT device to receive transmissions from a BS device (or from another CCT device). Process 520 includes processing blocks 521-529. Processing begins at block 521 (Wake-Up and Capture Spectrum), where the CCT device is arranged for periodically activating (e.g., a WAKE-UP/SLEEP timer can periodically activates/deactivate the device) the CCT device from a low power state to an active state. During the active state, and the receiver section of the CCT device is activated to "listen" for possible communications. For example, the CCT device is configured for capturing radio signals in a radio signal spectrum associated with an expected transmission from another device such as from a base station or from another CCT device. Each CCT device is assigned a unique identifier (CCT I.D.) that is internally stored in the CCT device. Valid transmissions for the CCT device are encoded with the unique identifier for the cargo container tag as previously described with respect to FIG. 5A. Also in the active state, the CCT device is further arranged for monitoring conditions associated with the cargo container (e.g., environmental conditions of the cargo container, intrusion status of the cargo container, etc.) and logging the monitored conditions such as in the data log block described previously.

At block 522 (Evaluate Capture), the CCT device is arranged for evaluating the captured radio signals to determine if a valid transmission is received (e.g., from the BS device or from another CCT device in some examples) for the CCT device. The process of evaluating the signal spectrum will be described later, where a carrier frequency is digitally synthesized using a crystal oscillator in the CCT device, and a FFT correlation is performed to determine if the captured radio spectrum includes a specific encoding for the CCT device. Processing continues from block 522 to block 523 (Evaluate and Adjust Carrier Phase), where the CCT device is arranged for detecting a carrier phase for the valid transmission, comparing the detected carrier phase to the digitally synthesized carrier signal to identify a difference (i.e., an error), and adjusting one or more of the carrier phase, carrier frequency, and cadence of the digitally synthesized carrier signal based on the identified difference. Processing flows from block 523 to decision block 524 (Command Received?).

At decision block 524, the CCT device is arranged for evaluating the received signals to determine if a valid command is received in the transmission. Processing flows to block 525 (Process Command) where the CCT device is arranged for processing the valid command when received in the transmission. Otherwise processing flows to decision block 526 when no valid command is found in the transmission. At decision block 526 (Anti-Theft Mode Active), the CCT device is arranged for determining if the anti-theft (or anti-tamper mode) is active. Processing flows to block 527 (Process Anti-Theft Mode) where the CCT device is arranged for processing the anti-theft mode, otherwise processing flows to block 528 (Process Other Modes) where the CCT device is arranged for processing other modes. At block 529 (Go to Sleep Mode), the CCT device is arranged for returning to the sleep state or the low power state, after transmitting any necessary reply transmissions (e.g., to the base station or the CCT device) are completed using the digitally synthesized carrier signal.

Figure 5C:
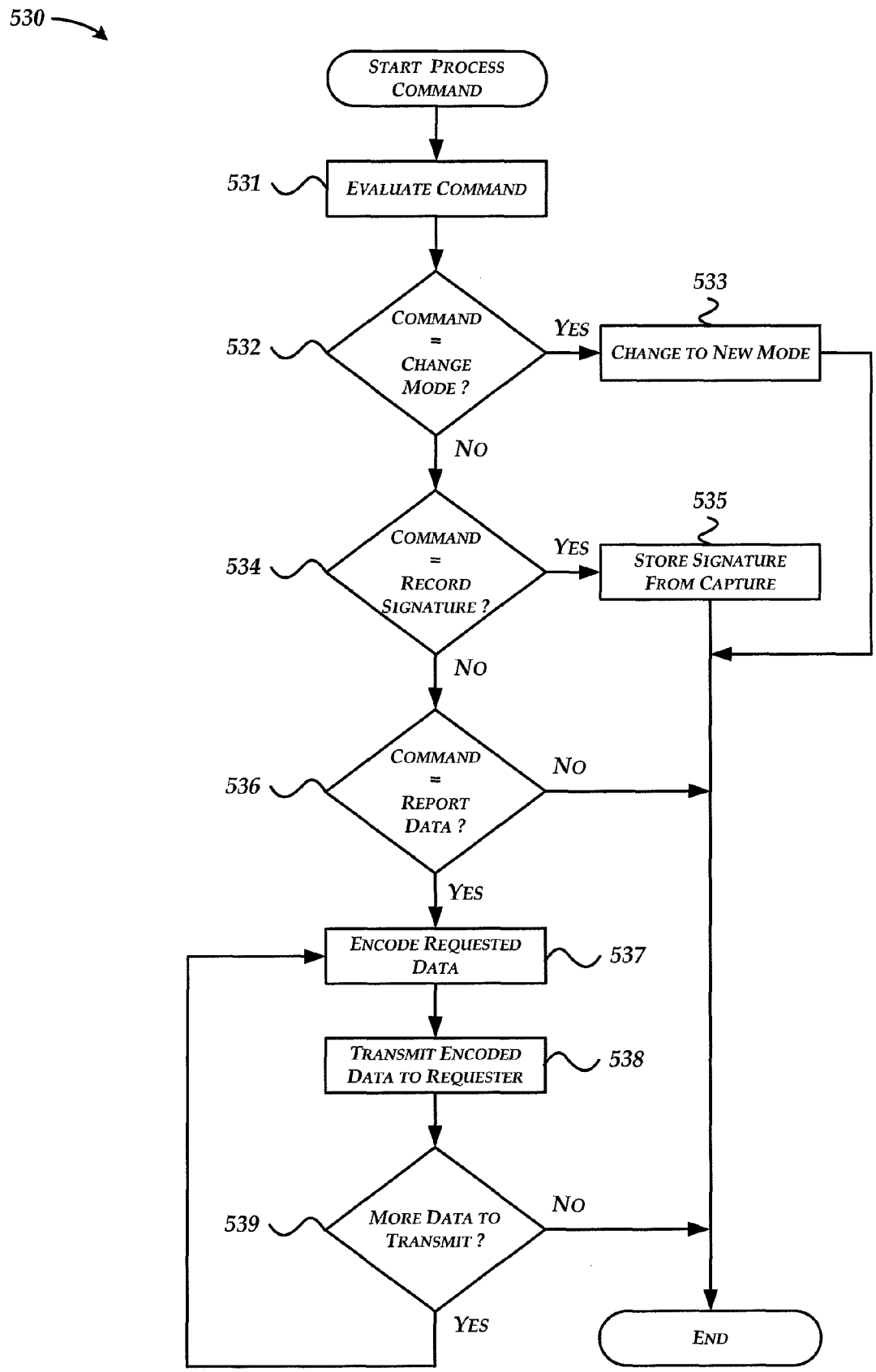

As illustrated by FIG. 5C, a third process (530) can be used by the CCT device to process commands received from a BS device. Process 530 includes processing blocks 531-539. Processing begins at block 531 (Evaluate Command), where the CCT device is arranged for evaluating any valid commands that have been identified from a validly received transmission. Continuing to decision block 532 (Command=Change Mode?), the CCT device is arranged for evaluating the command to determine if a change mode command has been received. Processing flows to block 533 (Change to New Mode) when the change mode command is received and the CCT device is arranged for selecting a new mode for operation based on parameters received for the change mode command. Otherwise processing flows to decision block 534.

At decision block 534 (Command=Record Signature?), the CCT device is arranged for evaluating the command to determine if a record signature command has been received. Processing flows to block 535 when a record signature command is received and the CCT device is arranged for storing a signal profile (e.g., in memory) from a prior capture as a signature for subsequent use (e.g., door open signature, door closed signature, cargo container is elevated above the ground signature, a cargo container is on the ground signature, a cargo container is on a railroad car signature, etc.). Otherwise processing flows to decision block 536.

At decision block 536 (Command=Report Data?), the CCT device is arranged for evaluating the command and determining if a report data command has been received in the transmission. Processing flows to block 537 when a report data command is received in the transmission, otherwise processing is terminated. At block 537 (Encode Requested Data), the CCT device is arranged for identifying requested data from the report data command, and encoding the requested data in a reply transmission. At block 538 (Transmit Encoded Data to Requester) the CCT device is arranged for transmitting the reply transmission to the requester (e.g., the base station or another CCT device) using the digitally synthesized carrier signal. Continuing to decision block 539 (More Data to Transmit?), the CCT device is arranged for determining if more data is to be transmitted to the requester. When more data is to be transmitted (e.g., multiple data packets are being transmitted) processing flows from decision block 539 to block 537. Otherwise processing is terminated.

Figure 5D:
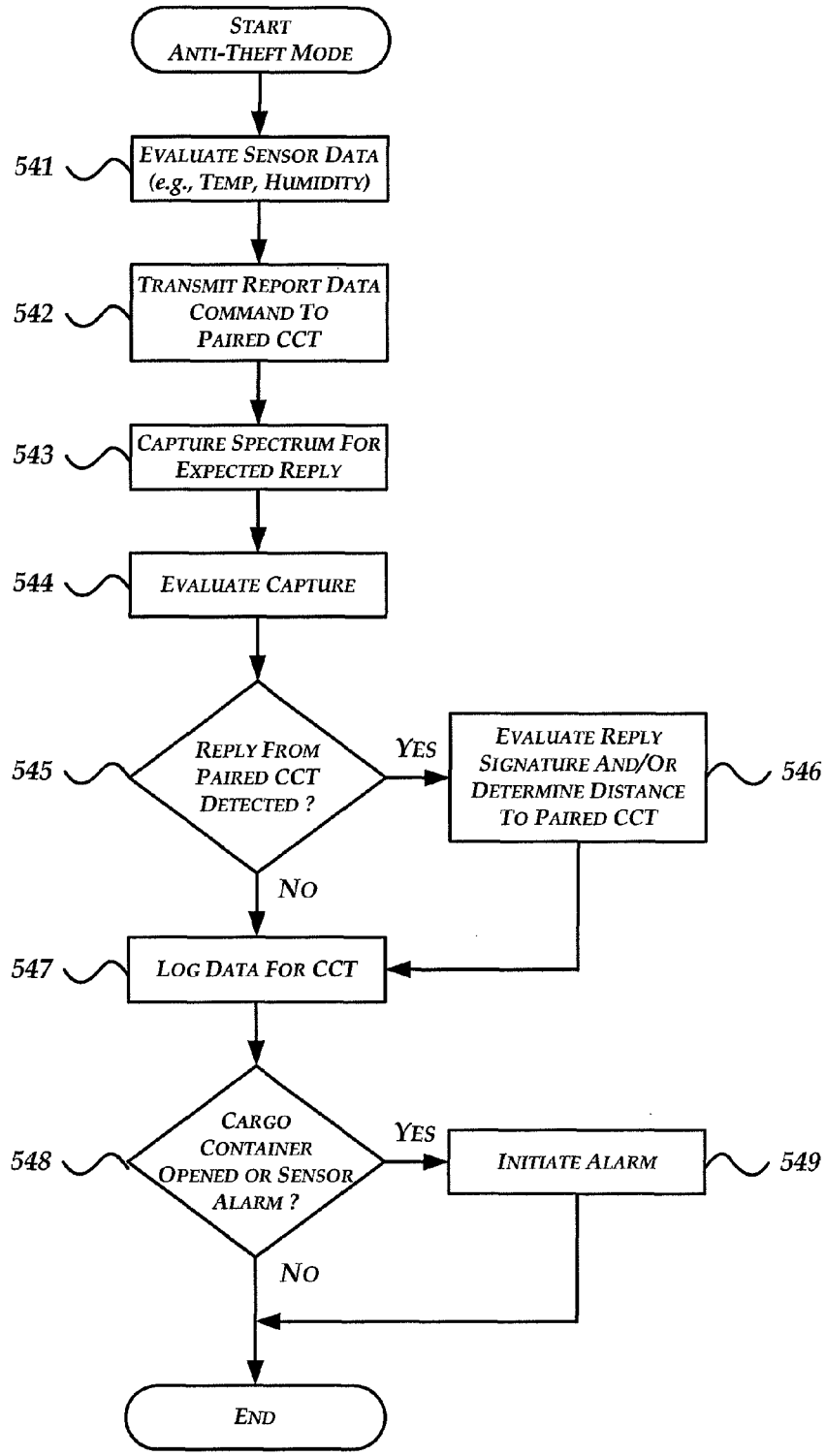

As illustrated by FIG. 5D, a fourth process (540) can be used by the CCT device to process an anti-theft mode. Process 540 includes processing blocks 541-549. The process assumes that in the anti-theft mode, each CCT is paired with another CCT for communications between one another (and possibly recording of data). The communications can be done according to a schedule so that in one instance, a first CCT acts as the initiator, and in another instance a second CCT acts as the initiator.

The processes begins at block 541 (Evaluate Sensor Data), where receiving CCT device is arranged for evaluating sensory data to generate report data. The report data can correspond to any relevant sensory data such as from temperature, humidity, compass or other sensors. Continuing to block 542 (Transit Report Data Command to Paired CCT), the process is arranged for encoding the report data and transmitting the report data to the paired CCT device. At block 543 (Capture Spectrum for Expected Reply), the process is arranged for capturing radio signals from the radio signal spectrum at a time interval where a reply from the paired CCT device is expected. Continuing to block 544 (Evaluate Capture) the process is arranged for evaluating the captured radio signals from the radio signal spectrum to determine if a valid reply transmission is found in the captured radio signals at block 545 (Reply from Paired CCT Detected?). When a valid reply transmission is detected as received from the paired CCT device, processing flows from decision block 545 to block 546 (Evaluate Reply Signature and/or Determine Distance to Paired CCT), where the processing is arranged for evaluating the valid reply transmission to identify signatures (e.g., door open, door closed, cargo container placed on the ground, cargo container elevated above the ground, cargo container located on a railroad car, cargo container has a breached hold, etc.) and/or arranged for calculating a distance between the two CCT devices based on the round-trip time-of-flight as previously described.

Processing flows to block 547 from block 546, and also from decision block 545 when no reply is detected from the paired CCT device. At block 547 (Log Data for CCT) the CCT device is arranged for logging data such as resulting from any distance measurements using TOF between the transmission and reply transmission from the paired CCT device, sensory information, or other detected event or condition (e.g., door open signature, door closed signature, cargo container is elevated above the ground signature, etc.). Processing continues to decision block 548 (Cargo Container Opened or Sensory Alarm?), where the process is arranged for evaluating the logged data to determine if the cargo container has been compromised (e.g., opened or damaged by some sort of sensory alarm such as fire, water damage, etc.). Processing continues to block 549 (Initiate Alarm) when the process detects a compromised status of the cargo container, and the process is arranged for initiating an alarm by reporting the compromised status back to a BS device at a next communication. Otherwise processing is terminated.

Example Detailed System

Figure 6A:
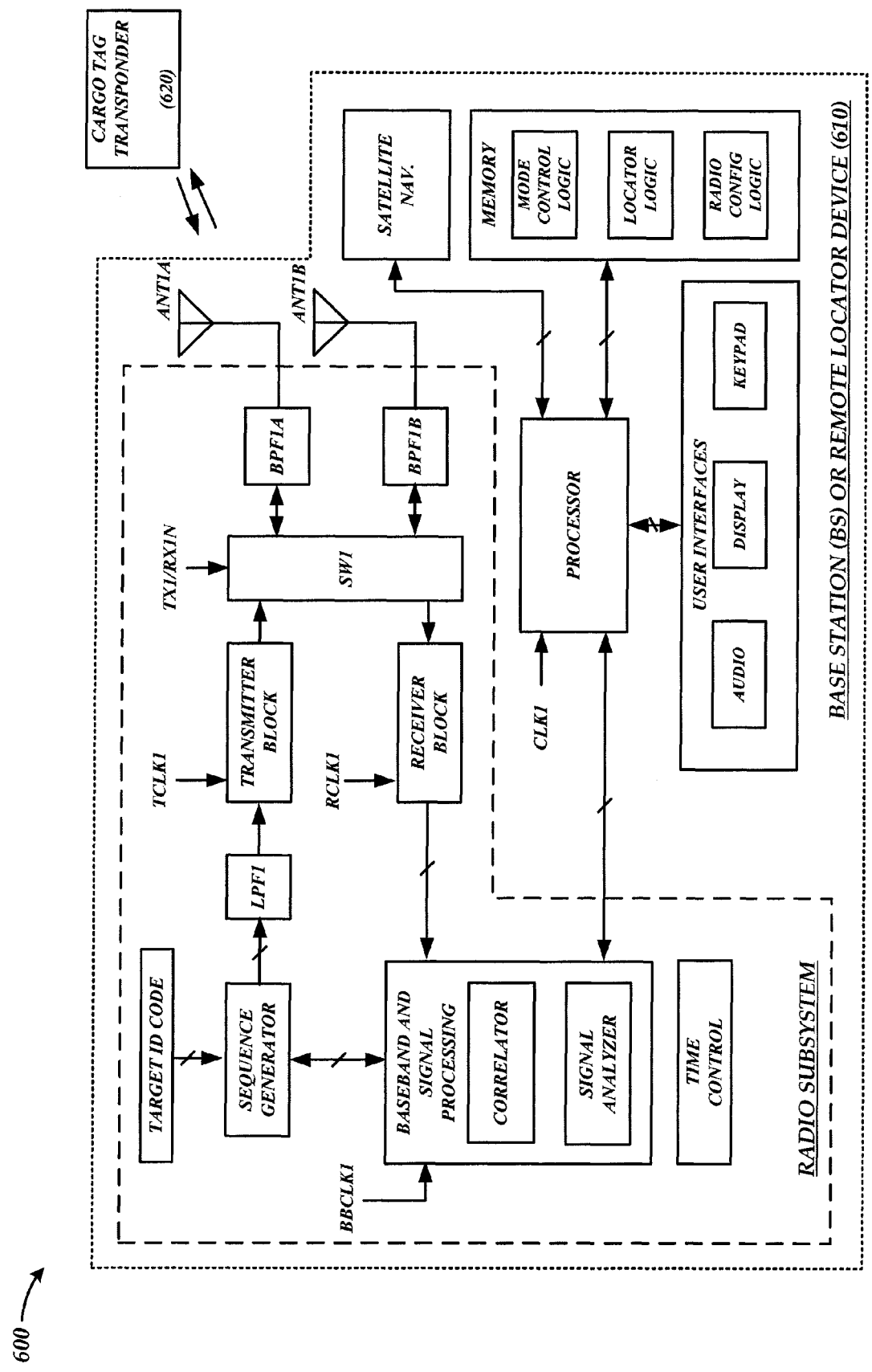
FIGS. 6A and 6B are detailed block diagrams illustrating an example cargo container tag arranged in cooperation with a base station in an anti-tamper cargo container locator system.
Figure 6B:
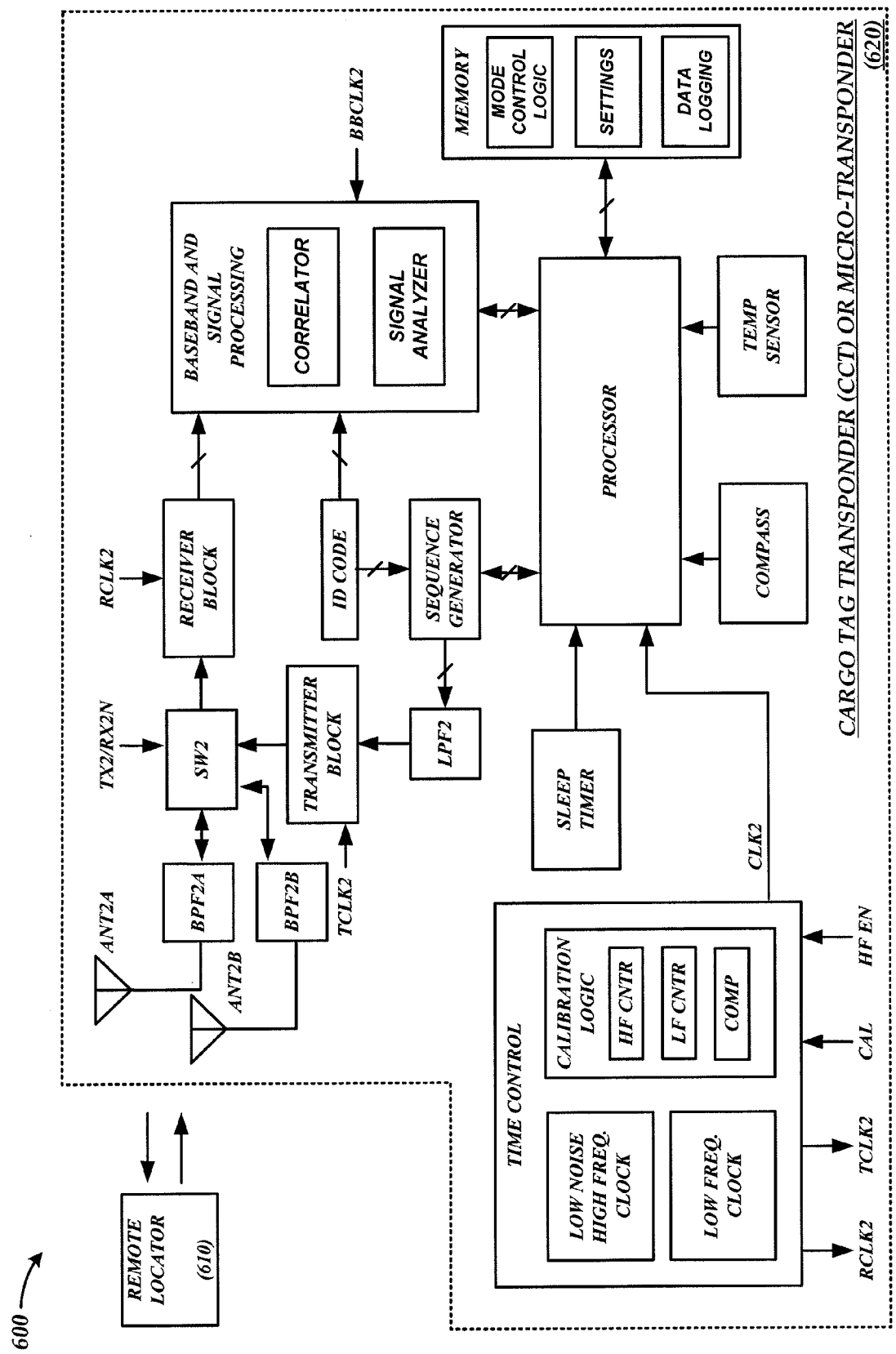

FIGS. 6A and 6B are detailed block diagrams illustrating an example cargo container tag arranged in cooperation with a base station in an anti-tamper cargo container locator system arranged in according with at least one aspect of the present disclosure. For simplicity, the BS device is sometimes referred to as a remote locator (RL) while the CCT device is sometimes referred to as a transponder or micro-transponder (MT).

The example BS remote locator device (610) includes a processor, antennas (ANTI A, ANTI B), a software configured two-way radio set, memory, a satellite navigation system, and a series of user interfaces. The memory includes, among other things, a mode control logic, locator logic, and a radio configuration logic. The processor is arranged to configure the software configured two-way radio set under control of various software applications such as those illustrated in the memory.

The transmitter and receiver block is illustrated as coupling to the antennas (ANTI A and ANTI B) through a transmit/receive switch (SW1) based on the operating mode being either transmit (e.g., TX1 asserted) or receive (e.g. RXIN asserted). A transmission sequence (e.g., TSEQ) is coupled to the first transmitter block when transmission commences, where the sequence is determined by an ID code associated with the target tag (e.g., ID CODE=f(TARGET ID)). The receiver block is coupled to the baseband and signal processing block. Timing parameters for the transmitter, receiver, baseband processing, and the processor are provided by a time control block, which is illustrated as various clock signals (CLK1, BBCLK1, TCLK1, and RCLK1).

The processor receives inputs from any variety of user input devices such as an audio input stream from a microphone such as previously described, a keypad type device, a touchscreen or touchpad type device, or any other reasonable input device. The processor is also arranged to provide output to any variety of output mechanisms such as an audio output (e.g., speaker) or a display output (e.g., LCD display).

The processor is arranged to coordinate the operations of managing operating modes for the BS device (610), managing memory access, execution of software application programs, performing computations, managing user interfaces, and interfacing with the satellite navigation system for location based calculations. The processor also coordinating the operations for the software configured radio set such as baseband processing, signal analysis, memory buffering, input processing. The memory processing can include random access memory (RAM), read-only memory (ROM), as well as non-volatile memory (NVM) such as Flash memory, battery backed up RAM, EEPROM, as well as other NVM type technologies.

In some implementations, two separate switches (not shown) are utilized instead of a single switch (i.e., SW1) for all antennas in the BS device. For example, a first switch (SW1A) can be used to couple the receiver/transmitter of the BS device to antenna ANT1A, while a second switch (SW1B) can be used to couple the receiver/transmitter to antenna ANT1B. The BS device can multiplex between the various antennas using the switches (e.g., SW1, SW1A, SW1B, etc.). The various antennas can be arranged (e.g., orthogonal to one another) as diversity antennas that are used to gain additional information about signal strength, distance and Doppler, etc. An antenna assembly can be placed at each site (e.g., in a cargo hold of a ship, on a deck of a ship, in a loading dock area, etc.) rather than using a single antenna element. This antenna assembly likely includes the BS device hardware in addition to antenna elements that are positioned about a quarter-wavelength apart for detecting directions such as Above, Below, Port and Starboard. The phase differences between successive transmissions should, when combined with our other information, give good position discovery.

The example CCT device (620) or MT of FIG. 6B includes a second antenna set (ANT2A, ANT2B) that is coupled to a second transmit/receive switch (SW2). In some examples, one antenna (e.g., ANT2A) is used for communications inside of the cargo container to other cargo container tags and the other antenna (e.g., ANT2B) is used for communications outside of the cargo container (e.g., a slot antenna or a bolt antenna, etc.) to base station devices. Other configurations of the antennas are also contemplated. The second transmit/receive switch (SW2) is coupled to a second transmitter block and a fourth receiver block in response to another control signal (TX2/RX2N). In some implementations, two separate switches (not shown) are utilized instead of a single switch (i.e., SW2) for all antennas in the CCT device. For example, a first switch (SW2A) can be used to couple the receiver/transmitter of the CCT device to antenna ANT2A, while a second switch (SW2B) can be used to couple the receiver/transmitter to antenna ANT2B. The CCT device can select one or more of the various antennas using the switches (e.g., SW2, SW2A, SW2B, etc.).

A reply sequence (e.g., RSEQ) is coupled to the second transmitter block when transmission commences, where the sequence is determined by the ID code. The second receiver block is arranged to provide in-phase and quadrature signals (I and Q) that are captured in a buffer (e.g., a memory buffer such as a digital buffer or an analog sample buffer). The capture buffer is coupled to a correlator in a baseband signal processor block, which can provide both direct form correlation and FFT correlation functions. The FFT correlator is arranged to provide a circular correlation function of the received I/Q data with the complex I/Q data related to the ID code. A signal analyzer and a processor are both arranged to receive the data output from the correlator for evaluation. Time control is provided to the transmitter, receiver, and the processor in the form of various additional control signals (TCLK2, RCLK2 and CLK2). The processor receives inputs and coordinates the operation of the correlator, signal analysis, sequence generation, memory buffering, and other related tasks. The memory for the processor can include random access memory (RAM), read-only memory (ROM), as well as non-volatile memory (NVM) such as Flash memory, battery backed up RAM, EEPROM, as well as other NVM type technologies.

Current technology systems for locating people and things have a rather short battery life, which can limit their use. The present disclosure describes a small device (e.g., a transponder or a micro-transponder) that has a long battery life by suspending energy consumption until operation is required. Since the MT device needs to be in an active state for very brief intervals, the battery life is extended substantially. Although cellular telephone technologies can be used to determine position in conjunction with a global positioning system (GPS) set, such as a system is inappropriate for the MT since the energy required to operate conventional cellular telephones even in a standby mode will rapidly deplete small batteries. In addition, a GPS set in an MT device would awaken from sleep, and perform a cold start location fix, which process will consume a considerable amount of energy that again rapidly depletes the battery. The present disclosure contemplates that a portable location technology for the MT is preferably operated intermittently to minimize power consumption, and thus addresses some of the problems from conventional location determination techniques.

The present disclosure has analyzed and identified problems with current Doppler shift technology such as found in GPS signals, which render then unusable for the MT in the present system. Although GPS signals may be detected efficiently by means of FFT correlation, there are approximately 28 GPS satellites that include a significant level of Doppler ambiguity from about ±15 ppm. For a GPS signal of 1.5 GHz and a capture interval of 1 msec, a Doppler shift of roughly 22 KHz maximum requires on the order of several tens of Doppler bins or correlation attempts to identify the Doppler shift. The processing efforts necessary to utilize a conventional GPS technology are unacceptable for the presently disclosed use. For example, the MT in the current disclosure is searching for a single code, and in addition, need not contend with huge velocities, and thus does not require any Doppler bins. Moreover, the present disclosure describes an apparatus and system that has reduced capture times relative to conventional technologies, where the magnitude of the processing is reduced by approximately two orders of magnitude.

Communication and Locating Issues

Frequency and phase information in the MT is initially recovered from one portion of the transmission from the RL, and further refined using a bootstrapping process. Timing location within the frame (e.g., coarse timing) is recovered in another portion of the transmission from the RL. After the timing, phase and frequency are recovered, data reception can be scheduled with a degree of certainty. The data is extracted and a reply message is transmitted from the MT back to the RL, where similar signal processing functions are performed by the reconfigured radio set in the RL. The carefully corrected round-trip time of the transmission sequence is used to identify distance between the RL and the MT. A synthetic round-trip Doppler shift, which is independent of the MT's internal clock, can be measured to and correlated against the relative motion of the RL and MT to assess the magnitude of a directional vector between the RL and the MT.

The presently described system has the ability to identify location of a MT with a RL configured locator utilizing an asymmetric transmission system. The signals captured by the MT will typically not be aligned in time with the start and end of a complete pattern in the sequence (e.g., a 2047 chip sequence). However, the RL configured locator is arranged to transmit repeated patterns over time in the sequence. The MT is arranged to cyclically capture a complete pattern in the sequence, even though the captured pattern may be rotated in time relative to the start and end of a complete pattern. A circular correlator can be used to evaluate the captured signals such that the captured signals are properly identified by the MT, despite the rotation status of the pattern. Since the MT does not have a priori knowledge of the timing related to transmission and reception from the RL, circular correlations of the received transmissions are used by the MT to determine the fine and coarse timing. A circular correlation is a correlator that operates on a sequence of fixed length, where the sequence may be circularly shifted in time such that the beginning of the original sequence may be received in the shifted sequence after the end of the original sequence. While a general correlator may not give valid timing information, the circular correlation will provide valid timing information when the captured signals are not aligned in time with the start and end of a complete pattern.

The presently described asymmetric transmission system can be configured such that the MT receives a relatively high power transmission of a structured signal from the RL, while the reply or acknowledgement transmission from the MT to the RL is a very low power transmission. An example MT is configured to operate in a very low power "inactive" mode or "sleep mode", where the MT "activates" or "wake-ups" for brief intervals to listen for the transmission from the RL. The MT correlates each piece of its received structured signals to determine if these signals are coded with an identification code (ID Code) that is specifically associated with the MT. The MT also determines the precise frequency, timing, phase, and cadence for which a reply transmission can be transmitted back to the RL from the received structured signals. The reply transmission that is transmitted from the MT to the RL is a very low power transmission of short duration (a short structured signal) such that significant battery life is conserved. Although the reply transmission is a very low power transmission, the signal processing functions in the RL can be configured to utilize an integration and circular correlation technique to increase the signal-to-noise level of the captured reply transmission.

In the presently described system, a reply transmission signal is transmitted back to the RL from an MT, where the MT synthesizes timing, frequency, phase, and cadence for the reply transmission from signals that are received by the MT from the RL. The frequency of the reply transmission from the MT differs from the original frequency from the RL's transmission by a Doppler shift (ignoring other noise and minor error sources). As such, the RL can predict the reply transmission frequency with a very small margin of error. The potential uncertainty of the reply transmission frequency is small enough so that the phase rotation over several tens of transmission sequences is much less than one turn (one phase rotation through 360 degrees). This allows the RL to sample the reply transmission and add (or integrate), either in the analog domain or the digital domain, the respective samples from the reply transmission sequence. Since noise sums as a square root and signal sums linearly, the signal-to-noise ratio for the captured signal is increased, allowing reception of a much lower level signal than would otherwise be the case without the use of exhaustive computation.

Example Remote Locator (RL) or Base Station (BS)

FIG. 6A illustrates an example remote locator (RL, e.g., the BS device) that is arranged to communicate with an example MT (e.g., the CCT device). The MT is arranged (e.g., by a sleep timer) to wake up at predetermined intervals and receive a coded transmission signal (e.g., COM13). The coded signals are received and evaluated using a variety of signal processing methods such as digital signal processing, analog signal processing, Fast Fourier Transform (FFT), correlation, inverse FFT (IFFT) to name a few. The MT evaluates the received coded signals to determine if the signals are specifically identified with the MT (e.g., by a unique ID code). Through the various signal-processing functions, various internal signals and parameters are varied such that time, frequency and phase alignments for receiving and transmitting coded information are successively refined (e.g., through digital control mechanisms) for accurate processing. The MT, using as its time base the Doppler shifted frequency of the signal from the remote locator, subsequently transmits a reply sequence back to the RL, which is similarly coded. The RL receives the coded transmission, and processes the incoming signals in a similar fashion as the MT.

The RL includes a processor that can be any appropriate processing means including but not limited to at least one: micro-processor, micro-controller, CISC processor, RISC processor, application specific integrated circuit (ASIC), to name a few. The processor is arranged to: receive and evaluate inputs, control outputs, log data, retrieve logged data, and execute programs. The processor is thus arranged to communicate with any number of circuit components such as: a time control circuit, an input circuit, a display output circuit, an audio output or input circuit, a storage circuit, and a memory circuit.

Example inputs can be from any number of input devices (or user input means) such as: an interrupt signal, a wake-up timer, a keyboard device, a keypad device, one or more buttons or keys, a touch-screen (passive or active), a touch-panel, a joystick device, a joy-pad device, a mouse device, a pointing device, a touch-pad device, a pressure sensitive input device, or another processor and an input generated by a software program. In some examples, sound can be used as an input to the RL via audio input processor such as an analog-to-digital converter (ADC) circuit or a coder-decoder (CODEC) circuit that includes analog-to-digital conversion means. A microphone can be built into the RL or externally coupled to the RL through a microphone port for sound input purposes, where signals received by the microphone into a digital signal that can be interpreted as an input. The sound-based input can be stored for further use (e.g., a sound file for playback or recognition purposes) or interpreted as a voice input that can be utilized by the RL. In some implementations, a voice-to-text interpreter can be incorporated into a hardware solution that is arranged in communication with the processor. In some other examples, voice recognition under software control implemented by the audio input processor to operate as a voice input means that generates an example input.

Audio output circuits can be used as an indication means for reporting audible information to a user of the RL device, as well as to provide navigation and location information. The audio output circuit can include an audio output device and an audio output processor. The audio output processor is arranged to cooperate with the audio output device to provide an audible notification to the user. The functions of the audio output device and the audio output processor can be combined in some implementations. The audio output device can be an audio driver circuit for a headphone type device or a speaker type device. In some examples, a speaker or a piezo device is included in the RL to provide sound output. In another example, an audio output port such as a headphone jack can be provided in the RL for a user to connect a headphone type device, or perhaps an external speaker connection.

The audio output processor can be a single tone generator circuit, a polyphonic tone generator circuit, a polyphonic synthesizer circuit, a voice synthesizer circuit, a MIDI playback circuit, or a sound playback circuit. In some examples, the audio output processor includes digital-to-analog conversion means such as from a digital-to-analog converter (DAC) circuit or from a CODEC circuit. The voice synthesizer circuit can include a text to speech interpreter. The voice synthesizer can also be arranged to provide various regional voice affectations and language accents, such as male and female voices, robotic voices, English accents, French accents, Spanish accents, etc. In some examples, the audio output processor is arrange to provide music playback that can be in any desired format such as a lossy compressed sound file, a non-lossy compressed sound file, or an uncompressed sound file. In other examples, the audio output processor device is arranged to provide playback of previously recorded sounds or user recorded sounds. The recorded sounds can be voice messages such as can be provided in character voices (e.g., cartoon characters), recordings of celebrities, or as impressions of recognizable voices. In some examples, the audio output processor can be combined in function with the audio input processor previously described.

Display circuits can also be used as an indication means for reporting visual information to a user of the RL device, as well as to provide navigation and location information. Example display circuits can provide any appropriate video output such as, for example: an LED type display, an LCD type display, an active display, a passive display, a black and white display, a monochromatic display, and/or a color display. Other examples display circuits can be discrete arrangement of LEDS, seven segment displays, as well as other light emitting devices that can be used for reporting visual information. In some examples, the user interface can be integrated with the video output device such as, for example, a touch screen that is integrated with an LCD display. In other examples, the user input interface is separate from the video output device.

The processor in the RL of the present disclosure can be arranged to cooperate with a compass sensor device (not shown) or some similar means for determining a rotational position of the RL. The compass sensor can be an integrated circuit, a discrete circuit, or some other device that is arranged to provide compass sensor information that is related to a directional orientation of the RL. The compass sensor can be a digital compass device or an analog compass device that is arranged to work with an analog-to-digital converter, for example, to provide a comparable function.

In some examples, distance can be reported with display circuit in an alphanumeric representation (e.g., 100, 100', 100 ft, 100 m, etc.). In other examples, distance can be reported in a graphical representation such as an icon, a line, or other graphical shapes. Similarly, direction can be reported in either an alphanumeric representation (e.g., N, S, E, W, NE, SE, NW, or SW) or in a graphical representation. Any combination of graphical and alphanumeric representations can also be made.

The processor is arranged to apply mode control logic in response to a variety of user inputs for activating and deactivating a variety of operating modes as will be described. The mode control logic and any related settings for the RL can be provided in software form or as a firmware such as a read-only memory (ROM) that is loaded into a conventional memory for execution by the processor, or by some equivalent mechanism such as a non-volatile memory (NVM), a flash memory device, and hard-coded instructions in a micro-controller, to name a few. In another example, the processor and memory can be replaced with a programmable logic device (PLD), a specially designed circuit such as an application specific integrated circuit (ASIC), as well as others devices that are arranged to provide similar functionality.

When the two-way radio set in the RL is configured for a locator mode, the RL is operated to send a transmission that consists of a series of coded signals. The code is generated by a unique identifier (e.g., an ID Code) that is associated with a specific MT. A sequence generator is arranged to evaluate the unique identifier and create a transmit sequence. After the coded sequence is generated for the unique identifier, additional information is encoded into the transmit sequence. In one example, the additional information can be command/control instructions for the MT. Only one sequence need be transmitted to accomplish communication, timing synchronization, and sequence validation. The output of the sequence generator (e.g., TSEQ) can be filtered such as by a low pass filter (LPF1) prior to coupling the signal to the transmitter block.

The transmitter block is arranged to carrier modulate (e.g., multi-phase shift keying, binary phase shift keying, quadrature phase shift keying, differential phase shift keying, continuous phase modulation, multiple amplitude and phase shift keying, etc.) the coded signals with a carrier frequency, a spread spectrum carrier, and/or a frequency hopping method. The transmit-receive switch (SW1) is arranged to couple the carrier modulated coded signals to the antenna (ANTI) or antennas during the transmit sequence. A band-limiting filter (e.g., BPF1) can be provided between the antenna and the transmit-receive switch (SW1) such that out-of-band signals are ignored. The band-limiting filter (BPF1) can be any filter (or pair of filters BPF1A, BPF1B, etc.) that provides reasonable band-limiting functions such as: a passive band-pass filter, an active band-pass filter, a surface acoustic wave (SAW) filter, a bulk acoustic wave (BAW) filter, a comb filter, a strip-line filter, to name a few.

The RL based locator is operated to receive a transmission from the MT that consists of another series of coded signals. The coded signal is similarly generated by the MT with a unique identifier (e.g., the ID Code) that is associated with the specific MT. The receiver block is arranged to receive carrier modulated (e.g., multi-phase shift keying, binary phase shift keying, quadrature phase shift keying, differential phase shift keying, continuous phase modulation, multiple amplitude and phase shift keying, etc.) coded signals from the antennas (ANT1A, ANT1B) via SW1. The received signals are handled by a baseband processor that can also provide signal-processing functions. Alternatively, the baseband processor is arranged to provide captured signals to the processor, which is arranged to handle various signal-processing functions.

The described RL performs distance measurement by round trip time measurement. For example, the round trip time can be determined by the difference in time between the transmission of a signal from the MT to the RL, and the subsequent reply transmission of an acknowledgement signal from the RL back to the MT, offset by any other delays.

Bearing to the MT is determined by the operation of the RL in a search and locate mode as will be described later. In general, the user initiates a search mode to acquire a communication link and an initial distance calculation, followed by user initiated movement of the RL itself. In some examples, the RL or the antennas of the RL is partial rotated through an arc relative to the user where additional distance and correlator information is evaluated to determine direction. In some other examples, the RL is moved either linearly or non-linearly during distance and correlation calculations.

Various timing signals that are employed by the RL are generated by a time control circuit as illustrated in FIG. 6A. The timing signals are used by the system to digitally synthesize transmitter and receiver carrier wave signals from a locally generated oscillator signal in the RL.

Example Micro-Transponder (MT) or CCT

FIG. 6B illustrates an example MT (620) that is arranged to communicate with a RL (610). The example MT (620) may be placed in a wristband, a collar, a watch, sewn into an article of clothing, or implanted in a patient such as a with a bionic-type device. The MT (620) is arranged to receive a coded transmission signal, such as previously described, from the RL with a receiver block via switch SW2 and antenna ANT2. Optionally, a band-limiting filter (e.g., BPF2) or filters (e.g., BPF2A, BPF2B, etc.) can be used to minimize interference from out-of-band signals in the receiver and/or to prevent interference with other devices. The receiver demodulates the carrier frequency and provides I and Q information, which is subsequently captured by a capture buffer. The capture buffer provides output signals in the form of data to an FFT correlator, which correlates the decoded transmission with the unique identifier (ID code). The processor is arranged to cooperate with memory similar to that previously described for the RL.

Various processing methods are employed to perform base-band processing and signal analysis in the MT, including a correlator block and a signal analyzer block. The correlator block may include an FFT correlator and a direct-form correlator. The signal analyzer is arranged to evaluate the outputs from the FFT correlator and/or the direct form correlator, to determine if the received transmission sequence is identified with the specific MT. When the sequence is appropriately identified, various timing signals are adjusted such that the frequency and phase of the digitally synthesized transmitter and receiver signal(s) are precisely aligned in the MT. Information from the coded signals is extracted by the processor once the transmission sequence is validated. Such information can include command and control instructions for the MT such as, for example, set sleep interval to a new time lapse (e.g., 10 minutes), log receiver signal strength, log invalid received signals, log receiver frequency and phase, transmit logged data, change to slow ping mode, change to fast ping mode, etc.

It is important to note that the processor in the MT (620) of the present disclosure is arranged to apply mode control logic in response to signals that are received from the RL (610). The mode control logic an any related settings for the MT (620) can be provided in any of the above described memory devices, or as hard-coded instructions in a micro-controller, to name a few. In another example, the processor and memory can be replaced with any other appropriate processor means such as a PLD, a specially designed circuit such as an ASIC, as well as others devices that are arranged to provide similar functionality.

A reply message is transmitted from the MT to the RL such that the RL can identify, locate, and receive data from the MT. The reply message is generated with a reply sequence generator that is keyed from the unique identifier (ID Code), similar to the transmit sequence generator. A low pass filter (e.g., LPF2) can be placed between the sequence generator and the transmitter block in the MT. The transmitter block is coupled to antenna ANT2 via switch SW2 to cause the coded reply transmission (e.g., COM31, COM32).

Since an example MT operates with limited energy, the MT is normally operated in a low power or sleep mode. The energy consumed in the sleep mode is sufficient to operate a sleep timer that operates from a low frequency clock. According to a pre-determined time interval, the MT is activated (e.g., wakeup is asserted by the sleep timer) and the MT looks for a signal to receive while operating a high frequency clock. When no identifiable signal can be received, the MT returns to the sleep mode, where the high frequency clock is disabled. The high frequency clock can be enabled and disabled by a respective control signal (e.g., HF EN).

Various timing signals that are employed by the MT (or MT) are generated by a time control circuit as illustrated in FIG. 6B. The processor is operated from one clock signal (CLK2), while the transmitter and receiver in the MT are operated by other clock signals (TCLK2 and RCLK2). The various timing signals are used by the system to digitally synthesize transmitter and receiver carrier wave signals from a locally generated oscillator signal in the MT.

The time control circuit can include additional functionality to calibrate the high frequency clock with a calibration logic circuit. The calibration logic circuit can include any number of high frequency counters (HF CNTR), low frequency counters (LF CNTR), and digital comparator circuits (COMP), as well as other logic circuits such as registers, latches and related logic. In operation the calibration logic is enabled when a calibration signal (CAL) is asserted, such as in response to the processor when applying mode control logic.

The above described RL can be arranged to provide a relatively high power transmission signal (e.g., 1 Watt) over a long time interval (e.g., 2.5 seconds) to ensure that the MT has sufficient time to capture the necessary signals when it is active. The upper limit for energy that can be captured by the MT is determined by the radiated power from the RL multiplied times the capture time interval for the MT, multiplied times any loss factor due to the transmission path. An example transponder (MT) may be arranged to capture the signal from the RL for 157 µs, where the upper limit (ignoring path loss) for captured energy over the 157 µs time interval is approximately 157 µJules.

The MT can be arranged to transmit a very low power transmission signal (e.g., 10 mW) for a shorter time interval (e.g., 15.7 ms) than that for the RL (e.g., 2.5 s). The upper limit for energy that can be captured by the RL is determined by the radiated power from the MT multiplied times the capture time interval for the RL, multiplied times any loss factor due to the transmission path. For a 10 mW transmission over a 15.7 milli-second interval, the transmitted energy from the MT is approximately 157 µJules. The RL must be carefully arranged to capture signals form the MT such as by using an integration method as will be described later. It is contemplated that in one example embodiment, the MT will be implanted in a patient, and operated over at least several years using a watch-type battery.

The transponder (MT) is arranged to synthesize its own internal frequency for transmitting an acknowledgement signal by using the timing information that it acquires from the RL. The timing information that is received from the RL by the MT is Doppler shifted relative to the original transmission frequencies from the RL. The resulting synthesized frequency of the MT, while extremely accurate, corresponds to a Doppler shifted version of the original transmission frequencies form the RL. The acknowledgment signal from the MT is received by the RL, but is again Doppler shifted relative to the transmitting frequencies from the MT. The Doppler shift that result from the round trip of the signal transmissions (i.e., transmission from the RL to the MT, and reply transmission from the MT to the RL) is hereinafter referred to as the synthetic round-trip Doppler Shift.

Example Transmitter

Figure 7:
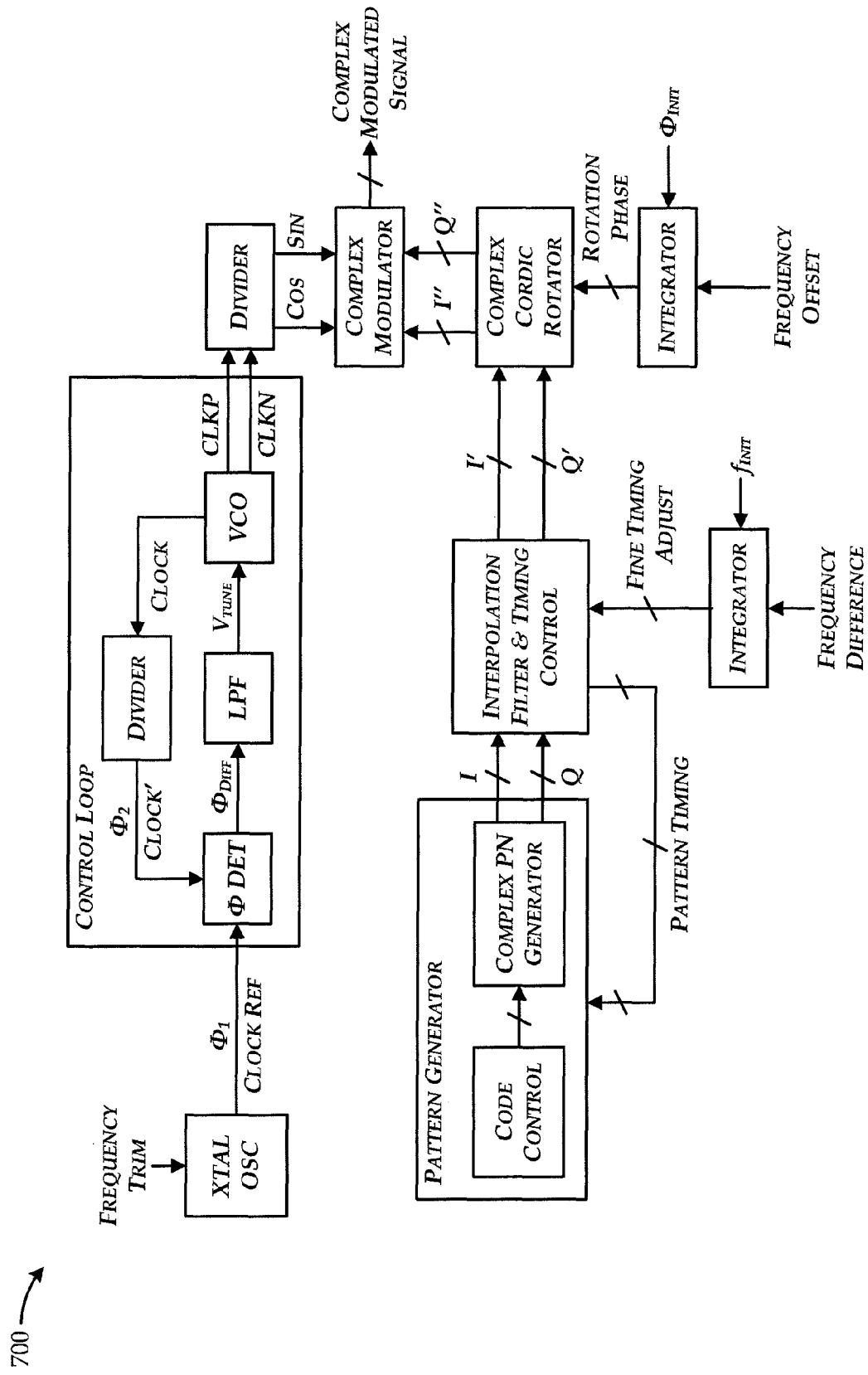
FIG. 7 illustrates an example transmitter.

FIG. 7 illustrates an example transmitter system. The transmitter system includes a crystal oscillator (XTAL OSC), a timing control circuit, a complex modulator, a pattern generator, an interpolation filter with timing control, integrators, and a complex cordic rotator.

The crystal oscillator is arranged to provide an oscillator signal as a clock signal (CLOCK) having a first phase ($\phi_1$) for the timing control circuit. In one example the crystal oscillator has a nominal frequency around 26.14 MHz, which can optionally be adjustable (e.g., via signal FREQ. TRIM). The oscillator can be a crystal-type oscillator, or any other oscillator that has a substantially stable oscillation frequency.

The timing control circuit includes a feedback control loop with an optional divider circuit that is arranged to synthesize a frequency. The control loop includes a phase detector, a low pass filter (LPF), a voltage controlled oscillator (VCO), and an optional divider circuit. The phase ($\phi_1$) of the reference clock signal (e.g., $CLOCK_{REF}$) is compared to a phase ($\phi_2$) from a feedback signal (e.g., CLOCK') by the phase detector to determine if the resulting clocks signal (CLOCK) is operating in phase with the reference clock ($CLOCK_{REF}$). The output of the phase detector corresponds to a phase difference signal ($\phi_{DIFF}$), which is provided to the low pass filter to generate a control voltage (VTUNE) for the VCO. The VCO adjusts the output frequency of clock signals CLKP and CLKN, which are out of phase with one another by 180 degrees. The feedback signal (CLOCK) is also provided from the VCO to the optional divider circuit. The output of the divider circuit is provided to the phase detector as signal CLOCK', which closes the control loop. Moreover, the VCO frequency can optionally be provided to another divider circuit, which generates synthesized frequencies that are associated with a sine and cosine function.

In one example, the VCO has a nominal output frequency of 1.83 GHz, the feedback loop divider circuit has a divide ratio of 70, and the phase detector is arranged to adjust the VTUNE signal via the low pass filter such that the average value of the 26.14 MHz signal is matched to 1.83 GHz/70. Other reference signals can be employed to yield the same result by adjusting the divider ratio in the control loop divider circuit. Moreover, the output of the VCO can be further adjusted by the output divider circuit (e.g., divide ratio of 2) to yield synthesized frequencies corresponding to SIN(915 MHZ) and COS(915 MHZ) or any other desired frequency.

The pattern generator includes a code control block and a pseudo-noise generator block. The code control block is arranged to provide the pre-determined patterns, keyed from an ID Code, for "A", "B", and "C" sequenced patterns as will be described later. The pseudo-noise generator generates complex numbers (e.g., I and Q) from the codes based on the timing signals (pattern timing) for sequencing the pattern. In one example, the pseudo noise generator block is arranged to provide 2047 complex numbers. The complex sequence (I and Q) is provided to an interpolation filter and timing control block, which is arranged to adjust the fine timing associated with the I and Q signals, and provides I' and Q', which are associated with a complex interpolated baseband signal. An integrator circuit is used to integrate the difference between the transmitted and received frequencies to adjust the fine timing (fine timing adjust). The interpolator provides fine timing adjustment for the I and Q complex numbers (e.g., 8192/2047), and provides low-pass filtering for the transmitter. The integrator circuit can be initialized by an initialization parameter such as $f_{INIT}$ and/or $\phi_{INIT}$.

The interpolated complex baseband signals (I' and Q') are provided to the cordic rotator. The cordic rotator adjusts the rotational phase of the complex baseband signals (in the digital domain) in response to a phase adjustment signal (e.g., rotation phase). The phase adjustment signal is provided by another integrator that integrates the frequency offset. The integrator circuit can again be initialized by an initialization parameter such as $f_{INIT}$ and/or $\phi_{INIT}$. The output of the complex cordic rotator is a frequency shifted complex baseband signal (I" and Q"), where the frequency shifting is undertaken by the digital synthesis operations by the interpolation filter and the cordic rotator.

The complex modulator is arranged to receive the frequency shifted complex baseband signals (I" and Q"), and the sine and cosine timing signals to provide a modulated signal output. The modulated signal output can be provided to a power amplifier (not shown) that is coupled to an antenna for transmission of the modulated signal. The various timing control signals (e.g., clock frequency, clock phase, clock offset) are adjusted such that the rate, fine-timing, and phase of the modulated signal output has sufficient timing information embedded in the resulting signal.

The code control is based on a unique identifier (ID Code). In one example, the unique identifier is provided to a polynomial generator. In another example, the unique identifier is stored in a volatile memory. In yet another example, the unique identifier is stored in a non-volatile storage such as a flash memory device, a ROM, an EPROM, an EEPROM, a dip-switch, or some other means. In still another example, the pattern that was created with the ID code is stored in a memory device or a look-up table instead of the unique identifier.

Example Transmission Sequence

Figure 8:
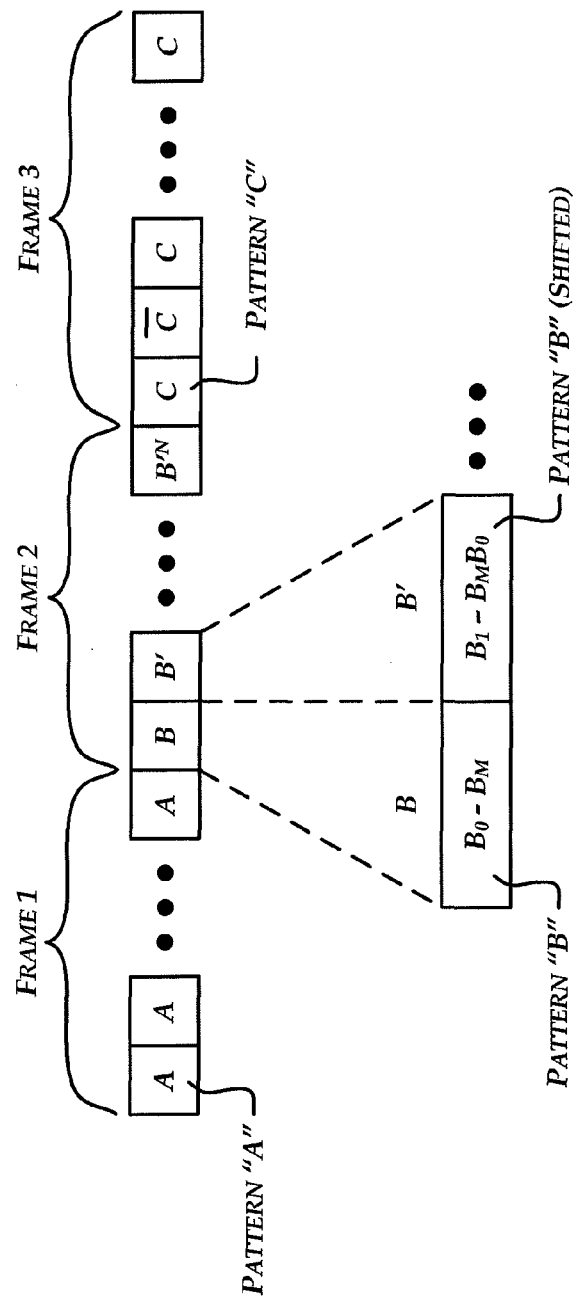
FIG. 8 is a diagram illustrating a set of frames formatted for transmission.

FIG. 8 is a diagram illustrating a set of frames formatted for transmission. A frame corresponds to a time-period for which a sequence is transmitted. For the example of FIG. 8, transmissions are broken into three sequential frames. During a first time-period, a first frame (i.e., "frame 1") is transmitted that consists of a first transmission sequence (i.e., "sequence A"). Sequence A consists of a repeated set of patterns that are in a sequential series, where each pattern (pattern A) is substantially identical. During a second time-period, a second frame (i.e., "frame 2") is transmitted that consists of a second transmission sequence (i.e., "sequence B"). Sequence B consists of a repeated set of patterns that are in a sequential series, where each subsequent pattern in the sequence is shifted as will be described later. During a third time-period, a third frame (i.e., "frame 3") is transmitted that consists of a third transmission sequence (i.e., "sequence C"). Sequence C consists of a repeated set of patterns, where each pattern (pattern "C") forms part of an encoded message as will be described later. The collection of the three sequential frames in a transmission is referred to as a PING as will be described later.

Each MT in the system has a unique identifier (e.g., an M-bit address) that is used to uniquely designate a specific MT. In one example, the unique identifier is a 33-bit address code that yields approximately 8.58 billion unique identifiers. The M-bit address can be dispersed over the various patterns. In one example, a 33 bit code is evenly dispersed over the three sequences such that 11-bits are coded in "sequence A", 11-bits are coded in "sequence B", and 11-bits are coded in "sequence C". In another example, the codes are not evenly dispersed over the transmission sequence. In still another example, the same code is used for each of the patterns. Each symbol that is transmitted is thus encoded according to the respective coding bits for the corresponding sequence portion. The terms "baud" and "chip" can also be used to refer to symbols.

The correlation of sequence "A" is used to verify that the first portion (e.g., the first 11-bits or bits 0-10) of the unique identifier is coded in the transmission. When a correlation is detected, fine baud and carrier timing can be derived. However, the MT has no prior timing information (e.g., no gross frame timing is known). Since the "A" pattern is repeated over the first-time interval, it is possible to accumulate the signals by adding them on top of one another before correlation is performed such that signal sensitivity is improved. In one example MT, the accumulation of signals is unnecessary. In another example MT, the accumulation of signals is performed during a repetitive tracking mode.

Once the "A" pattern has been acquired, the MT continues sampling to locate the "B" sequence. The correlation of sequence "B" is used to verify that the second portion (e.g., e.g., the second 11-bits or bits 11-21) of the unique identifier is coded in the transmission. As previously described, the "B" sequence is shifted over time. For example, a first B sequence includes coded bauds B0, B1 . . . BM, while the second B sequence (B') includes coded bauds B1, B2 . . . BM, B0. When correlation is achieved with the MT's "B" sequence, the MT identifies a stream position within the "B" sequence. Once the transmission stream position is determined from the shift pattern, the MT schedules the reception of sequence "C", whose arrival can now be predicted.

For the above described "B" sequencing example, a single baud shift is used between subsequent transmissions. Other shifting methods can be used such that the step size for shifting between subsequent transmissions can be a different integer number of baud shifts (e.g., 2, 3, 4, etc.) or a non-integer number of baud shifts (e.g., ½ baud, ¾ baud, 1½ baud, 2¼ baud, etc.), or a shift in samples of either an integer or non-integer variety. In another example, the shifting mechanisms between subsequent transmission can be replaced by a carrier phase rotation, where each subsequent transmission has the carrier phase rotated by a fixed amount.

Frame "C" has a third portion of the unique identifier encoded therein, and possible command and control data for the MT (or other data for the RL). The correlation of sequence "C" is used to verify the third portion (e.g., the third 11-bits or bits 22-33) of the unique identifier is coded in the transmission. The "C" sequence can also be very slowly modulated with a few bits of data. For example, up to 63 bits of data and error correction code (ECC) can be transferred in sequence "C". In one example, the chips or transmit symbols are encoded by inverting or not-inverting patterns of "C" in the transmission frame. Examples of coded command and control information were previously described above.

For the above described "C" sequence, data is encoded using an inverting and non-inverting encoding method. Other data encoding methods can be used such as encoding the data with a shifting bit pattern similar to the "B" sequence. For example, a "000" binary code can be encoded, and each increment in the binary code is the same pattern shifted by an incremental shift step (e.g., ½ baud step, 1 baud step, 2 baud step, etc.). The data message nominally in "C" can be encoded with a pattern timing changes as in the nominal section "B" previously described.

The MT transmits sequences A and B in substantially the same format as that described above. However, since the RL initiated the transmission and does not have a "wake-up" period creating an ambiguity in when reception begins, the transmission sequence from the MT can be shorter overall. The shortened transmission period helps minimize the MT's energy consumption. Frame "C" is similarly formatted, but may include other reported data such as: current temperature, heart rate, blood pressure, etc.

The timing and carrier signals for transmission in the MT are derived from the RL's synthesized clock as measured against the internal MT clock. The RL in turn correlates these signals, similar to the MT, and determines the exact round-trip time. The RL also determines deviations in the signal timing with respect to its own clock, which the MT attempted to mimic. The deviation in the signal timing is a consequence of Doppler shift, noise, and oscillator instability.

An example system has the following general information:
Received Frame consists of 4096 samples, 2047 baud;
Received Sample Rate is 25.777M complex samples/sec;
Transmitted Sample Rate is 2*25.777M complex samples/sec;
Baud Rate is determined by Sample Rate*(2047/2048)/2=12.8822 Mbaud symbols/sec, QPSK; and
Frame Period is 158.98 μs.
An example system has the following RL TX parameters:
"A" sequence is 2.2263 seconds long, (13×1024 frames), repeated un-shifted with one of 2047 first address portions;
"B" sequence is 317.96 ms long (2000 frames), repeated shifted with one of 2047 second address portions; and
"C" sequence is 10.174 ms long (64 frames), repeated un-shifted with one of 2047 third address portions, frames inverted according to modulated data.
An example system has the following MT TX parameters:
"A" sequence is 81.397 ms long, (512 frames);
"B" sequence is 20.349 ms long (128 frames); and
"C" sequence is 10.174 ms long (64 frames), repeated un-shifted with one of 2047 third address portions, frames inverted according to modulated data.

Example Timing Acquisition Sequence

Figure 9A:
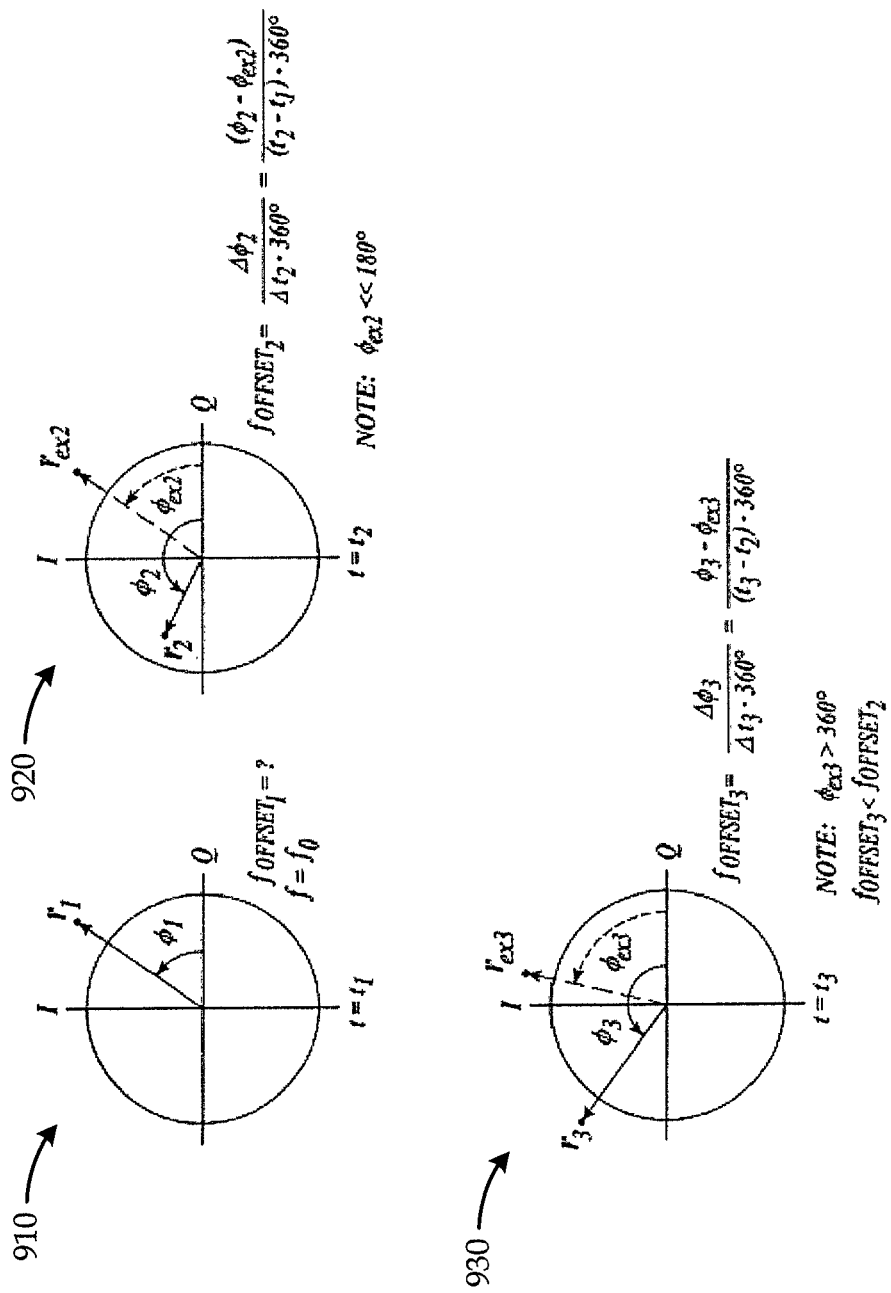
FIGS. 9A and 9B are diagrams illustrating the timing acquisition for an example communication system.
Figure 9B:
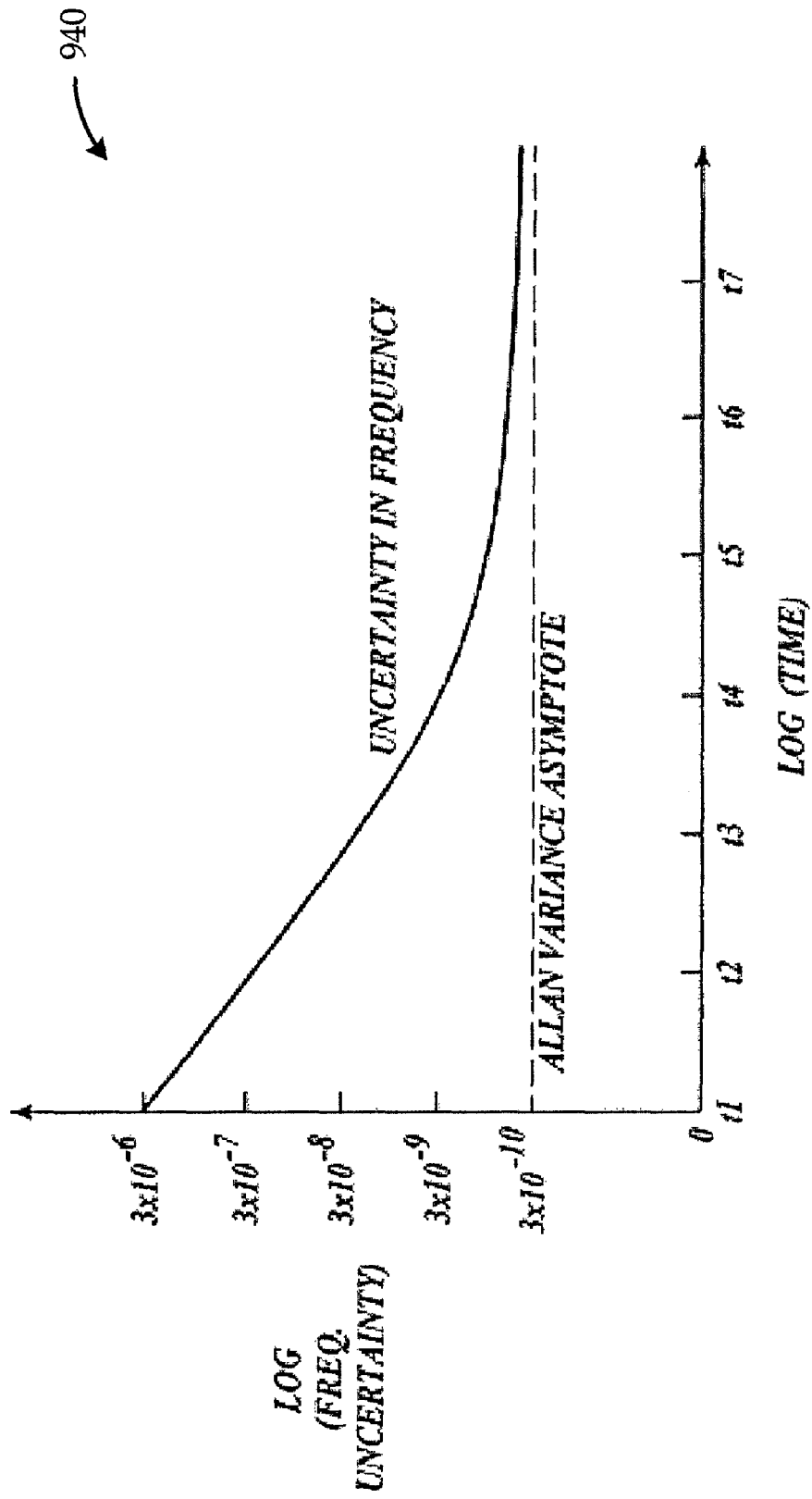

FIGS. 9A and 9B are diagrams illustrating the timing acquisition for an example communication system. The described timing acquisition sequence may be employed by the MT when receiving the three-part transmission sequence described previously with respect to FIGS. 1A, 1B, 2 and 3. However, as described herein, the timing acquisition sequence can be accomplished with only two of the three portions of the transmission sequence (e.g., sequence A and sequence B).

The receiver frequency is digitally synthesized from a locally generated clock circuit (e.g., a crystal oscillator). The carrier wave from the RL is also digitally synthesized from its own locally generated clocking circuits, and will likely be mismatched from the receiver frequency in the MT. The mismatch may be related to thermal differences in the operating environment, heat transients in the circuits, crystal tolerances, processing differences between the MT and the RL, as well as other non-ideal effects. Moreover, the overall system is not synchronized so there is no way to initially know the starting phase, frequency and cadence associated with the transmissions. FIG. 9A illustrates examples of phase and frequency determinations associated with an example "pattern A" sequence, while FIG. 9B illustrates the uncertainty in the receiver frequency over time during the timing acquisition.

The receiver portion of the communication system is initialized at time $t_1$ to an initial frequency (f) that is designated as $f=f_0$. However, the offset between the digitally synthesized receiver frequency and the carrier frequency from the received transmission is unknown at time $t = t_1$. The MT is arranged to measure the phase associated with the received signals from pattern A as phase $\phi_1$. The phase measurement (e.g., $\phi_1$) can be generated by an output of the correlator.

At time $t=t_2$, another portion of the transmission of pattern A is received, and the MT is arranged to measure the phase as $\phi_2$, and calculate a frequency offset error associated with the difference between the expected receiver frequency and the actual carrier wave from the RL's transmission. The frequency offset ($f_{offset2}$) is determined by the difference in the phases and the elapsed time between transmissions as: $f_{offset2}=[\phi_2-\phi_{ex2}]/[360(t_2-t_1)]$, where $\phi_{ex2}$ corresponds to the expected phase at time $t_2$. It is important to note that the time between the first two measurements should be short enough to result in an expected relative phase difference of substantially less than 180 degrees to ensure that unresolveable ambiguities do not occur. Notice that the expected phase for this time corresponds to $\phi_1$.

At time $t=t_3$, another portion of the transmission of pattern A is received, and the MT is arranged to measure the phase as $\phi_3$, and calculate a frequency offset error associated with the difference between the expected receiver frequency and the actual carrier wave from the RL's transmission. The frequency offset ($f_{offset3}$) is determined by the difference in the phases and the elapsed time between transmissions as: $f_{offset2}=[\phi_3-\phi_{ex3}]/[360(t_3-t_2)]$, where $\phi_{ex3}$ corresponds to the expected phase at time $t_3$. It is important to note that the elapsed time for the first two measurements should again result in an expected relative phase difference of substantially less than 180 degrees to ensure that unresolveable ambiguities do not occur. However, the absolute phase difference is expected to be significantly larger than 360 degrees such that the time difference between successive offset calculations can be gradually spaced further and further apart as the timing acquisition is adjusted by each subsequent estimate. Notice that the frequency error is gradually reduced with each subsequent adjustment until limited by the Allan Variance.

FIG. 9B is a graph illustrating the uncertainty in the digitally synthesized receiver frequency over an elapsed timing acquisition period. Note that the scale for both axes is logarithmic, and that the uncertainty will asymptotically approach the Allan Variance associated with the crystal oscillators in the MT and the RL. The horizontal axis illustrates elapsed time, while the vertical axis illustrates the uncertainty in the frequency. Each successive time period has a refined estimate of the receiver timing such that the uncertainty decreases in an exponential fashion. A knee in the uncertainty curve occurs after sufficient samples of the received signal are acquired (e.g., at time $t_5$) such that estimates for the received carrier wave frequency asymptotically approach a minimum uncertainty that is determined by the Allan variance.

Example Receiver

Figure 10A:
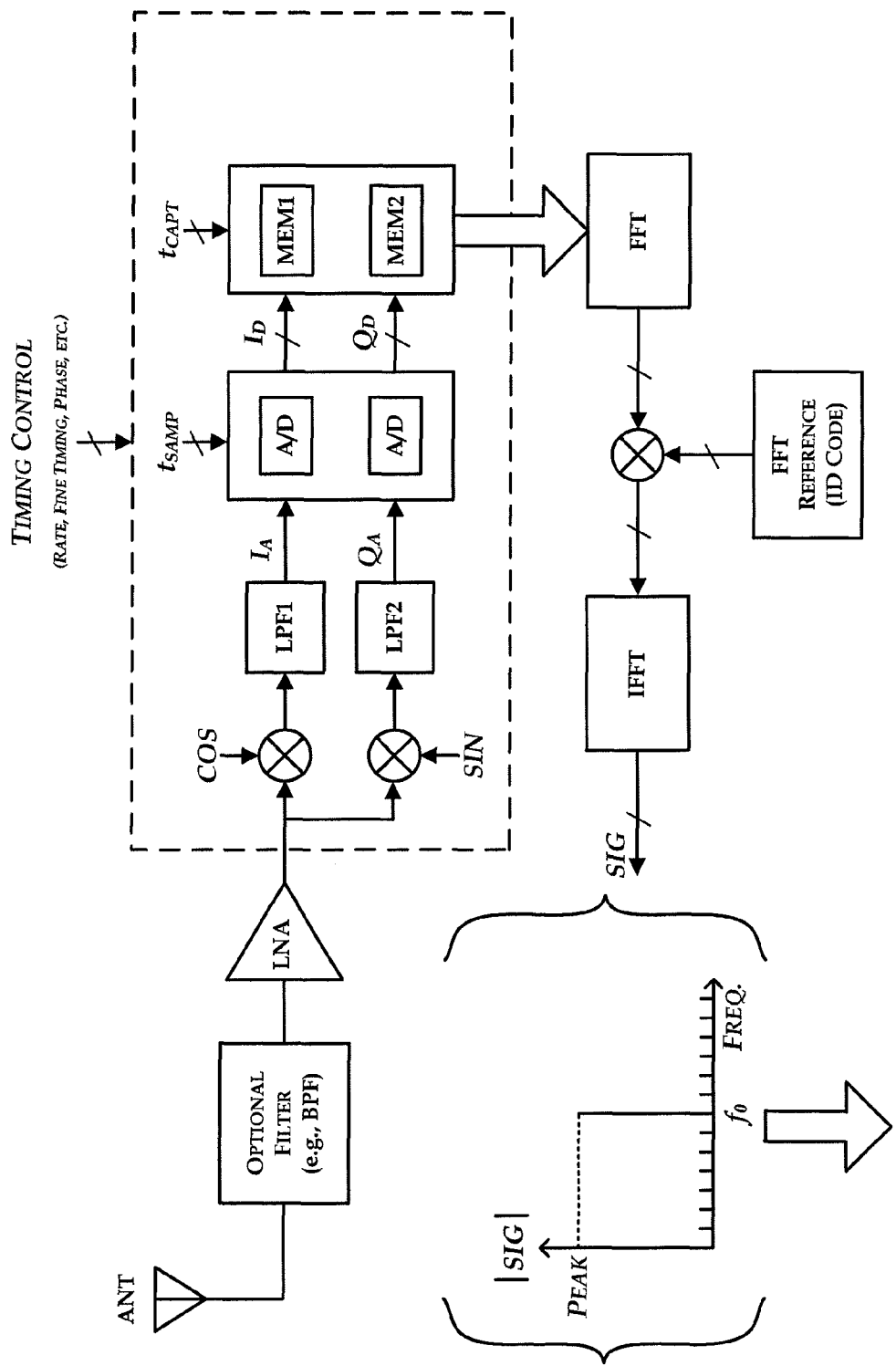
FIGS. 10A-10B are example diagrams for example receivers.

FIG. 10A is a block diagram for an example receiver. The example receiver includes an antenna (ANT), an optional filter, a low noise amplifier (LNA), a first mixer, a second mixer, a first low pass filter (LPF1), a second low pass filter (LPF2), an analog-to-digital converter (ADC), a buffer, an FFT processor, a correlator, and an inverse FFT processor. Other example receivers can use an analog storage method and perform a delayed A/D conversion.

The antenna is arranged to couple received signals to the LNA through the optional filter (e.g., a band-pass filter). The LNA is arranged to increase signal strength, and couple the increased signal to the mixers. The first mixer is arranged to generate an in-phase signal (I) with a cosine wave heterodyne, while the second mixer is arranged to generate quadrature signal (Q) with a sine wave heterodyne. The in-phase signal is coupled to the ADC via LPF1 as signal $I_A$, while the quadrature-phase signal is coupled to the ADC via LPF2 as signal $Q_A$.

The ADC is operated at a sampling frequency ($f_{SAM}$). The ADC can be implemented as a single A/D converter circuit with time division multiplexing between the $I_A$ and $Q_A$ signals. The ADC can alternatively be implemented as two separate A/D converter circuits. The ADC circuits convert the $I_A$ and $Q_A$ signals to quantized digital signals that are coupled to the buffer as signals $I_D$ and $Q_D$, respectively. The buffer can be implemented as one contiguous memory, as partitioned memory (e.g., MEM1, MEM2, etc.), or any other appropriate temporary storage that buffers the captured data.

The output of the buffer is coupled to the FFT processor, which converts the input signal to the frequency domain. The FFT of the reference signal is complex conjugate multiplied with the frequency domain representation of the captured signal. An inverse FFT of the product is taken, which is the circular correlation of the captured signal and the selected reference signal. Since the FFT reference is determined from the unique identifier of a MT (e.g., ID Code), the correlation of the FFT processor output will peak when a valid received code is identified in the signal. The carrier phase and pattern timing are also extracted from the received signals.

Figure 10B:
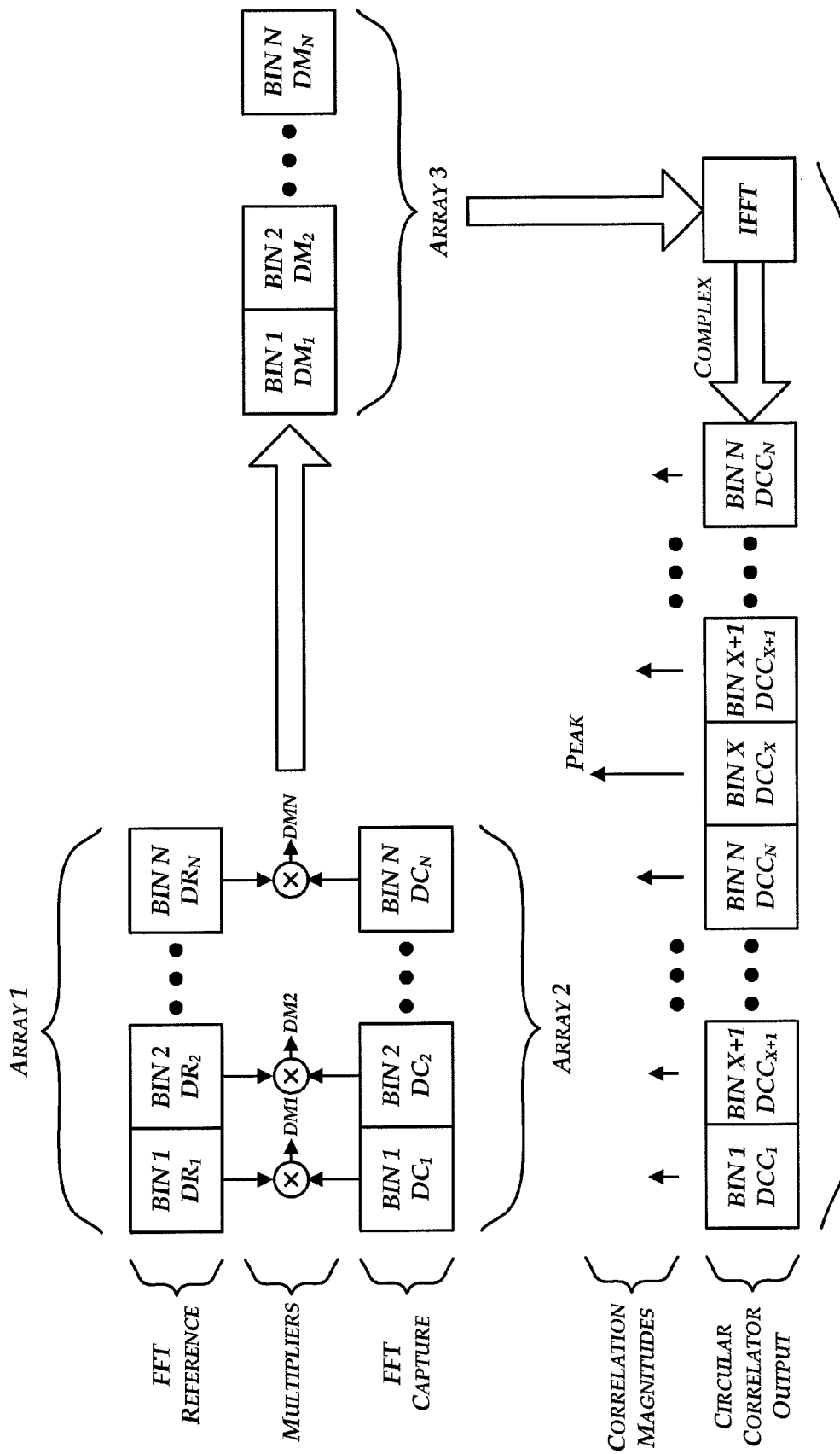

FIG. 10B illustrates operations in a receiver that may be performed as a DSP block. The FFT reference signal is provided as an array of N-bins. The captured signal is calculated as an FFT, also of N bins. Next, the complex conjugate of each complex element in a designated storage bin (BIN 1-BIN N) is multiplied by the data from the other corresponding storage bin. For example, the complex conjugate of the FFT reference signal is stored in a first array (ARRAY 1) as $D_{R1}$-$D_{RN}$, and the FFT capture data is stored in a second array (ARRAY 2) as $D_{C1}$-$D_{CN}$. In another example, the FFT reference signal is stored in the first array (ARRAY 1) as $D_{R1}$-$D_{RN}$, and the complex conjugate of the FFT capture data is stored in the second array (ARRAY 2) as $D_{C1}$-$D_{CN}$.

The multipliers are arranged to receive data from the first array and the second array to provide a multiplied output, yielding a product result that can be stored in a third array (ARRAY 3) as $D_{M1}$-$D_{MN}$. An inverse FFT is computed from the product identified in the third array (ARRAY 3), to retrieve the circular correlator output. The circular correlator output results can be stored in a fourth array (ARRAY 4), or can optionally overwrite the values from the third array (ARRAY 3). The contents of the fourth array (ARRAY 4), or the third array depending on the implementation, are a complex result that includes both magnitudes and phases. As illustrated in FIG. 5B, the inverse FFT of the circular correlator output has a peak magnitude (PEAK) that occurs when the FFT reference ad the captured data correlate with one another. Each bin (BIN1-BIN N) of the third array (ARRAY 3), or fourth array depending on the implementation, corresponds to the output of the correlator, wherein a PEAK may be located in one of the bins (e.g., BINX), when a correlation occurs.

Example Operational Flows for Transmission and Reception

Figure 11:
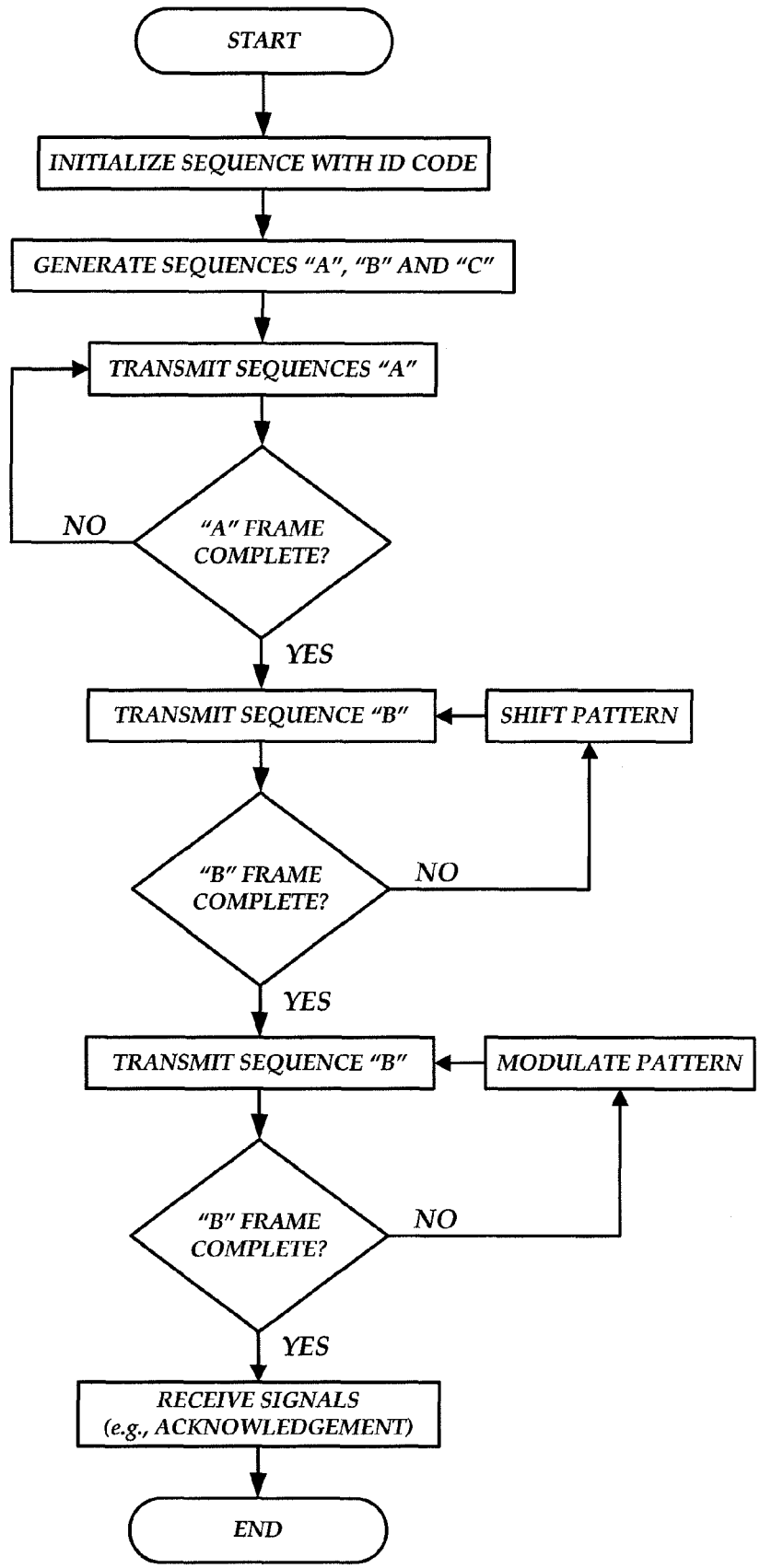
FIG. 11 is a flow-chart for an example transmitter.

FIG. 11 is a flow chart for an example transmitter configuration in either a MT or a RL. Processing begins when a user, or some other process, initiates a request to locate a particular MT.

A transmission sequence is initialized with a unique identifier (ID Code). Sequences are generated for frame transmission such as sequence "A", "B", and "C" as previously described. Each of the "A", "B", and "C" sequences consists of bauds that are encoded with a portion of the unique code.

Next, the RL (or MT) then begins transmitting pattern "A", and repeats transmitting pattern "A" (Note: un-shifted) until the entire "A" sequence is completed (e.g., 13×1024 sequential patterns, or frame "A"). The RL then begins transmitting pattern "B". For each subsequent transmission of pattern "B", the pattern is shifted such as using a bit rotation algorithm, as previously described. After the entire sequence of "B" patterns is transmitted (e.g., 2000 sequential patterns, or frame "B"), the RL begins transmitting the "C" pattern. The sequence of "C" patterns includes modulated data that may correspond to command and control information for the MT. After the modulated data is transmitted (e.g., 64 sequential pattern, or frame "C"), the RL stops transmitting and switches into a receive mode.

In the receive mode, signals are received from the MT with the RL in a similar format as provided between the RL and the MT. The RL can then calculate a distance and location based on the round-trip time and Doppler shift in the received signals as previously described. Moreover, the received "C" frame transmission may include data that is communicated between the MT and the RL, which is extracted and evaluated by the RL. Such data may include: physiological information such as heart rate, body temperature, blood pressure, heart rhythm, blood-sugar level, as well as other sensory information that is associated with a user of the MT.

Figure 12A:
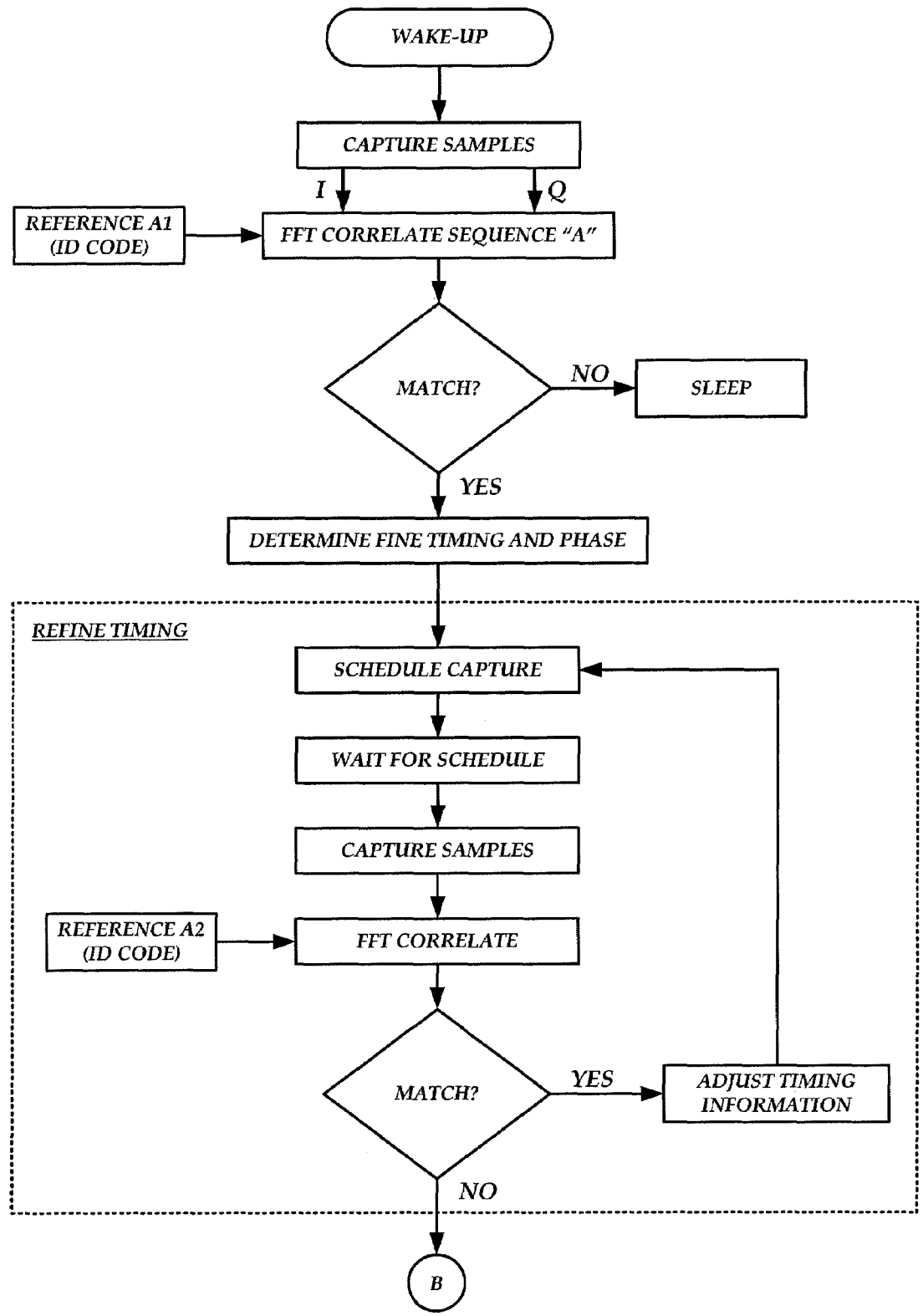
FIGS. 12A-12B, 13A-13B, and 14 are flow-charts for example receivers.
Figure 12B:
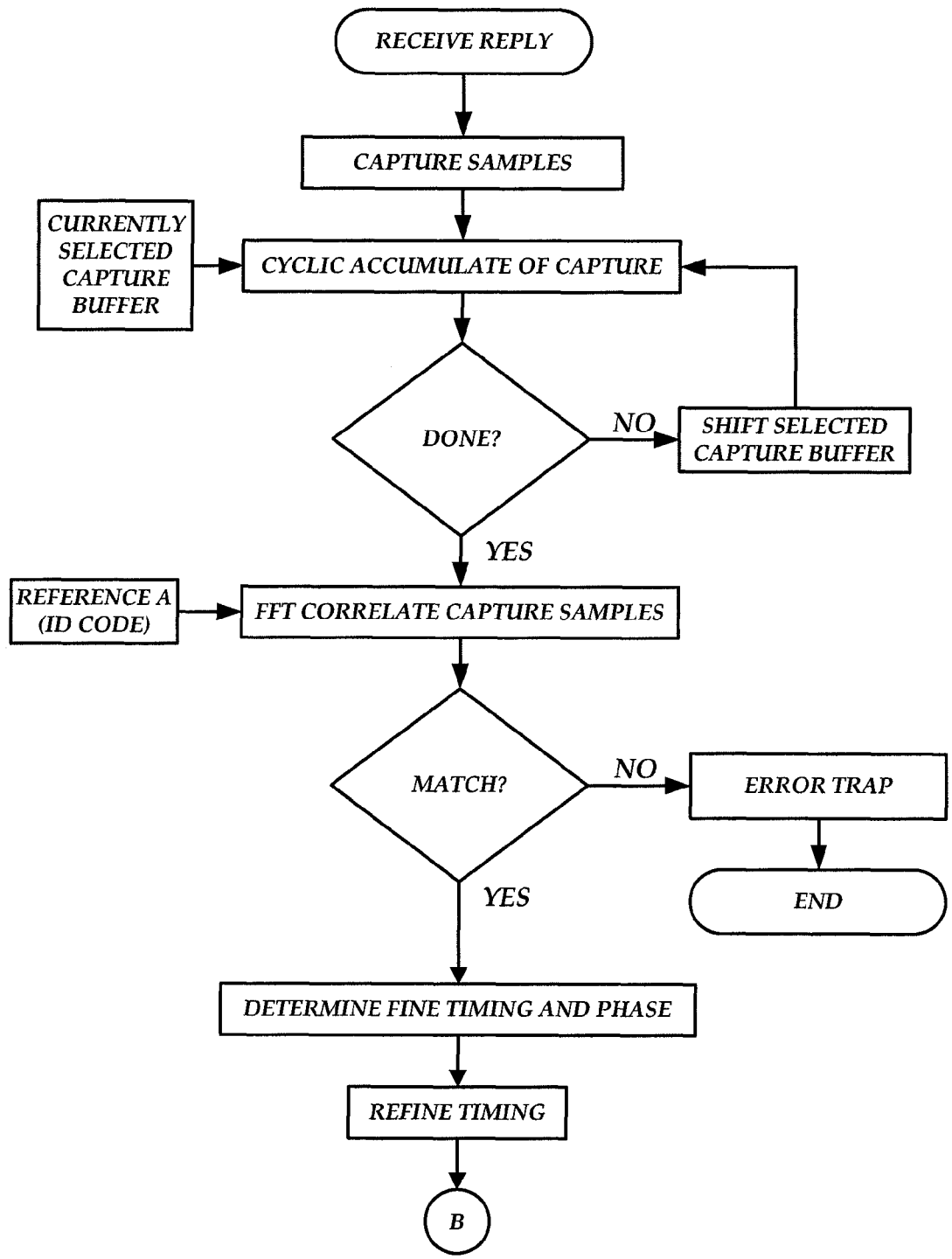

FIG. 12A is an example flow chart for an example receiver in a MT. Processing begins when the MT is activated out of a sleep mode (e.g., WAKE-UP is initiated). FIG. 12A illustrates the capture of samples associated with sequence "A" (or frame "A"). After wake-up is initiated, the receiver captures noise and/or signals. The MT will attempt to correlate the captured noise and/or signals with the first portion of the unique identifier for the specific MT. When the correlation fails to match, the MT determines that the transmission is intended for another device, or possibly that no transmission is present, and returns to a sleep mode. Alternatively, the MT extracts baud and carrier timing information from the transmission sequence to refine the receiver timings.

Timing is refined by repeatedly scheduling capture intervals. The receiver waits, and then begins capturing a portion of the samples from each scheduled capture time, and attempts to correlate the captured samples with another portion of the reference that is keyed to the code for the MT. Each time the correlation indicates a match, the timing for the receiver is adjusted (bootstrap RL) to further refine the time/frequency estimates. Eventually, the correlation of pattern A fails to match the coded reference and processing continues to capture and evaluate pattern B as will be described with respect to FIG. 13A.

FIG. 7B illustrates the capture of samples associated with sequence "A" (or frame "A") in a receiver of an example RL device. Since the MT has limited power available for transmission, the signal may be considerably weaker than that from the RL. After wake-up is initiated by the RL, the receiver captures noise and/or signals. The RL will continue to capture the transmission for a predetermined time interval and accumulate values using a cyclic accumulation capture technique (e.g., an array of capture buffers that are cyclically selected in sequence). For each subsequent capture, the selected capture buffer is changed based on the time. Also, an accelerometer is used to measure the speed of the RL device for estimating time for reception, etc.

After the predetermined time interval expires; the RL attempts to FFT correlate the accumulated/captured signals and noise with the first portion of the unique identifier for the specific RL. The accumulation of the captured patterns over the sequence using the described cyclic accumulation improves the signal levels and minimizes the impact of noise on the reception. When the correlation fails to identify a match, the RL determines that the transmission is intended for another device, that no transmission is present, or that an error has occurred, and returns to a sleep mode. Alternatively, the RL fine timing and phase information from the transmission sequence is used to refine the receiver timings for the RL. Processing then continues to capture and evaluate pattern B as will be described with respect to FIG. 13B.

Figure 13A:
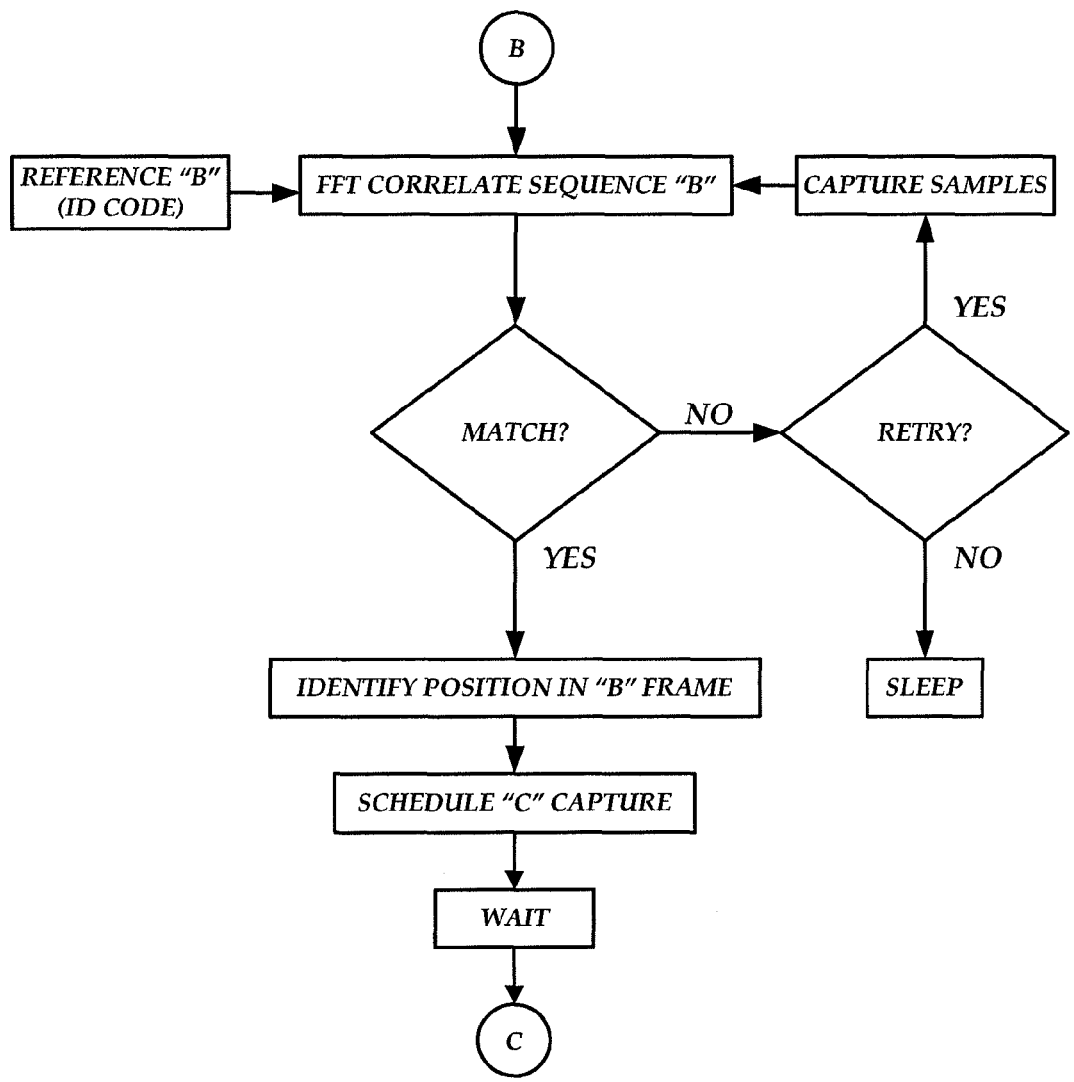

FIG. 13A illustrates the capture of samples associated with pattern "B" in a MT device. The receiver captures a sequence of samples, assuming those samples correspond to sequence "B". The MT will attempt to FFT correlate the captured samples with the second portion of the unique identifier for the specific MT. When the correlation fails to identify a match, the MT may determine that the signal sequence is intended for another device. During a processing time interval, the expected B sequence is shifted and captured, and FFT correlation determinations then follow. When the processing time interval completes without a match of sequence "B", the MT determines that the transmission is intended for another MT or that there is no transmission to receive and returns to a sleep mode. Alternatively, if the MT finds a match for sequence "B", then the MT determines the relative position of the matched pattern within the sequence (or within the frame) based on the shift position that yields a match. Since the timing, phase, and frequency information are now known, the MT schedules reception of the "C" sequence. Processing continues for the MT in FIG. 14, which follows further below.

Figure 13B:
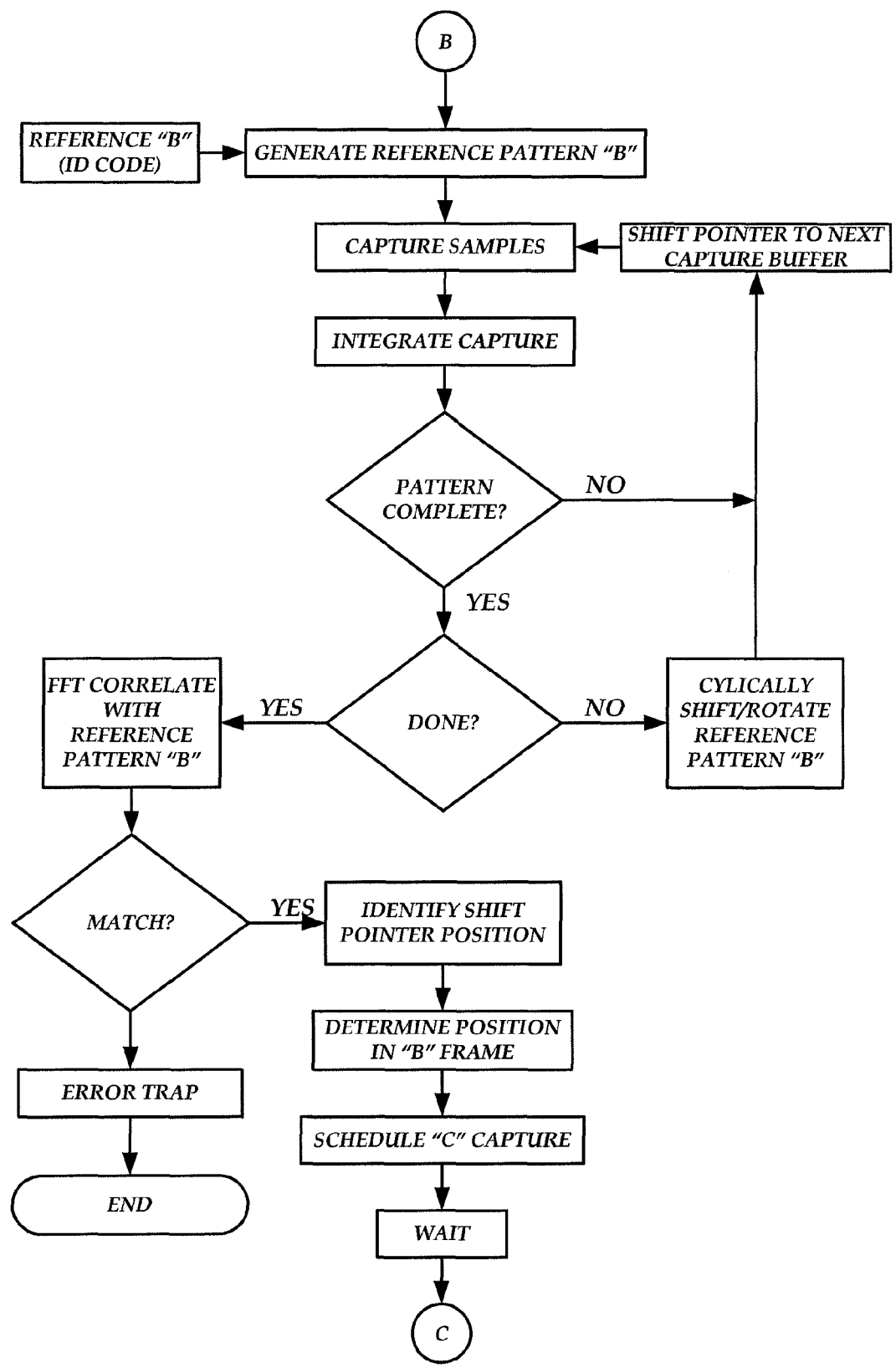

FIG. 13B illustrates the capture of samples associated with pattern "B" in a RL device. The receiver captures a sequence of complex samples (e.g., 4096 complex samples), assuming those samples correspond to sequence "B" using a cyclic accumulation/integration technique that is similar to that previously described for FIG. 7B. A reference pattern associated with pattern "B" is generated. Each received sample is captured and placed in a respective one of a series of buffers, where each buffer has an associated index such as a pointer. Each subsequently captured sample is placed in a different capture buffer (e.g., a capacitive storage cell).

As previously described with respect to the MT, sequence "B" is transmitted multiple times for receipt by the RL, where each subsequent "B" sequence is cyclically rotated with respect to the preceding sequence (e.g., see FIG. 3). As time moves forward a different capture buffer is used as the starting point for capturing a sequence by the RL. For example, assuming a 4096 complex sample pattern with a starting pointer to capture buffer 0, captures will be placed in buffers 0-4095 in sequence. After the first "B" sequence is captured, the next pattern "B" sequence will have a starting point for capture buffer 2, and captures are placed in buffers 2-4094 sequentially followed by capture buffers 0 and 1. Each buffer can be an analog storage cell so that samples from the first pattern are accumulated with the samples from the second pattern using the described method. After numerous accumulations of additional patterns, integration is completed and the accumulated signal can be evaluated.

After all of the samples for pattern sequence "B" (e.g., 4096 complex samples from a sequence of pattern "B") are received (i.e., "pattern complete") and accumulated, the RL will attempt to FFT correlate the integrated captured sequence with the previously generated pattern for pattern "B". When the FFT correlation fails to identify a match, the RL falls into an error trap. Processing a received sequence may expire without match when the transmission is intended for another MT, or perhaps when an error has occurred. An error trap handles the remaining processing when an error occurs.

When the RL finds a correlation match for the generated pattern "B", the RL can then determine the relative position of the matched pattern within the sequence (or within the frame) based on the shift position in the pattern that yields a match. Since the timing, phase, and frequency information are now known, the RL schedules to receive the "C" sequence. Processing continues for the RL in FIG. 9, which follows below.

In some examples systems the "B" sequence is sampled four times at the transmitter, with each sequence step being four samples. For this example, the receiver samples at half the transmit rate so that each shift in the pattern corresponds to two buffer locations. In other words, the starting point for each "B" sequence capture for this example always corresponds to an even numbered buffer (e.g., 0, 2, 4 . . . ). The RL can then determine the relative position of the matched pattern within the sequence or frame by evaluating the starting point index to the buffer or sample bin that matches or correlates to the expected pattern.

Figure 14:
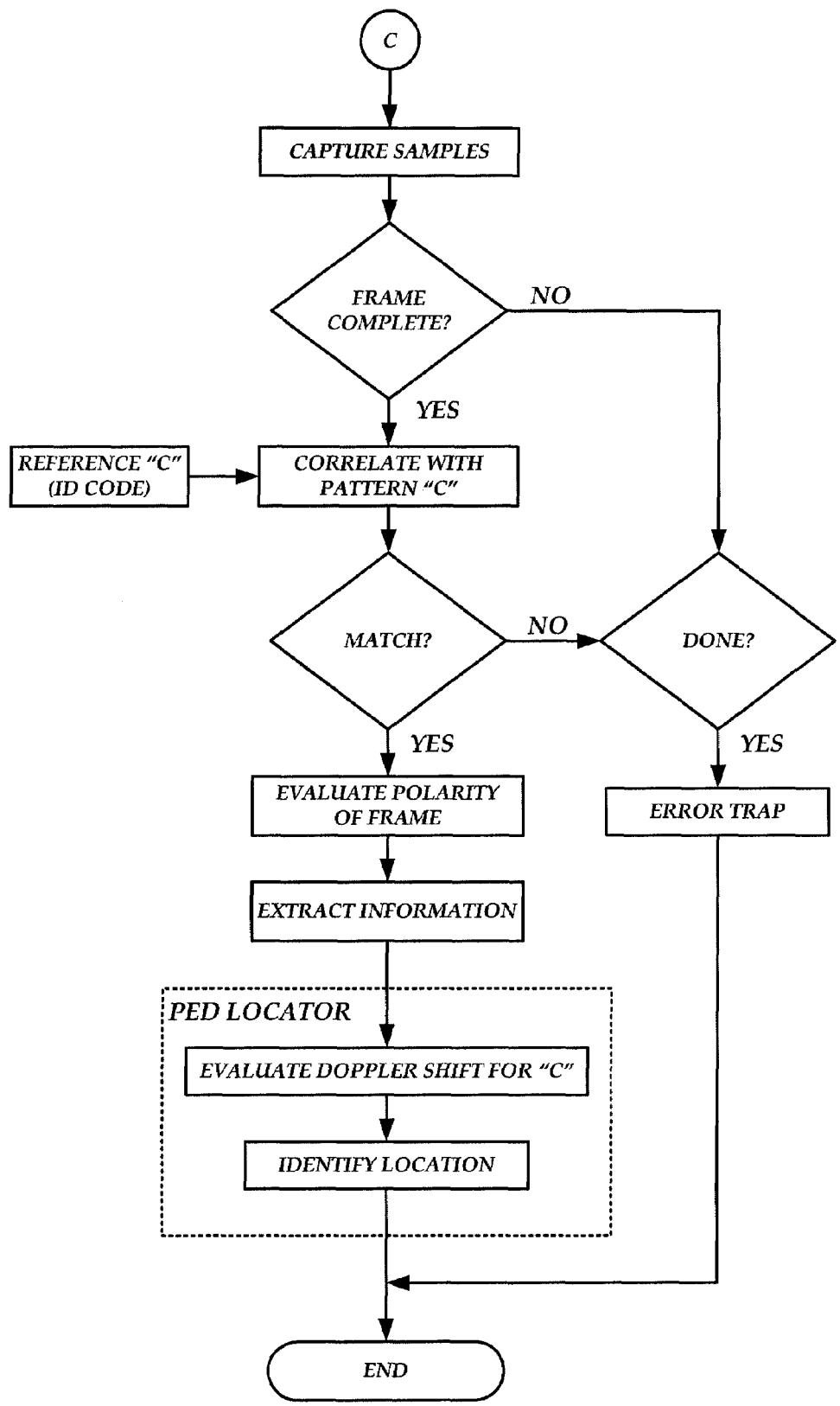
Figure 15A:
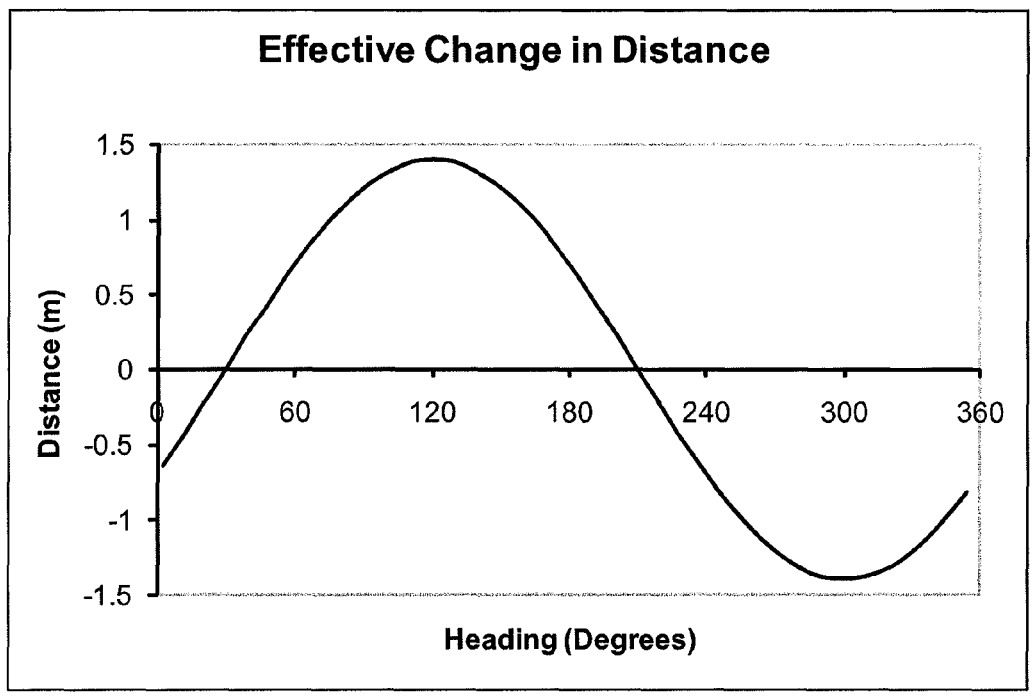
FIG. 15A is an example graph for effective change in distance during a rotation through 360 degrees.
Figure 15B:
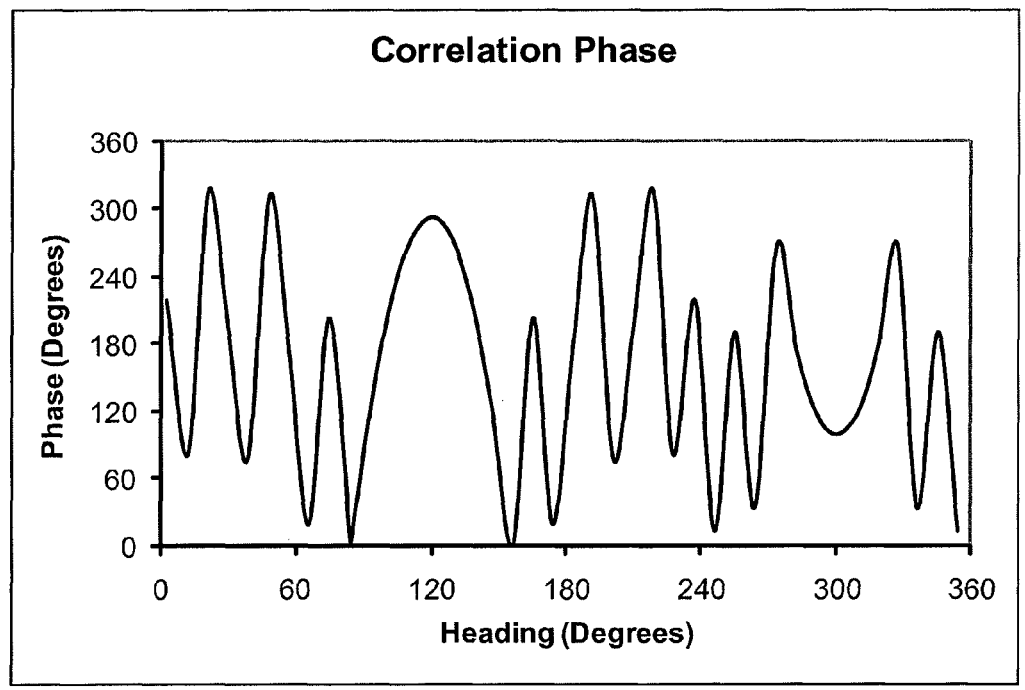
FIG. 15B is an example graphs for correlation phase information from a rotation through 360 degrees.

FIG. 14 illustrates the capture of samples associated with sequence "C". The receiver captures samples from the receiver in the MT, assuming those symbols correspond to pattern "C". The MT will continue to capture samples until the frame is expected to reach completion. The MT will then attempt to correlate the captured sequence (assuming it is sequence "C" from the RL) with the third portion of the unique identifier for the specific MT. When the correlation fails to achieve a sufficient level for detecting a match, we can assume as a formality that the transmission of the "C"

sequence has failed for any number of reasons (excessive noise in the environment, a high strength interfering signal, etc.) Since we know precisely when transmission of sequence "C" should occur, and what carrier frequency, phase, timing, and cadence for which transmission should occur, the receipt of the "C" pattern can be used formalistically for verification of a valid transmission.

Sequence "C" includes data modulated therein that may be coded with error correcting codes (ECC), where the coded information can be phase modulated and subsequently demodulated and decoded. When the time-period has not expired, capturing of the expected C sequence is resumed, followed by correlation determinations again. When the time-period has expired without a match of sequence "C", the MT determines that the transmission is intended for another and traps an error condition appropriately. Alternatively, the MT finds a match for pattern "C" and evaluates the polarities of the symbols received in this frame, and extracts command and control information from the "C" sequence.

In the case of the MT, the completed capture of sequence C is followed by a transmission of sequences "A", "B", and "C2" (or some other order, perhaps, or even a different set of A'B'C'. Sequences "A" and "B" include a similar pattern as previously described for the RL, although shorter in length. Sequence "C2" is still the same number of frames except that data is encoded into the transmission for communication between the MT and the RL.

In the case of the RL, the completed capture of sequence C is followed by evaluation of the round-trip time to determine linear distance from the RL to the MT. A time difference is evaluated between the reception of two signals that are received from two different receiving antennas to help identify a vector for direction between the RL and the MT. An analysis of a Doppler shift in the received signals from the MT can also be used to assist in the determination of the directional vector. In addition, sequence "C" is evaluated to extract transferred information from the MT to the RL. Moreover, measurements from the compass sensor and can be utilized to assist in determining location as will be described later.

Example Operational Features and Observations

The present disclosure merges "location request" polling with the location process itself. The RL device is arranged to provide a relatively lengthy, powerful, coded signal whose duration spans the polling interval of the MT. The MT very briefly samples the relevant spectrum, and finds a coded spread spectrum signal. In this event, the MT performs multiple signal captures from the lengthy transmission, making successively more accurate estimates of the signals frequency, cadence, and time reference. These estimates are limited in precision by the short-term stability (root Allan variance) of the MT's and RL's time bases (e.g., a quartz crystal oscillator) and by the relative acceleration between the RL and the MT. This Allan variance will typically be better than 1 part per billion, but the acceleration for observation periods of 0.25 seconds may be the order of: 10 meters/sec$^2$ by 0.25 seconds, which would give a 2.5 meter/second Doppler change. This lurch is unusual, and typically, a 0.25 meter/second change or less is observed. A velocity change of 0.25 meter/second round-trip is 0.5 meter/second, which is a Doppler change of 0.5/3*10$^8$, or 1.6 parts per billion (ppb). Thus, the estimates of incoming signal frequency/sequence should have a precision of approximately two (2) parts per billion or better. Experimentally, two (2) ppb has been observed.

The MT can use the precise estimate of the received signal timing to synthesize a coded spread spectrum reply with substantially the same timing and carrier frequency. This reply signal is emitted shortly after the end of the incoming signal. Since the timing is accurately captured, the presence of a delay or gap doesn't materially degrade accuracy. For example, if the time-base error is 2 ppb, then a 30 ms delay translates into a time uncertainty of approximately 60 ps, which is about one centimeter of round trip distance.

The coded reply signal from the MT is sufficiently lengthy so that integration over time compensates for its relatively low power. The signal from the MT can be coherently processed by the RL since the return signal is coherent plus or minus the synthetic round-trip Doppler shift with the RL's time base. A cyclic set of 4096 complex capacitive integrators can be used to perform the process of signal accumulation to raise the weak signals up and out of the noise floor. The complex patterns (e.g., a pattern of length 2047 chips) have approximately 33 db of spreading gain. The addition of the cyclic integrators can achieve an additional 20 db of signal gain with the repetitive portions of the signal, yielding 53 db of total gain. A bandwidth reduction from 26 MHz down to about 100 Hz is achieved with this technique. The thermal noise over the 100 Hz bandwidth is approximately −154 dbm, where reasonable signal reception is expected around a noise level of −140 dbm. A maximum path loss of 150 dB is achieved for a +10 dbm transmitter. The corresponding ideal free space range for this transmitter is approximately 1000 km assuming a 915 MHz signal and omnidirectional antennae. This large free space range or loss margin is useful for building penetration, implanted devices, and so forth.

The capture duration in the MT is limited by the relative crystal frequency tolerance between the MT and the RL. With time and temperature, and taking advantage of periodic calibration signals, this tolerance can be managed to a few parts per million. Thus, the product of the signaling frequency and the crystal tolerance gives a frequency offset, which in turn indicates the maximum possible reception time without the use of multiple Doppler bins or repeated correlation attempts. For example at 915 MHz and with a 3.5 ppm frequency error, a capture period of 312 μs would correspond to a first complete signal null.

The RL will in general receive a signal whose cadence and frequency very closely match its internal crystal clock, and thus the RL can use long cyclic integration times, which greatly increase the available signal to noise ratio. The described coherent integration (or coherent accumulation) process has a signal power maximum when the signal has rotated through 180 degrees at the end of the capture interval. For a 3.5 ppm frequency tolerance, when the period of the spread signal is designed to be about 150 μs. It is advantageous to use a signal which is itself complex. Improved orthogonality between coded signals is achieved by using a complex signal. For example, the Gold codes used in the GPS system have a length of 1023 chips with a cross correlation of approximately −24 db for 1025 possible codes. The complex signaling codes employed in the presently described disclosure is on the order of length 2047 chips, with a cross-correlation of −33 db for 2048 possible codes. The use of complex codes allows for improved signal rejection.

The round trip Doppler shift between slowly moving objects (e.g., people walking) is on the order of 4-5 ppb. Slowly moving objects provide a significantly longer integration time in cases where the received signal is likely to be very close in frequency to the RL's time base. Even automobile speeds will result in a round-trip Doppler-shift of 200 ppb or less.

Optional RL Compass Operation

The described system performs distance measurement by round trip time measurements. According to the present disclosure, an economical solution is available for a remote locator (RL) device that does not require accelerometers or multiple antennas for resolving directional information. A compass sensor can be adapted for use in the RL such that the target direction (the direction towards the MT from the RL) can be continuously displayed despite any relative change in the RL's orientation. Diversity antennas can be used to gain additional information about signal strength, distance and Doppler, etc.

Initially, when the user of the RL seeks to find an MT, a "search" mode is engaged. When the RL receives a satisfactory counter-signal from the MT the RL can determine the distance to the MT and provide an appropriate alert indicator to the user. Alert indicators may include, for example, an audible indicator via the audio output device, a visible indicator via the video output device, or a vibrating indicator.

After the initial search and alert are completed, the user can activate a "locate" mode. In the locate mode, the user holds the RL away from the body approximately at an arms length. The user then moves the RL through at least a portion of an arc or through a complete circular motion that is centered approximately about the user's head) to scan for the MT. During the locate mode, the RL will handshake many times with the MT while acquiring a series of data items such as time of arrival (TOA), and Doppler readings which are interferometric. As the RL is spun in a circular motion, compass readings are also taken. The compass readings are associated with distances and Doppler readings. The distance change associated with the rotation is doubled by the round-trip transit time. In one example, a user may extend the RL away from his body around 70 cm of distance, and the corresponding round-trip time variation is around 280 cm, or about 8 waves at a frequency of 915 Mhz.

An example user rotates the RL at a variety of rates that can range between around 36 degrees/second and 180 degrees/second. The distance measurements that are acquired by the RL will fluctuate based on the RL's relative orientation relative to the MT. In other words, the distance between the RL and the MT is a function of the rotational position of the RL during the circular spin. The distance is also a function of the distance the user extends his arms to hold the RL away from their body during the rotational movement. In one example, the user holds the RL 70 cm away from their body, the compass reading has an initial reading of 84 degrees and the actual target is located at a heading of 120 degrees. For this example, the heading difference between the initial reading and the actual target is 34 degrees, which result in a distance change between the actual target and the user of: $2 \cdot 0.7 \text{ m} \cdot \cos(34°) = 1.1326$ m. As the user continues to rotate about their centerline, the distance to the target continues to change as illustrated by FIG. 10A. When the RL is oriented at the target heading of 120 degrees, the distance change peaks (1.4 m), while the distance change is lowest (−1.4 m) when the RL is oriented at the heading of 300 degrees since the RL is positioned at the furthest point relative to the target (180 degrees away from the target).

The heading from the RL to the MT is unknown until at least a partial rotation is complete and sufficient data is collected of compass readings, distance measurements, and Doppler readings to resolve the proper direction. The correlator in the RL is arranged to generate correlation phase information heading between the target location (the MT) and the RL. The correlation phase information is illustrated by the graph of FIG. 10B, where the correlation phase (Phase) is determined by the following equation: Phase=$360° \cdot (\Phi - \Delta d/\lambda)$, where $\Phi$ is the initial correlator phase, $\Delta d$ is the change in distance for a given directional heading, and $\lambda$ is the wavelength of the transmission.

As described, the RL is arranged to collect a series of compass headings and distances to resolve a target location for the MT. The motion or action required of the user is relatively intuitive in that the circular motion required for the RL is similar to the motion required for a user to visually search by "looking around" their current location. The cost of a RL that is employed in the above-described examples is reduced considerably since the use of accelerometers is not required. Moreover, the cost associated with some conventional two axis compass sensor devices is currently less than approximately two dollars.

Ping Modes

Figure 16:
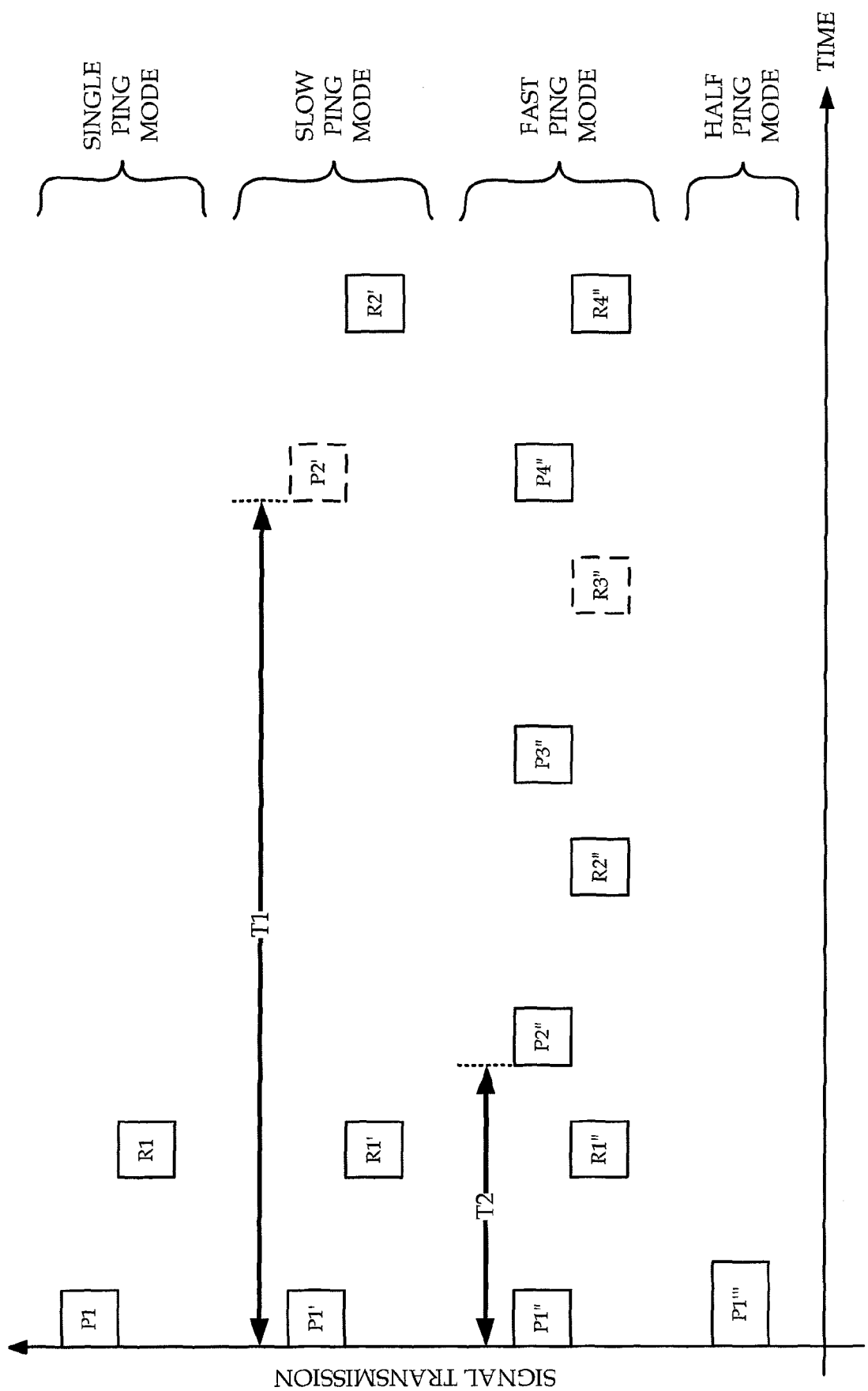
FIG. 16 is an example diagram illustrating single ping mode, slow ping mode, fast ping mode, and half-ping modes for an anti-tamper cargo container locator system, all arranged in accordance with the present disclosure.

FIG. 16 is an example diagram illustrating single ping mode, slow ping mode, and fast ping mode. As previously described a "ping" corresponds to a complete transmission by the RL to the MT, such as a complete set of the three frame transmission sequence. Similarly a "reply" corresponds to a complete set of frames from that are transmitted from the MT to the RL. In FIG. 16, each block designated as Px is intended to indicate a time of transmission for a ping that includes a complete set of frames, while Rx is intended to indicate a time of transmission for a reply that also includes a complete set of frames.

The described system performs distance measurement by round trip time measurements. The ping modes are arranged to provide regular communications between the RL and the MT, where distances can be tracked without excess energy consumption or spectral pollution. After an MT and RL have exchanged signatures, they share very precise mutual clock rate information. The accuracy of this clock rate information, absent any Doppler shift, is one part per billion or better. As time elapses between transmissions, the unit time bases, which aren't perfectly steady, will drift with respect to each other. By calibrating the low-speed sleep mode oscillator against the high-speed clock, so that a given sleep period can be accurately enumerated as a known number of high-speed clock periods, it is possible to accurately measure periods of several minutes without actually operating the high-speed clock. However, a long initial baseline for frequency determination is necessary to initially synchronize the clocks between the MT and the RL. Once synchronized/calibrated the precise timing is known and shorter transmissions are possible.

In the single ping mode, the RL transmits a single ping (P1) to the MT. The MT receives ping P1 when it within a transmission range of the RL for proper reception. The MT is arranged to transmit a reply (R1) to the RL in response to ping P1 when the ping is properly recognized as coded for the particular MT.

In the slow ping mode, the RL is arranged to continuously transmit a series of single pings (P1', P2' ... PN') to the MT. Each subsequent ping is separated in time by a ping interval (T1) as illustrated. The MT receives each ping when it is located within a transmission range of the RL for proper reception, and transmits a corresponding reply (R1', R2' ... RN') for each ping that is properly recognized as coded for the particular MT.

In the fast ping mode, the RL is arranged to continuously transmit a series of short duration single pings (P1", P2" ... PN") to the MT. Each subsequent ping is separated in time by a ping interval (T2), which is significantly shorter in time than ping interval T1. For example, each ping in the fast ping mode is on the order of hundreds of microseconds to a few milliseconds in length. Since the timing and cadence is know from prior receptions, the coarse timing is already known and the RL is able to utilize greatly abbreviated transmissions. The short duration ping can be accomplished using just a portion of an "A" sequence. The MT receives each ping when it is located within a transmission range of the RL for proper reception, and transmits a corresponding reply (R1', R2' . . . RN') for each ping that is properly recognized as coded for the particular MT.

It is important to note that the MT may not always be able to properly receive a particular ping from a RL in even though it is properly coded for recognition by the MT. Environmental conditions such as noise, buildings, and other electronic interferences may inhibit a ping (e.g., ping P2') from reaching the intended MT. Similarly, environmental conditions may cause a reply (e.g., reply R3") from reaching the intended RL.

As will be described below, a variety of communication protocols can be utilized to facilitate communications between cargo container tag devices and to base station devices. In some examples, the communication protocols facilitate a cargo container analysis mode, where the contents of the cargo containers are analyzed according to signal spectral analysis means (e.g., FFT analysis) of impulse responses and delay/decay/echo patterns. For example, the contents analysis can use internal Doppler measurements to detect the presence of an intruder such as a person or vermin in the cargo container. Contents can be analyzed using the correlation impulse response and its decay/echo pattern to measure the extent to which the contents are damping or otherwise modifying the temporal structure of the correlation pulse. A signature or reference pattern can be used as an initial baseline for the cargo container, which is later used as a baseline of comparison to determine a change in the contents of the cargo container (which may be due to shifting contents, removal, addition, etc). Thus, comparison in the correlation vector signatures can be used to indicate intrusion or changes in the contents of the cargo container.

Further discussed below is the use of Doppler measurements that can be obtained from either internally oriented antennas or externally oriented antennas. Doppler measurements from the internally oriented antennas are useful in evaluating the internal motion of the cargo container. Normally, Doppler measurements from inside of the cargo container should be absent even if the container is moving. The externally oriented antennas are useful in monitoring the motion using the Doppler measurements while the cargo container travels along a path, such as on a railroad car, truck, or other transportation means. Although the externally based Doppler measurements (those from the external antennas) will be somewhat messy, since the antennas do not occupy the same face of the container, signature analysis techniques and/or rudimentary pattern recognition methods permit interpretation of the Doppler measurements to deduce the path of travel for the cargo container.

Half-Ping Protocol

A half-ping is a one-way communication of a single packet. One tag (e.g. a first CCT device) transmits a slightly widened packet, to account for possible timing error between the two tags, and the other tag (e.g., a second CCT device) receives a single packet and correlates against the code. Since the two devices aren't synchronized, the correlation pattern representing impulse response will have a random carrier phase rotation as well as a random alignment with respect to the samples produced by the FFT. It is also possible that the amplitude will have unexpected variations, either as a result of gain variations in the radios or because the receiver's switched AGC is teetering on the transition between two gain ranges. This means that the reception in half-ping mode should be normalized. First, the signal should be oversampled in the region of the direct path correlation spike, in order to find the true fractional time of the spike. This fraction can then be used to compute the interpolated correlation values at subsequent samples throughout the reverberant pattern, for perhaps a microsecond after the direct path. Furthermore, these values can be normalized by dividing them (as complex numbers) by the value of the main spike, to remove the carrier phase rotation and amplitude variation. The resulting values should always be the same, in the absence of some intrusion into the container.

If the "dirty" code is correlated against, the resulting correlation will show a narrower spike, and little of the reverberant pattern. This makes it easier to identify the reference for normalizing the rest of the data, and also may reduce the amount of information that can be recorded as a baseline signature (e.g., the spectral composition of the normalized signals received by the tag) for future comparison, since there should be much less energy outside the main spike. However, the autocorrelation properties of the "dirty" code are unpredictable, so there could still be some energy on either side of this spike, and the extra energy that appears when there is an intrusion could also appear on either side.

Full-Ping Protocol

Full-Ping is a two-way communication, consisting of a Half Ping in each direction as closely spaced as possible, so that both CCT devices are powered up for the duration. When the second tag receives the initial Half Ping from the first tag, it gleans the same information as described above, but when it sends its response, it precisely times it according to the timing of the initiating tag. When the first tag receives the response, the timing it derives from it provides an accurate distance measurement. Given the excellent S/N ratio inside the container, it should be possible to measure distances down to the inch level or so, but this would require something like 256 interpolation points between the actual samples produced by the FFT. This provides some additional protection against the possibility that the container door on which the tag is mounted could be slightly opened, shifting the communication in time, but without actually changing the shape of the impulse response significantly.

Since the responding tag is responsible for measuring the precise packet timing through interpolation, its response can be calibrated so that the direct path correlation spike detected in the initiating tag is exactly aligned with a sample. This means that the initiating tag can skip the interpolation process, and just do the normalization by dividing the rest of the samples by this reference sample. Furthermore, the responding tag doesn't need to transmit a widened packet, since the maximum variation in distance is insignificant compared to one sample time.

The Full Ping accomplishes slightly more than two Half Ping operations, because of the added distance measurement, and also accomplishes it in half the time (two seconds versus four, counting the sleep time between operations). Furthermore, it does so with less battery power, because it halves the overhead of warming up the bandgap reference and starting the crystal oscillator, which take much longer than the actual communication. Therefore, the Full Ping is generally to be preferred over the Half Ping.

The Full Ping may also use the "dirty" code, which may improve its performance since the resulting correlation pattern provides less ambiguous timing information in the presence of lots of reverberation. A half-ping is a one-way communication of a single packet.

External Ping Protocol

External Ping is a Half Ping operation where one tag uses its external antenna and the other uses its internal antenna. In the normal case, virtually no signal will be received, so it makes sense for the receiver to use its internal antenna, to avoid the possibility of being confused by strong interfering signals. Should any path open up between the inside and outside of the container, it will show up as a correlation spike within a certain predictable time window whose width depends upon the possible timing inaccuracy of the 32768 Hz clocks. Since this path includes the outside world, it is only meaningful to correlate against the "clean" code.

One likely source of interference is a nearby locator that happens to be transmitting the same eleven-bit code at the same time. Locators will typically spend most of the time transmitting, as they poll all the tags under their domain, so given that there are about two thousand possible codes, there is perhaps a one in 2500 chance that a particular code will be in the air at a particular time. It is also possible to pick up the code from a nearby container doing the same External Ping protocol. One tag transmits the code externally so that there is some guaranteed level of "illumination" of the outside of the container that the other tag can use to detect a leak. Other external sources of the same code add to this illumination.

Doppler Ping Protocol

This is a pair of Half Ping operations in the same direction using the two external antennas, separated by a couple milliseconds during which both devices remain powered up. The two receptions should be essentially the same, unless the container is moving at a significant speed, as when on a truck, in which case the reflections from other objects not on the truck will show a Doppler shift. The strongest signal will always be the direct path, or some fixed reflection of the direct path, and can act as a reference; the later reflections can be assumed to be off-truck.

The goal of this protocol is to get approximate speed information when a container is on a truck moving down the road. If the tags are outfitted with compass chips, then the log can record a crude breadcrumb track (e.g., a breadcrumb mode) for the container in transit. The compass chip, being mounted on the side of a big steel container, will have a somewhat nonlinear response, but it can be reasonably well straightened out by a one-time calibration. The speed information will also be fairly crude, but the information should be good enough that the combination of the two can be threaded onto a map of existing roads, so the errors won't accumulate. The end result is the ability to see if a trucker took the container somewhere other than where it was supposed to go.

The reflections generally fall into these categories:

Reflections from vehicles traveling in the same direction as the truck will have nearly zero Doppler shift.

Reflections from vehicles traveling in the other direction will have roughly twice the Doppler shift of the reflections we're interested in.

Reflections from stationary objects will show Doppler shift equal to the truck's speed, times the cosine of the angle of the object off the direction of travel.

Occasionally, there will be reflections from vehicles traveling perpendicular to the truck's travel, as on a side street or overpass, which will produce an amount of Doppler shift primarily based on the speed of that other vehicle.

The resulting tangle of reflections can be decoded by time-aligning the impulse responses produced by the FFTs on the two packets so that their main direct path signals line up, rotating the vectors in one response so that the direct signals have the same angle, then dividing the corresponding vectors in the two responses (discarding ones whose amplitudes are too low to be useful), out to perhaps fifteen or twenty samples after the main reflection, for a maximum distance of 300 to 400 feet. The angles of the resulting fifteen or twenty vectors will indicate the dominant Doppler shift for objects at the corresponding distance, and these vectors will have an uneven distribution that can be analyzed by suitably clever software.

In particular, it is likely that the distribution of Doppler shifts will be mostly scattered between ±v, where v is the velocity of the truck, and will probably be skewed toward the negative polarity, since the door-mounted tag is normally facing the rear. But there will be comparatively few reflections indicating any velocity greater than v, except for some lower-level ones clustered around −2 v representing vehicles going the other way. These can be filtered because they represent speeds faster than any truck will likely travel, and the remaining anomalies can be filtered by observing that a truck can't change speed by very much during the few seconds between readings. Reflections from perpendicularly moving vehicles may produce confusing readings, but such reflections should generally be small, and should be fairly uncommon.

The hardest thing to filter out may be reflections moving vehicles while the truck carrying the container is sitting still. One observable difference, though, will be that the zero Doppler reflections will be much stronger and more numerous. Another will be that they will typically be positive instead of negative, since the traffic approaching the truck from the rear is likely to be closer than the traffic on the other side of the road approaching from the front. The fact that the compass direction is absolutely stable may also be helpful.

Impulse Response Analysis

When correlating against the "clean" code in the Half Ping or Full Ping, it may be possible to derive useful information from analyzing the nature of any changes in the impulse response. If a container contains something moving, such as a stowaway, the changes this motion makes to the impulse response may in some cases be recognizable and distinguishable from other forms of intrusion. While it will take some clever pattern recognition to make this distinction, the hardware is capable of doing this correlation and passing the resulting impulse response to the processor, so it's an issue that can be left to software using pattern matching and estimations using the signal profile of a certain defined events (door open, door closed, etc.).

Communication Scheduling

The one external requirement related to communication scheduling is that every tag must turn on periodically (e.g., every two seconds) to listen in the external environment for it's A code, in case a locator is trying to contact it. This means that all inter-tag communication must fit in the gaps between those events. The easiest way to do this is to schedule them with the same two-second granularity, but interleaved half way between the listening events.

Another other issue is that when a tag hears it's A code in the outside world, it must then devote its communication resources to listening for the rest of a locator's communication, which takes a longer time interval (e.g., over two seconds). This means that it will likely miss one of the scheduled inter-tag communication events. The inter-tag communication protocols must allow for this, not regarding any single missed communication as indication of any problem.

Example Schedule

An example schedule of communication might be as simple as this:

| Time | Event |
| --- | --- |
| t | Listen for locator. |
| t + 1 | Full Ping from A to B to A. |
| t + 2 | Listen for locator. |
| t + 3 | External Ping from A to B. |
| t + 4 | Listen for locator. |
| t + 5 | Full Ping from B to A to B. |
| t + 6 | Listen for locator. |
| t + 7 | External Ping from B to A. |

The spacing of these events is one second, so the device would correctly listen for the locator every two seconds. Some power could be saved by perhaps cutting the rate of the in-between tag-to-tag communications in half or more, but this is limited by the need to catch a fairly short intrusion, such as opening a door and quickly tossing something dangerous (e.g., some sort of poison) into the container.

If the container is expected to be on a truck, it can be instructed to use a schedule like this:

| Time | Event |
| --- | --- |
| t | Listen for locator. |
| t + 1 | Full Ping from A to B to A. |
| t + 2 | Listen for locator. |
| t + 3 | External Ping from A to B. |
| t + 4 | Listen for locator. |
| t + 5 | Doppler Ping from A to B. |
| t + 6 | Listen for locator. |
| t + 7 | Full Ping from B to A to B. |
| t + 8 | Listen for locator. |
| t + 9 | External Ping from B to A. |
| t + 10 | Listen for locator. |
| t + 11 | Doppler Ping from B to A. |

Note that the one-second interval on which these interleaved schedules is based does not run open-loop in the two devices. Instead, it is resynchronized whenever a tag receives a Full Ping signal from the other tag. The fact that the transmitting tag sends slightly more than one packet time, and the receiving tag tries to align its reception in the middle of this period, means that the receiver learns by the position of the correlation spike how misaligned its idea of time is compared to the transmitter. It must always count out the time to the next event from the time of the signal received from the other end, not from its own idea of when it expected the signal to be received, so that the two ends always remain synchronized.

Resynchronization Protocol

If a tag must deviate from its schedule, in order to respond to a locator, it should still keep track of the schedule, so that it can resume at the correct point to remain synchronized with the other tag. But some means must still be provided for getting the tags on the same schedule in the first place, or any time some random failure causes them to get separated.

This is done by detecting any failure of the Half Ping or Full Ping protocol, and deciding that synchronization has been hopelessly lost if this condition persists for some number of times through the schedule. If this happens, the Resynchronize protocol is used to get them back in sync. To simplify this protocol, the tags are distinguished from each other at installation time by designating one of them the synchronizing master and the other the slave; this can be done on any basis, such as making the one on the door the master, or the one with the lower serial number.

When a device notices a failure, it skips the ping protocols for the duration of the standard schedule (eight seconds, as described above) to ensure that the other device has had time to notice the failure too. Then, the synchronization master begins to transmit a certain pattern repeatedly and the synchronization slave attempts to receive it. The protocol is similar to the Locator Ping protocol, except that it uses only the single code normally used for tag-to-tag communication. The master transmits two seconds' worth of the code continuously, then transmits successive rotations of the same code for 100 ms, then allows a few packet times for turnaround and receives a single packet. The slave receives every two seconds, and if it detects a packet, it can be sure it has received one of the unrotated packets, after which it continues to receive every 100 ms on packet boundaries until it receives a packet with a different rotation, at which point it has absolute timing. It then transmits the code back at the precise time that the master is listening for it, and then resumes normal operation, restarting the normal schedule at the beginning. When the master hears the response, it also resumes the same schedule, but playing the opposite role (A versus B in the description above).

If the master doesn't hear a response, it repeats the pattern, and if it never hears a response within a certain amount of time, perhaps two schedule times (sixteen seconds), it gives up, and records that it has thinks that the other tag is now dead. If the slave never hears the master for the same amount of time, it also gives up, and logs the same condition. Such a solitary device will resume listening for communication from an external locator, and will attempt to report the failure to the locator. A command from the locator (or perhaps any successful communication with a locator) can get each tag to retry the Resynchronize protocol, and indeed this is what gets them kick-started when they are first installed.

Security

The described cargo locator system is a security system, and therefore an obvious target for hackers. A hacker might wish to do any of the following:

Erase evidence of an intrusion into a container from its tags' event logs.

Prevent communication between the tags for a period of time, during which an intrusion can go undetected.

Read any manifest-related information from the tags that could identify a particularly valuable cargo.

Corrupting the event logs (by erasing them, or by adding spurious events) in the tags of a large number of containers, forcing a large scale manual screening.

Jamming

The only way to subvert the RoundTrip Cargo System without full knowledge of its design is to jam its communication, which would in theory require no more knowledge than the frequency and bandwidth of the system. Jamming that prevented the two tags on a container from communicating with each other wouldn't go undetected, and indeed would be recorded in the tags' event logs, but the point is that an entire shipload of containers could theoretically be jammed, making it impossible to trust that there wasn't at least one among them that had been tampered with. In that case, one would be faced with the daunting task of manually screening the entire load of containers.

Fortunately, closed metal containers attenuate any external signal enormously. Furthermore, the coding provides another 33 db of processing gain, allowing a signal to be detected cleanly when it is well below the level of any other uncorrelated signal. If the tag transmits ten milliwatts inside the container, it would probably take many kilowatts to jam it from immediately outside, and perhaps megawatts if the jamming transmitter was far enough away to cover the entire load of containers.

In other words, even in the presence of a strong jamming signal, which would be detected by the external antennas and logged, the internal antennas would still be able to communicate successfully. Furthermore, any opening of the container under those conditions would be even easier to detect, because it would allow the powerful external signal in, instead of just the comparatively weak External Ping signal transmitted by the tags themselves.

Spoofing

In order to communicate with a tag, its serial number must be known. Unfortunately, there are good reasons why it is impractical to keep the serial number a complete secret. It is inevitable that containers will pass through domains in which they aren't managed by the described cargo system, for instance while on a train. When a container finally reaches a destination, such as a freight yard, where it will be managed by the described cargo system, some means must be provided for getting the container tag serial numbers into the system. The serial number is, in effect, part of the shipping manifest that describes the contents of a container, and can therefore never be more secret than the contents of the container. There will always be some untrusted person somewhere who can gain access to the serial number of a tag, and possibly pass it to someone who has rigged up some equipment that can use this information to issue commands to the tag.

Furthermore, in the course of being monitored by a real locator, a tag will transmit at least one, if not all three, of its eleven-bit codes via its external antenna anyway. Equipment exists that could detect and capture these transmissions, and further equipment could be built by a sufficiently smart hacker that could use this information to issue commands to the tags.

Not bothering to hide the serial number at all provides additional convenience. For instance, having the electronic serial number embossed on the side of the tag (or for that matter, painted on the side of the container) would make it easier to deal with the occasional unknown container that is found sitting somewhere as a result of some human error.

Encryption

It is important to ensure that sufficient encryption so that no unauthorized user (e.g., a hacker) will be able to issue certain specific commands to a tag, for instance to erase an event log, or ask it for certain secret information. Public key cryptology techniques can solve this by allowing each "security domain" to explicitly pass permission to manage a container to another security domain when the container leaves the first domain. For instance, when a freight yard, which uses the described system, is about to load a container onto a ship, it can program the public key of the ship's system into the tags. This allows the tags to verify that an encrypted command that it receives was actually issued by the ship's system and not some hacker, and it prevents any hacker from intercepting and decoding the response to any command from the ship.

This works even if the container is to go through a domain that isn't managed by the described system. If a ship doesn't have the system, but the freight yard at each end of the journey does, the outbound freight yard's system can program into each container's tags the public key of the inbound freight yard's system.

This of course means that the tags will have to have a memory for at least a few public keys, since a sender may wish to program in multiple keys representing various known points along a container's journey. But it also means that the tags will need some significant computing horsepower for the cryptographic algorithms. Fortunately, these algorithms are only needed occasionally, so can be done by a separate processor that is only powered up once in a while. Most communication protocols, such as the basic Locator Ping, will not need any encryption.

Alternate Frequencies

In some of the described systems, a frequency of around 915 MHz is synthesized using a 26.142857 MHz crystal oscillator. The described cargo system can also operate on a higher frequency around 2.4 GHz so that a permissible worldwide frequency band is employed. By raising the carrier frequency by a factor of 2.5, without changing anything else, the required error tolerances are also tightened by a factor of 2.5, because there is now 2.5 times as much carrier rotation per packet time, given a certain amount of error between two devices' time bases. This can be compensated for by increasing other requirements proportionally. If the baud rate (and hence the bandwidth) is increased by the same factor, and the sample rate is raised by the same factor, and the packet time is shortened by the same factor, then the error limits remain unchanged. Single-packet transmissions would have to be widened by the same amount of time, but 2.5 times the number of samples, in order to account for timing errors in the 32768 Hz clocks. Also, when a tag is receiving the B code in a Locator Ping protocol (or receiving the C code in the Resynchronize protocol), it would have to sample the air every 40 ms instead of 100 ms, since the sequence of rotated codes would only last that long.

Raising the frequency and sample rate has one substantial advantage, though, which is that it increases the spatial resolution with which the interior of the container can be characterized. This means that smaller changes can be measured, and smaller movements can be detected. It also improves the Doppler Ping protocol's resolution, since the reflections over a given distance are sorted into 2.5 times as many bins.

Example Systems with Multiple Base Stations

Multiple base stations can be used at an example cargo container facility (or site). The base stations can be dispersed throughout the site such as on tall lighting devices that are commonly found at such a site. Each of the base stations can be arranged to communicate with cargo container tags for collecting data. The base stations can also be arranged to communicate with one another through a central database so that the exact position of a cargo container can be determined. For example, one base station can transmit an interrogation signal (a first transmission) to a cargo container tag in a cargo container. The cargo container tag transmits a reply transmission (a second transmission) to the base station in response to the interrogation signal. However, all of the base stations can be configured to receive the reply transmission. Since the base stations are all physically positioned at different locations throughout the site, each base station may each receive the reply transmission at a different time corresponding to a different distance measurement. Since the base stations are at fixed locations at the site, the collection of times and distance measurements between the cargo container tag and the base stations can be collectively evaluated to determine an exact position of the cargo container tag (e.g. triangulation of the position using multiple distance measurements). Moreover, since multiple cargo container tags may be included in each cargo container, the exact orientation (i.e., rotational orientation) of the cargo container can also be determined by the collection of reply transmissions from all of the cargo container tags in the cargo container.

Figure 17A:
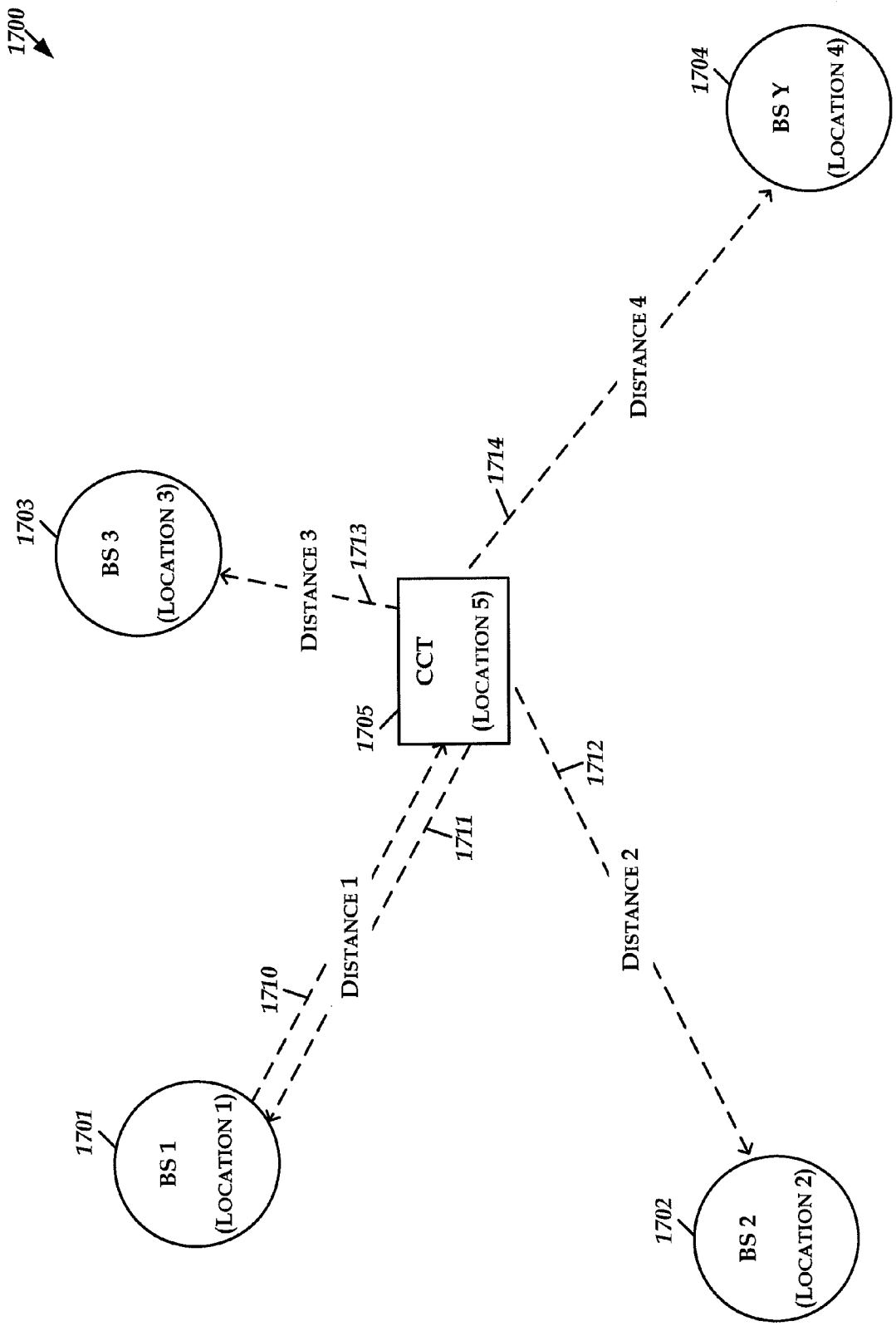
FIGS. 17A-17C illustrate an example system where a single transponder or cargo container tag receives a sequence from a single locator, and then concurrently transmits a reply sequence that is received by multiple locators or base stations.
Figure 17B:
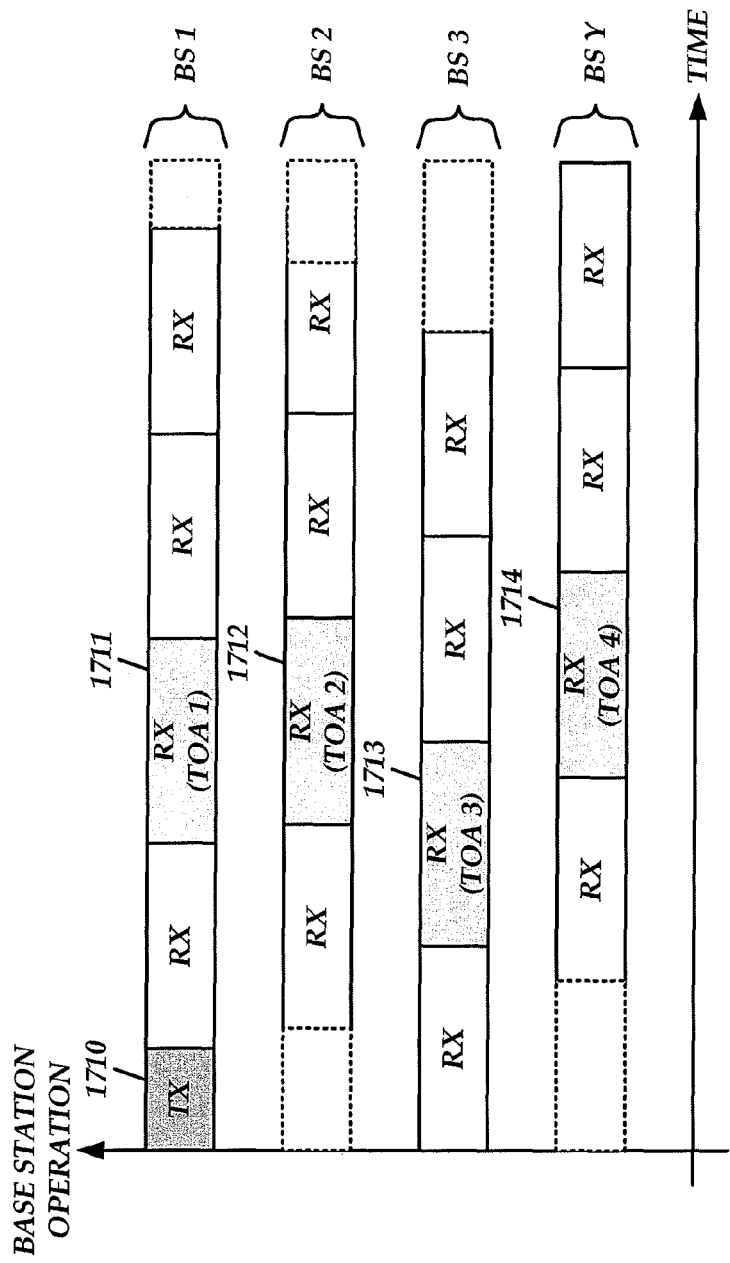
Figure 17C:
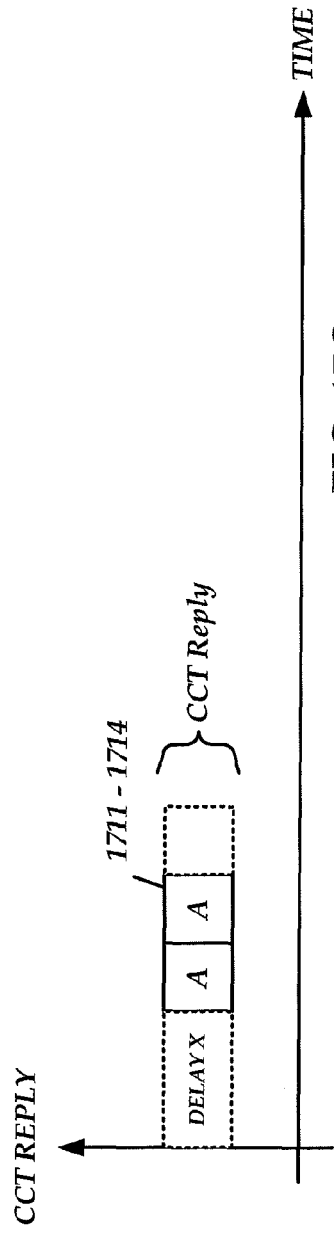

FIGS. 17A-17C illustrate an example system (1700) where a single transponder (MT) or CCT device receives a transmission sequence from a single locator or base station (BS) device, and then concurrently transmits a reply sequence that is received by multiple locators or BS devices. System 1700 includes a number (Y) of locators (1701-1704) that are arranged to communicate with at least one transponder (1706), as illustrated in FIG. 17A. A first locator or base station (1701) is located at a first physical location (LOCATION 1), a second locator or base station (1702) is located at a second physical location (LOCATION 2), a third locator or base station (1703) is located at a third physical location (LOCATION 3), while a fourth locator or base station (1704) is located at a fourth physical location (LOCATION 4). The transponder or CCT device (1706) is located at a fifth physical location (LOCATION 5).

In operation, locator 1701 initiates communication with transponder 1706 by transmitting an encoded transmission sequence (1710) in a multi-frame sequence that is encoded with a CCT ID such as described previously. Transponder 1706 receives the encoded transmission sequence (1710), waits for the start of a transmission time interval after a precisely calculated delay time (DELAY X), and then transmits its own reply that is received by each of the locators (1701-1704) that is within the range to receive the transmitted reply.

As illustrated in FIG. 17A, each of the locators (1701-1104) is located at a different physical location (LOCATION1-LOCATION 4) and at a different distance (DISTANCE1-DISTANCE 4) relative to the transponder's physical location (LOCATION 5). Due to the physical arrangement of locators relative to the transponder, each transponder may not receive the reply transmission from the transponder at exactly the same time. As illustrated in FIG. 17B, locator 1701 may receive a reply transmission (1711) at a first time of arrival (TOA 1), locator 1702 may receive the same reply transmission (1712) at a second time of arrival (TOA 2), locator 1703 may receive the same reply transmission (1713) at a third time of arrival (TOA 3), and locator 1704 may receive the same reply transmission (1714) at a fourth time of arrival (TOA4). Since locator 1703 is closest to the transponder (i.e., DISTANCE 3 is the shortest distance in FIG. 17A), the time of arrival for receiving reply transmission 1713 is first. Since locator 1701 is second closest to the transponder (i.e., DISTANCE 1 is the second shortest distance in FIG. 17A), the time of arrival for receiving reply transmission 1711 is second. Since locator 1702 is third closest to the transponder (i.e., DISTANCE 2 is the third shortest distance in FIG. 17A), the time of arrival for receiving reply transmission 1712 is third. Since locator 1704 is furthest from the transponder (i.e., DISTANCE 4 is the longest distance in FIG. 17A), the time of arrival for receiving reply transmission 1714 is last.

Central Processing

Figure 18A:
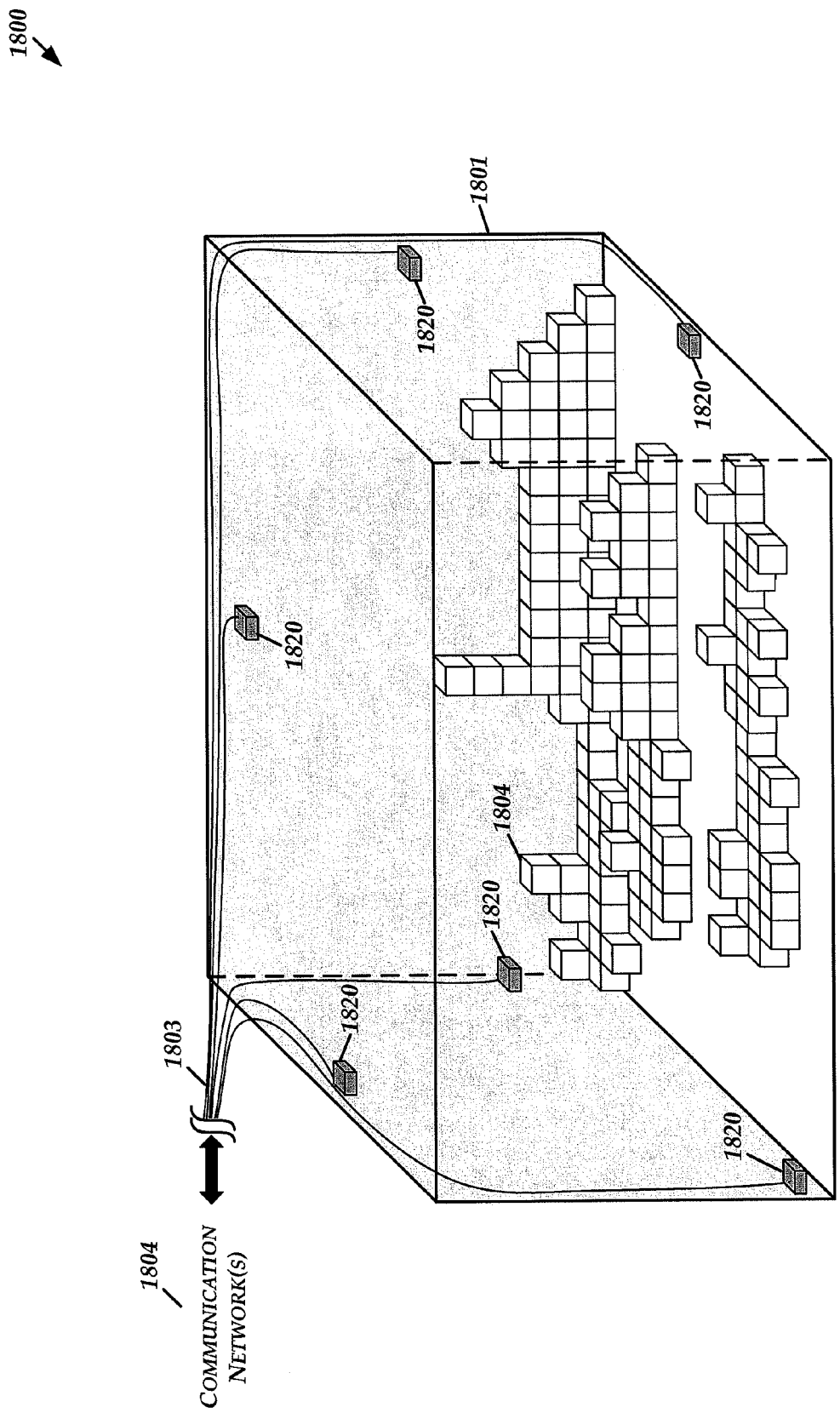
FIGS. 18A-18B illustrate an example system where multiple locators or base stations receive reply transmissions from one or more transponders (MTs) or cargo container tags (CCTs) in a warehouse or other defined region, and each locator communicates information about the received replies to a central processing unit via one or more communication networks.
Figure 18B:
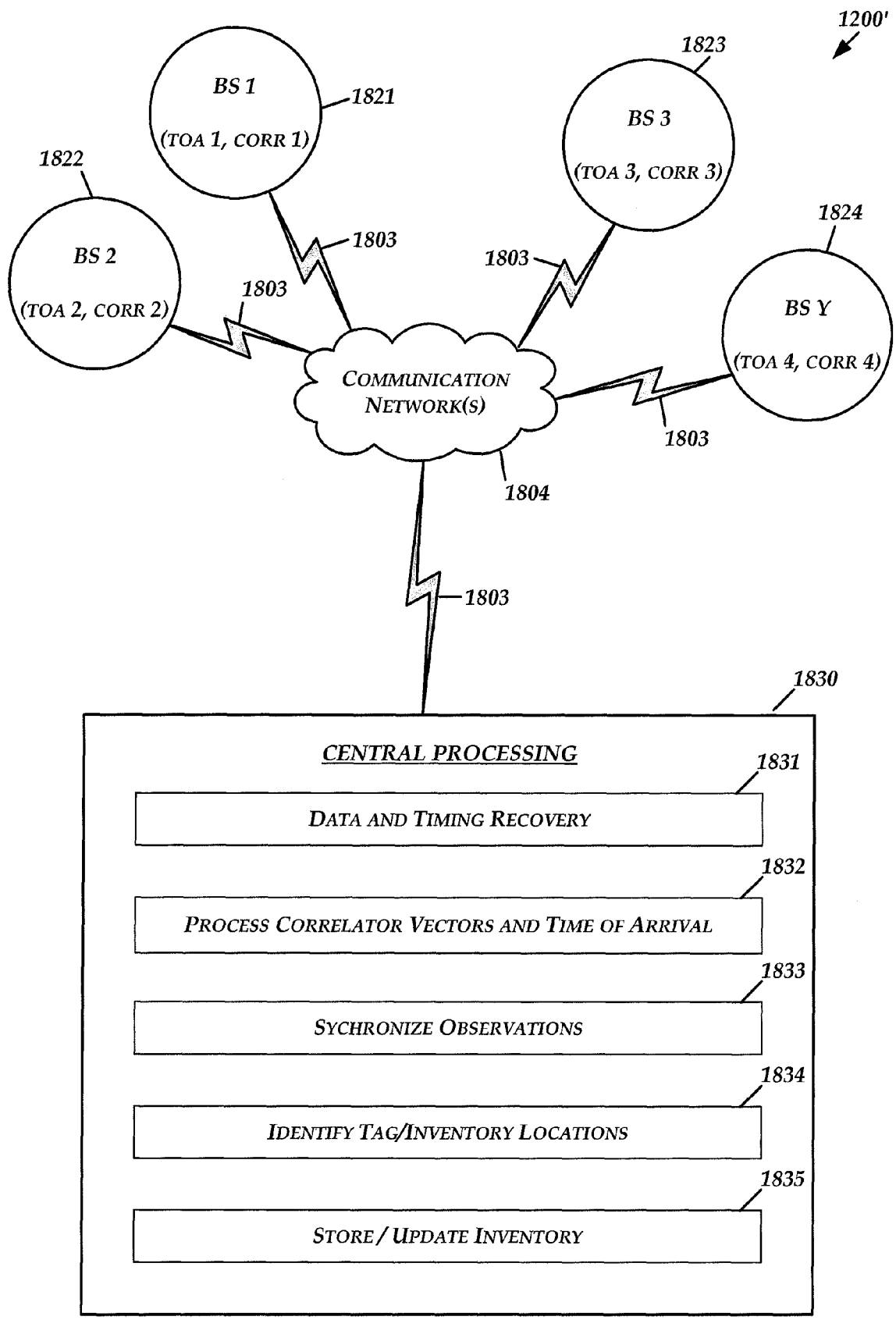

FIGS. 18A-18B illustrates an example system (1800) where multiple locators or base stations (BS) receive reply transmissions from one or more transponders or CCTs in a warehouse, loading dock, railcar, etc. Each locator communicates information about the received replies to a central processing unit via one or more communication networks.

A warehouse, loading dock, railcar or other defined region (1801) is illustrated in FIG. 18A where a large number of tagged cargo containers or other objects (1804) are located. Each of the objects (1804) may be one of numerous objects that can located against any floor or wall surface of the defined region, or stacked upon one another as is illustrated. One of the locators (1820) can be selected to initiate communications with a group of tagged objects using a transmission sequence that is encoded with the requisite group ID. Each tagged object (1804) that is a member of the identified group will then transmit a reply transmission at a different delay time relative to the transmission of the communication from the initiating locator (1820). Each of the locators (1820) will then capture the reply transmissions from the responding transponders (1804) and subsequently communication information to the central processing unit via one or more communication networks (1804). Communication (1803) from the locators (1820) to the communication networks (1804) can be implemented with any reasonable communication topology such as a fiber-optic communication link (e.g., an RF to Fiber-Optic Modulator).

The physical location of each of the locators (1820) is different from one another and can be arranged on walls and/or ceilings at varying positions about the defined region (1801). By varying the number and position of the locators throughout the defined region (1801), and by centrally processing the various signals received from the locators, accurate position/inventory information can be reliably achieved for the defined region.

As illustrated by FIG. 18B, each locator (1821-1822) is arranged to communicate to a central processing block (1830) via a communication link (1803) through one or more communication networks (1804). Information such as a time of arrival (TOA) for a reply transmission and a correlation vector (a vector of complex numbers) for the reply transmission is communicated from each locator (1821-1824) to the central processing. For example, central processing block 1830 receives a first time of arrival (TOA1) and a first correlation vector (CORR1) from the first locator (1821), a second time of arrival (TOA2) and a second correlation vector (CORR2) from the second locator (1822), a third time of arrival (TOA3) and a third correlation vector (CORR3) from the third locator (1823), and a fourth time of arrival (TOA4) and a fourth correlation vector (CORR4) from the fourth locator (1824).

The central processing block (1830) is arranged to perform data and timing recovery (1831), process the correlation vectors based on their time of arrivals (1832), synchronize the observations of all of the locators (1833), identify tags and their physical location from the processed vectors (1834), and store the information or update the inventory (1835). Additional information from each of the tags can also be collected by the central processing block (1830) such as temperature, humidity and other indicia concerning the tagged objects as previously described.

Figure 18C:
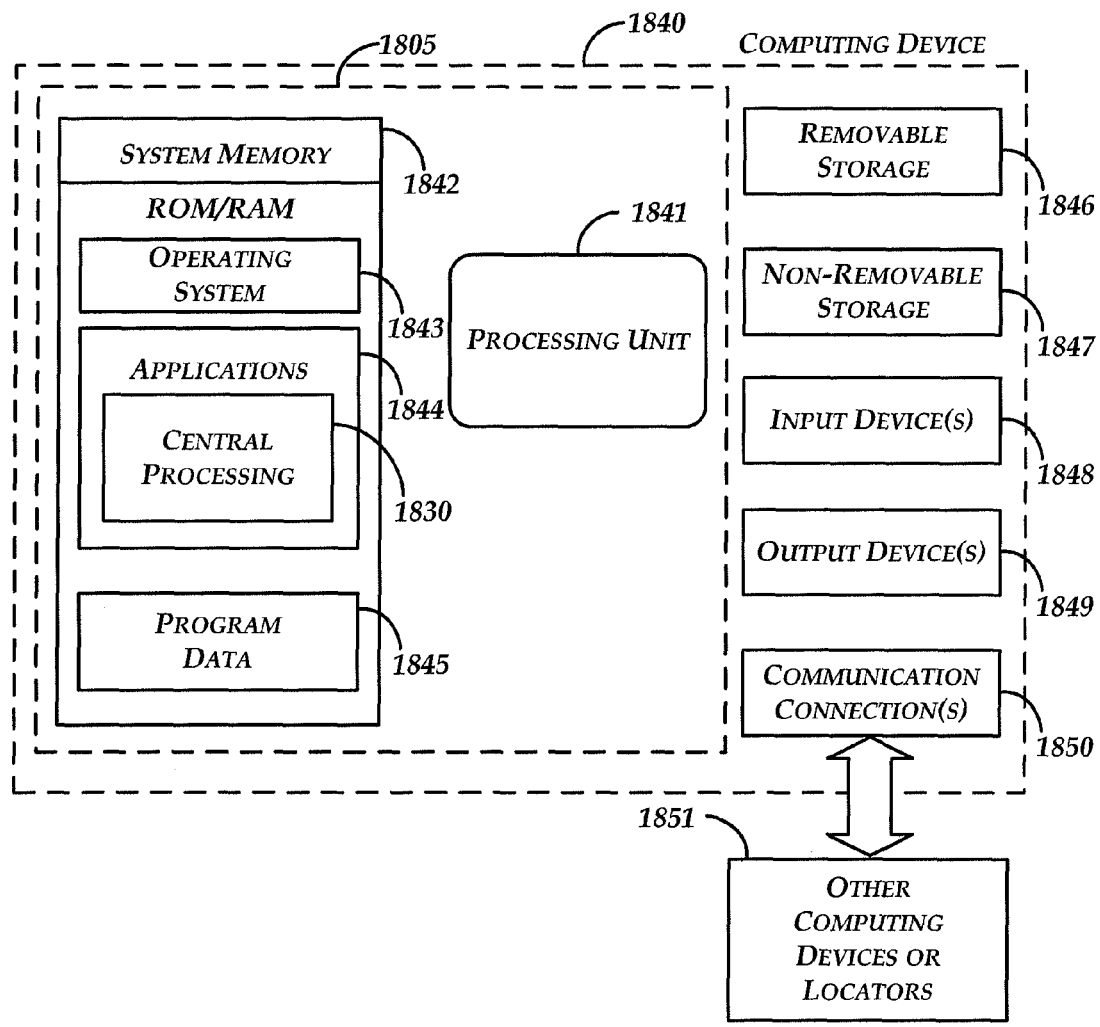
FIG. 18C illustrates an example computing device that is arranged to operate as a central processing unit.

FIG. 18C illustrates an example computing device (1840) that can be used for central processing. In a basic configuration, computing device 1840 may be a stationary computing device or a mobile computing device. Computing device 1840 typically includes at least one processing unit (1841) and at least one system memory (1842). Depending on the exact configuration and type of computing device, system memory 1842 may be volatile (such as RAM), non-volatile (such as ROM, flash memory, and the like) or some combination of the two. System memory 1842 may include an operating system (1843), one or more applications (1844), and may include program data (1845). In one embodiment, applications 1844 further include a central processing block application (1830) that performs various processing operations for inventory management and control.

Computing device 1840 may also have additional features or functionality. For example, computing device 1840 may also include additional data storage devices (removable and/or non-removable) such as, for example, magnetic disks, optical disks, or tape. Such additional storage is illustrated in FIG. 18C by a removable storage (1846) and a non-removable storage (1847). Computer storage media may include volatile and non-volatile, removable and non-removable media implemented in any method or technology for storage of information, such as computer readable instructions, data structures, program modules or other data. System memory 1842, removable storage 1846 and non-removable storage 1847 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1840. Any such computer storage media may be part of device 1840. Computing device 1840 may also have input device(s) 1848 such as a keyboard, a mouse, a pen or stylus, a voice input device, a touch input device, etc. One or more Output devices (1850) such as a display, speakers, printer, etc. may also be included.

Computing device 1840 also contains communication connection(s) 1850 that allow the device to communicate with other computing devices or locators (1851), such as over a wired network (e.g., an optical network) or a wireless network. Communication connection(s) 1850 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Example Process Flows and Polling Sequences

Figure 19A:
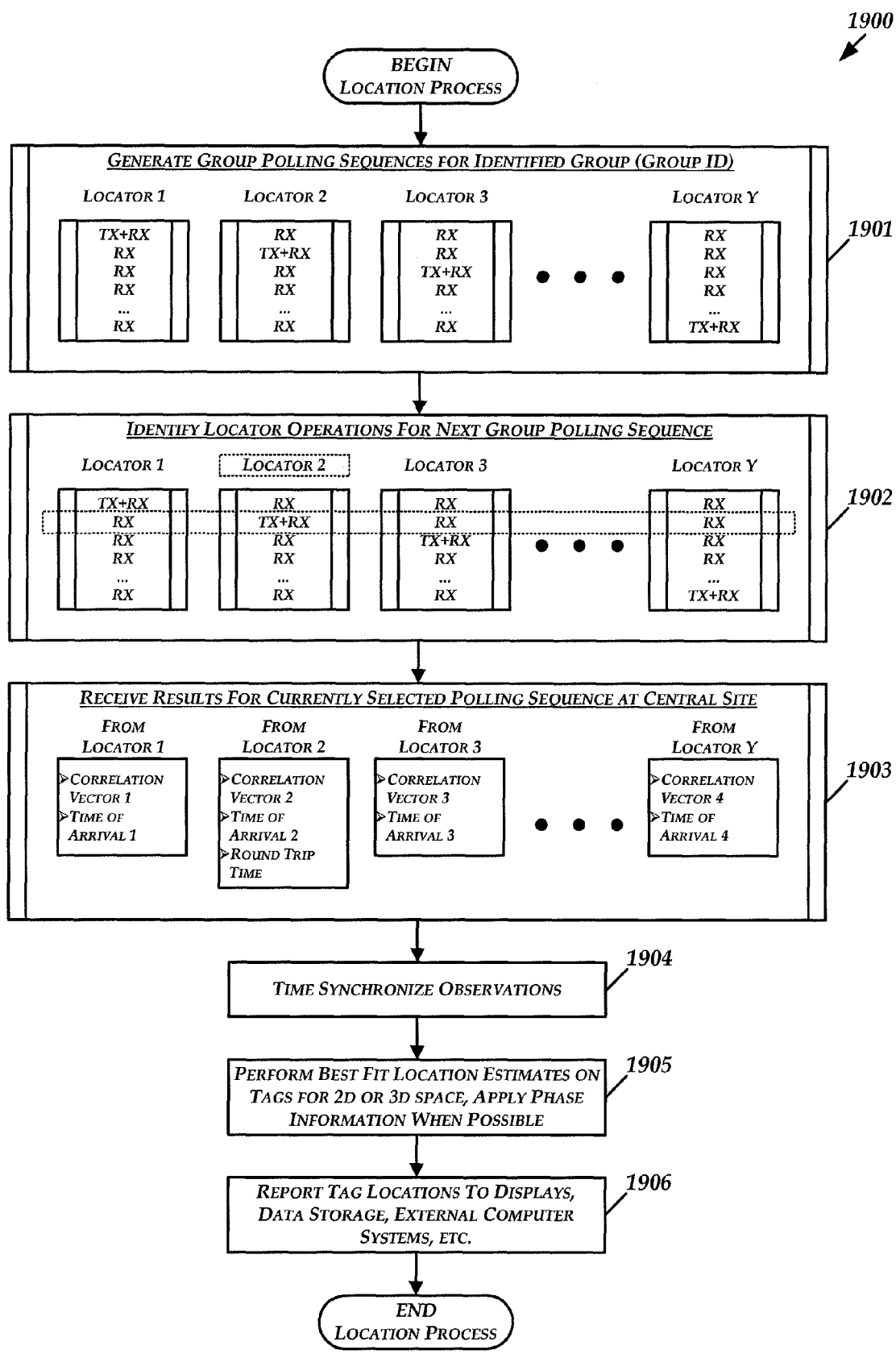
FIGS. 19A-19B illustrate example flow charts for a location process that consolidates the information about the received replies (Results) at a central processing unit.

FIG. 19A illustrates an example flow chart for a location process (1900 that consolidates the information about the received replies (Results) at a central processing unit. Processing begins at block 1901 (GENERATE GROUP POLLING SEQUENCES FOR IDENTIFIED GROUP) where group polling sequences are generated for the identified group (e.g., associated with Group ID). Each locator in the system is assigned an operating mode for the each of the polling sequences. For example, block 1901 illustrates that locator 1 is selected to initiate communications in a transmit (TX) and receive (RX) mode. The transmit mode is where the selected locator will be activated to source the interrogation signal that is sent to the transponders as previously described. The receive mode is where the selected locator will capture signals from the relevant spectrum to "listen" for a reply transmission from transponders.

In a first example polling sequence, all of the Locators are selected to be in a receive (RX) mode except for the first Locator, which is arranged to transmit (TX) the interrogation signal and then receive (RX) the reply transmissions. Similarly in a second example polling sequence, all of the Locators are selected to be in a receive (RX) mode except for the second Locator, which arranged to transmit (TX) the interrogation signal and then receive (RX) the reply transmissions. The illustrated polling sequences are a round-robin type of repeating sequence (where the interrogation transmission is sent in turn by: Locator 1→Locator 2→Locator 3→ . . . . Locator Y→Locator 1→ . . . ). Although illustrated as a round-robin sequence, any other type of sequence is also suitable including a random sequence, pseudo-random sequence, or some other ordered sequence. In a simplest implementation, a single locator can be selected to always transmit the interrogation signal.

After the group polling sequence is generated AT BLOCK 1901, processing continues to block 1902 (IDENTIFY LOCATOR OPERATIONS FOR NEXT GROUP POLLING SEQUENCE) where the locator operations for the next group polling sequence are selected and each of the locators is configured into its respective operating mode as either a receiver (RX) or a transceiver (TX+RX). As illustrated in FIG. 19, Locator 2 is selected for operation as a transceiver (TX+RX) device (i.e., an interrogator device) while the remaining locator devices (Locator 1 and Locator 2-Locator Y) are selected for operation as receiver (RX) devices.

Processing proceeds from block 1902 to block 1903 (RECEIVE RESULTS FOR CURRENTLY SELECTED POLLING SEQUENCE AT CENTRAL SITE) where results from all of the locators are received at the central site (e.g., via a fiber-optic communication link). As described previously, each of the locators will capture signals from the relevant signal spectrum during its receiver operation, perform a correlation on the captured signals, log the time of arrival for signals that successfully correlate with the relevant reference pattern for the selected group identifier (e.g., GROUP ID), and optionally decode additional information that is transmitted from the corresponding transponder. Therefore, the term "results" can be understood in the broad sense to include all information that is obtained from a correlation including but not limited to: time of arrival, round-trip time (for the interrogating locator), correlation vector (a vector of complex numbers), and any additionally encoded information received from the responding tag. In the example illustrated by block 1903, the first locator (Locator 1) is in a receiver mode and reports Correlation Vector 1 and Time of Arrival 1; the second locator (Locator 2) is in a transceiver mode and reports Correlation Vector 1, Time of Arrival 2, and Round-Trip Time; the third locator (Locator 3) is in a receiver mode and reports Correlation Vector 3 and Time of Arrival 3; and the last locator (Locator Y) is in a receiver mode and reports Correlation Vector 4 and Time of Arrival 4. The described results are gathered on a tag by tag basis so that the all of the locators that receive a response from one particular tag report their results at approximately the same time to the central processing unit.

Processing continues from block 1903 to block 1904 (TIME SYNCHRONIZE OBSERVATIONS), where the results that are gathered from all of the locators are evaluated for each respective tag and time synchronization is performed.

In some example synchronization processes, time synchronization can be achieved by carefully computing the roundtrip time of the communication link between the central processing unit and each locator. A common clock signal can be distributed between the central processing unit and each locator over a communication link (e.g., a fiber-optic communication link). A synchronization pulse (or synchronization sequence) can be sent from the central processing unit to each locator. Each locator receives the synchronization pulse (or synchronization sequence) and sends back a reply synchronization pulse (or sequence). The central processing unit receives the reply synchronization pulse (or sequence) and logs the time reported for signal arrival from each locator (e.g., an optical signal arrival time). The central processing unit then computes the precise roundtrip delay time from the central processing unit to each locator. In some fiber-optic implementations, synchronization can be facilitated with a fiber loop-back so that a precise round trip delay can be computed for the fiber-optic communication link.

Any number of communication lines can be used for the above described time synchronization methods. In one example configuration, a single optical fiber can be used for all communications between a central processing unit and a locator. In another configuration, multiple fiber-optic communication lines are used for communications (e.g., one fiber-optic line for clocking, one fiber-optic line for data, etc.).

Processing then continues from block 1904 to bock 1905 (PERFORM BEST FIT LOCATION ESTIMATES ON TAGS FOR 2D OR 3D SPACE, APPLY PHASE INFORMATION WHEN POSSIBLE). At block 1905, location estimates are computed for each tag based on the time synchronized observations. In one example, the precise location of each locator within the warehouse can be predetermined and stored in a database. Based on the time of arrival to each locator, the roundtrip time to the interrogating device, and other information (e.g., phase and magnitude of the correlation vector) an exact position can be identified for the transponder (tag).

Processing continues from block 1905 to block 1906 (REPORT TAG LOCATIONS TO DISPLAYS, DATA STORAGE, EXTERNAL COMPUTER SYSTEM, ETC.). At block 1906 the determined locations for each of the tags is reported to the requesting system. In some examples, the requesting system is an external computer (e.g., a computer terminal, a personal computer, etc.) that submits a request to the central processing unit. In other examples, the requesting system is the central processing unit itself (e.g., via a system initiated process according to a schedule, an event trigger, user initiated input, etc.). The results of the locations can be stored in a data storage device for later retrieval (e.g., stored in a database, stored in a file, etc.), or viewed on a display screen in either graphical or tabular format.

In some examples, an external computer system can be used to submit a request to scan the inventory from a remote location. For these examples, it may be preferred to have a secure login procedure that permits the external computer to interact with the central processing unit for the purposes of submitting inventory scan requests, deleting items from inventory, adding items into the inventory, assigning group IDs to tags, removing group IDs from tags, viewing the current inventory, identifying items missing from the catalogued inventory (e.g., a previously identified or active inventory), and identifying new items not found in the catalogued inventory.

At least two locators are necessary to compute an ambiguous position for locating a transponder. The ambiguity can be resolved by adding an auxiliary collocated sensing antenna to one of the transponders. In a simplest solution, three locators can be used to exactly identify a position for a transponder. Additional locators can be used for error resistance and improved accuracy. Statistical analysis functions can be applied to the results to identify the best estimates on location for the transponder considering such functions as: least squares, best fit, weighting functions (e.g., high magnitude correlations are given a higher weight that lower magnitude correlation so that closer locators are more reliable than distant locators), as well as other numerical models.

Figure 19B:
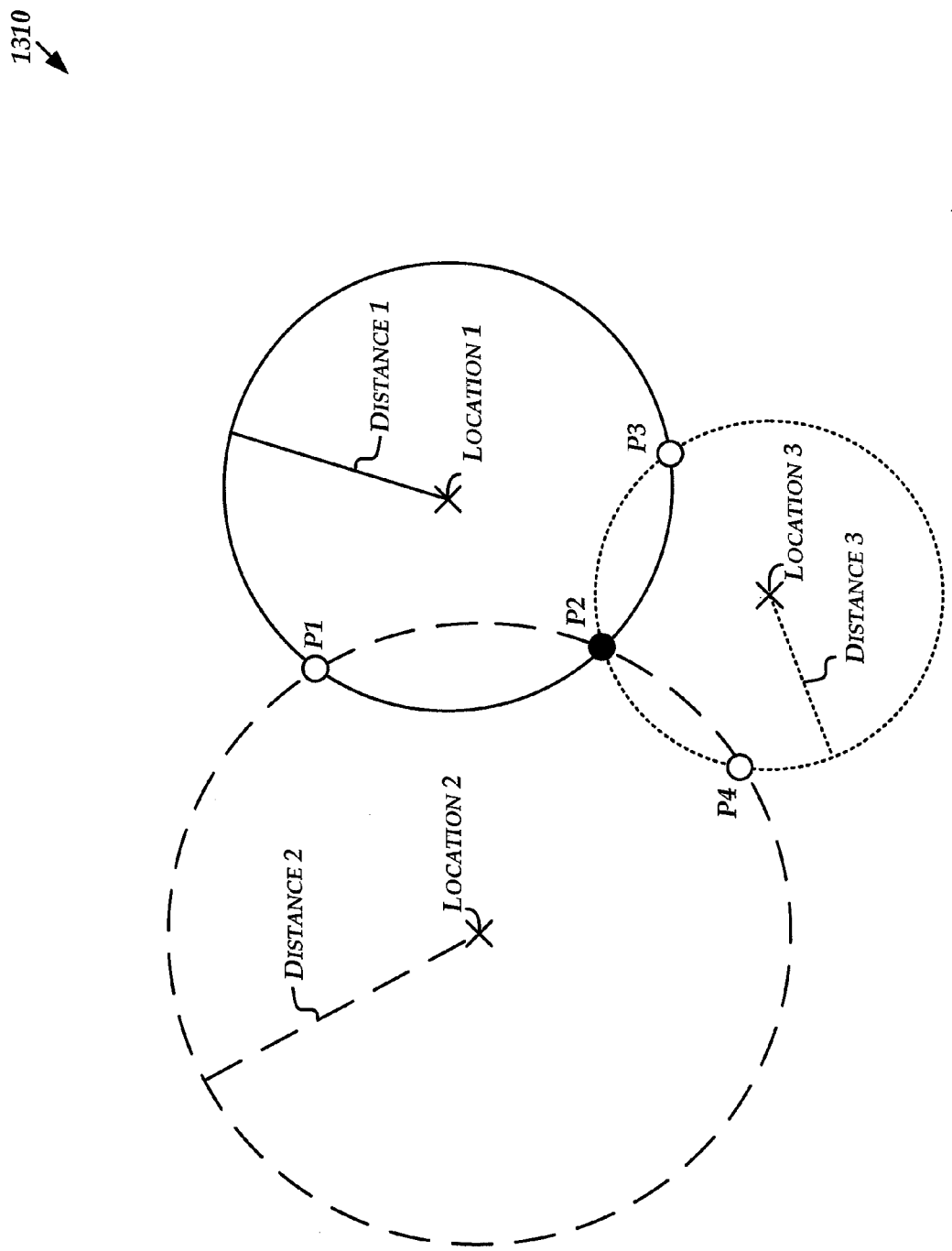

An example location process is graphically illustrated by FIG. 19B, where three locators are used to determined an exact position of a transponder (tag) based on the various results reported to the central processing unit. A first locator is at Location 1 at Distance 1 away from the responding tag. A second locator is at Location 2 at Distance 2 away from the responding tag. A third locator is at Location 3 at Distance 3 away from the responding tag. As illustrated in the figure, Distance 2>Distance 1>Distance 3. Each of the locators are located at a known physical position that can be stored in a central database. The first locator is the interrogation device for this example, and therefore Distance 1 can be calculated with great precision using the roundtrip time (the time between transmission of an interrogation sequence and receipt of a reply from the transponder). However, there is an uncertainty as to absolute direction relative to the locator, and thus the transponder may be located at first position that is positioned a fixed distance of Distance 1 away from Locator 1. The second locator receives the reply from the transponder, and logs the time of arrival and the correlation vector, which can then be used in conjunction with the information from the first locator to identify a second position that is positioned a fixed distance of Distance 2 away from Locator 2. The third locator receives the reply from the transponder, and logs the time of arrival and the correlation vector, which can then be used in conjunction with the information from the first locator to identify a third position that is positioned a fixed distance of Distance 3 away from Locator 3. The first and second positions can intersect each other at two possible points (in 2D space) as illustrated by points P1 and P2. The first and third positions can intersect each other at two possible points (in 2D space) as illustrated by points P2 and P4. The second and third positions can intersect each other at two possible points (in 2D space) as illustrated by points P2 and P4. Thus, all three positions intersect each other at a single point as illustrated by point P2. Position P2 can be calculated based on the geometric relationship between known Locations 1-3, and determined Distances 1-3. Although illustrated as a 2D space calculation, the same discussions holds in 3D space, where the 3D spheres intersect at a common point that is identified as the location of the transponder.

In another example, two locators are used to identify a position of a transponder. The first locator (e.g., Locator 1) is located at a first position with a roundtrip time that corresponds to a distance of 49.2 meters from the transponder. The second locator (e.g., Locator 2) receives a reply transmission from the transponder 40 nanoseconds earlier than the first locator, which corresponds to a distance that is 12 meters closer than the first locator, or approximately 37.2 meters. For a distance between the locators of 19 meters, a triangle is formed between the two locators and the transponder with sides of 19 meters, 37.2 meters and 49.2 meters. Applying the law of cosines ($C^2=A^2+B^2-2*A*B*COS(theta)$), an angle theta can be calculated as theta $COS^{-1}((A^2+B^2-C^2)/(2*A*B))$. For the example described above, the angles of the triangle correspond to 118.56 degrees, 19.82 degrees, and 41.6 degrees. Therefore, the position of the transponder relative to the first locator is determined as 49.2 meters, at an angle of 41.6 degrees relative to the second transponder, and the position of the transponder relative to the second locator is determined as 37.2 meters at an angle of 118.56 degrees relative to the first transponder.

In some instances, a locator may be positioned near an interfering device that obstructs, impedes, or otherwise distorts communications from the locator relative to one tag, while the same locator may have little or no interference relative to another tag. For example, walls, metal tanks, steel plates, steel support beams, and other materials in the storage area may create a variety of signal obstructions. In some instances the physical limitations of the site location may be a determining factor for group assignments (or altering group assignments) based upon those tags that are within the reception range of one or more locators. A communication site survey can be generated as a list or some other similar form of data structure to facilitate identification of limited communication zones on a tag-by-tag and locator-by-locator basis. Each tag that successfully communicates with each locator can be noted in the communication site survey. The group assignments of tags or the groups of locators assigned for polling the assigned group can then be altered to optimize efficiency or throughput using the communication site survey.

FIGS. 19C-19D illustrate example data structures for storing information about locators and tags such as might be used in the above described communication site survey. FIG. 19C illustrates an example data structure (1920) that can be used for storing information about locators, while FIG. 19D illustrates an example data structure (1930) that can be used for storing information about transponders (tags)

The top row of data structure 1920 in FIG. 19C shows the data field designators for each column as "Locator Number", "Operational Status", "Physical Location", "Accessible Tags", and "Group Assignments". Each row of the data structure corresponds to a locator (e.g., Locator 1, Locator 2 . . . Locator Y). As shown by a first row, the operational status of Locator 1 is "OK", the physical location is logged at "Position 1", the tags that are accessible by Locator 1 are all tags (Tag 1, Tag 2, Tag 3 . . . Tag N), and Locator 1 is currently assigned to all groups (Group 1, Group 2, Group 3 . . . Group M). As shown by a second row, the operational status of Locator 2 is "OK", the physical location is logged at "Position 2", only Tag 2 is accessible by Locator 2, and Locator 2 is currently assigned to Group 1. As shown by a third row, the operational status of Locator 3 is "Not Responding", the physical position is logged as "*Position 3*", accessibility to tags is unknown since it is not responding, and Locator 3 is assigned to Group 1, Group 3 and Group 4. Since Locator 3 is not responding to communication inquiries, the position is listed in asterisks (i.e., "*Position 3*") to indicate that this was the last known position before communications failed. As shown by a fourth row, the operational status of Locator 4 is "OK", the physical location is logged at "Position 4", the tags that are accessible by Locator 4 are Tag 1, Tag 2, and Tag 4, and Locator 4 is currently assigned to Group 1 and Group 2. As shown by the last row (row Y), the operational status of Locator Y is "OK", the physical location is logged at "Position Y", the tags that are accessible by Locator Y are all tags (Tag 1, Tag 2, Tag 3 . . . Tag N), and Locator Y is currently assigned to all groups (Group 1, Group 2, Group 3 . . . Group M). The top row of data structure 1930 in FIG. 19D shows the data field designators for each column as as "Tag Number", "Operational Status", "Physical Location", and "Group Assignments". Each row of the data structure corresponds to a tag (e.g., Tag 1, Tag 2 . . . Tag N). As shown by a first row, the operational status of Tag 1 is "OK", the physical location is logged at "Location 1", and Tag 1 is currently assigned to Group 2. As shown by a second row, the operational status of Tag 2 is "Not Responding", the physical location is "*Location 2*", and the Group Assignment is all groups (Group 1, Group 2, Group 3 . . . Group N). As shown by a third row, the operational status of Tag 3 is "OK", the physical location is logged as "Unknown", and Tag 3 is currently not assigned to any groups ("None"). Once the tag is assigned scanned into an inventory, the physical location can be updated for Tag 3, and a group can be assigned. As shown by a fourth row, the operational status of Tag 4 is "OK", the physical location is logged as "Location 4", and Tag 3 is currently assigned to Group 1 and Group 3. As shown by a last row, the operational status of Tag N is "OK", the physical location is logged as "Location 4", and Tag 3 is currently assigned to Group 1 and Group 3.

As will be appreciated by the above described data-structure examples, tags may be accessible by different locators while being assigned to the same groups. In such a situation it may be advantageous to change group assignments so that tags that are commonly accessible by a locator are clustered together in the same group. Moreover, an optimization algorithm can be utilized to collate the various possible groups and tags into an optimal set of group assignments so that efficient scanning of the inventory can be done with an appropriate set of locators that is different for each group. It should be noted that the above data-structures are merely illustrative examples and many other comparable data-structures are contemplated as a reasonable substitution. The data-structures can also be stored in a central database that is accessed by the central processing unit, or by external computer systems. Also, in some example inventory schemes a history file can be time stamped to indicate dates and times that the inventory/status change occurred.

Although the preceding description describes various embodiments of the described systems, apparatuses and methods, the invention is not limited to such embodiments, but rather covers all modifications, alternatives, and equivalents that fall within the spirit and scope of the invention. For example, the positioning of the various components may be varied, the functions of multiple components can be combined or divided, individual components may be separated into different components, or components can be substituted as understood in the art. Since many embodiments of the invention can be made without departing from the spirit and scope of the invention, the invention is not limited except as by the appended claims.

What is claimed is:

1. A system for detecting intrusion of a cargo container, wherein the cargo container is an enclosed container includes walls, a roof, a floor, and a door, the cargo container sensor system comprising:
    a first cargo container tag that is affixed to the cargo container at a first position, the first cargo container tag comprising:
        a first pair of antennas
        a first radio subsystem block, wherein the first antenna pair of antennas and the first radio subsystem block are arranged in cooperation with one another to facilitate communications; and
        a first data log block that is arranged to capture data associated with the first tag; and
    a second cargo container tag that is affixed to the cargo container at a second position, the second cargo container tag comprising:
        a second pair of antennas;
        a second radio subsystem block, wherein the second pair of antennas and the second radio subsystem block are arranged in cooperation with one another to facilitate communications, wherein the first radio subsystem block and the second radio subsystem block are arranged to selectively communicate with one another to detect intrusion of the cargo container based on the selective communication.

2. The system of claim 1, where the first position and the second position each correspond to different locations along the same wall of the cargo container.

3. The system of claim 1, where the first position corresponds to a first wall of the cargo container, and the second position corresponds to a second wall of the cargo container, wherein the first wall and the second wall are different from one another.

4. The system of claim 1, where the first position corresponds to the door of the cargo container, and the second position corresponds to a wall of the cargo container, wherein the first position and the second position change relative to one another when the door to the cargo container is opened or closed.

5. The system of claim 4, wherein a timestamp is logged by at least one of the first cargo container tag and the second cargo container tag when the status of the door changes from closed to open.

6. The system of claim 4, wherein a timestamp is logged by at least one of the first cargo container tag and the second cargo container tag when the status of the door changes from open to closed.

7. The system of claim 1, wherein the first pair of antennas from the first cargo container tag includes a first antenna that is arranged to facilitate communications outside of the cargo container and a second antenna that is arranged to facilitate communications inside of the cargo container.

8. The system of claim 7, wherein the second cargo container tag is configured to detect signals transmitted from both the first antenna and the second antenna of the first cargo container tag, wherein the magnitudes of the transmitted signals from the antenna and the second antenna are evaluated by the second cargo container tag to determine when the door of the cargo container is open.

9. The system of claim 7, wherein the second cargo container tag is configured to detect signals transmitted from both the first antenna and the second antenna of the first cargo container tag, wherein the magnitudes of the transmitted signals from the antenna and the second antenna are evaluated by the second cargo container tag to determine when the cargo container is lifted from the ground.

10. The system of claim 1, each cargo container tag further comprising a compass sensor, wherein each compass sensor is arranged to detect modulations in the magnetic field observed at the respective cargo container tag.

11. The system of claim 10, wherein the magnetic fields detected by one or more of the compass sensors are different when the door is open and the door is closed.

12. The system of claim 1, each cargo container tag further comprising an environmental sensor configured to detect a potentially hazardous condition for the cargo container.

13. The system of claim 12, wherein the environmental sensor comprises one or more of a temperature sensor, a humidity sensor, a fire sensor, and a dewpoint sensor.

14. The system of claim 12, wherein the environmental sensor is a temperature sensor and the potentially hazardous condition comprises one or more of: a temperature above a high-temperature threshold, a temperature below a low-temperature threshold, and a fire detected.

15. The system of claim 12, wherein the environmental sensor is a humidity sensor and the potentially hazardous condition comprises one or more of a humidity below a low-humidity threshold and humidity above a high-humidity threshold.

16. The system of claim 1, wherein the first cargo container tag is further arranged to transmit a transmission to the second cargo container tag with the first radio subsystem, receive a reply transmission from the second cargo container tag with the first radio subsystem, determine a distance between the first cargo container tag and the second cargo container tag based on the round-trip time-of-flight between the transmission and the receipt of the reply transmission, and log the determined distance with the first data log block.

17. The system of claim 16, the base station further comprising a satellite navigation system that is arranged to collaborate with the processing block to determine the absolute location of the cargo container.

18. The system of claim 16, wherein the communication signal transmitted from the base station consists of a sequence of encoded transmissions that are encoded with an ID code for one of the cargo container tags, where each sequence is arranged to provide a portion of clock synchronization and calibration information such that the radio subsystem in the corresponding cargo container tag validates the ID code and decodes information from the transmission.

19. The system of claim 16, wherein the satellite navigation system comprises one of a GPS system, a Glonass system, or a Galileo system.

20. The system of claim 16, wherein each cargo container tag is arranged to measure a distance to the other cargo container tags in the cargo container, log the distance measurements, and report the distance measurements to the base station upon request.

21. The system of claim 20, wherein the distance measurements are collectively evaluated by the base station to identify a set of geographically arranged overlapping circles that include a common point that corresponds to the location of the particular cargo container.

22. The system of claim 20, wherein the distance measurements for each cargo container tag are collected by the base station and stored in an inventory database.

23. The system of claim 20, further comprising a database server that is arranged to manage the inventory database and facilitate communications between the inventory database and an internet protocol (IP) network connection for external monitoring of the inventory system.

24. The system of claim 1, further comprising a base station that comprises:
a third antenna;
a third radio subsystem block, wherein the third antenna and the third radio subsystem block are arranged in cooperation with one another to facilitate communications; and
a processing block that is arranged to coordinate communications between the base station and each of the cargo container tags such that the base station transits a signal to one or more of the cargo container tags, receive reply transmissions from one or more of the cargo container tags, determine a distance between the base station and each cargo container tag based on the round-trip time-of-flight between the transmission and the receipt of each reply transmission.

25. The system of claim 1, wherein the received reply transmission from one or more of the cargo container tags includes data logged by a respective one of the first data log block and the second data log block.

26. The system of claim 1, wherein the received reply transmission from one or more of the cargo container tags includes data logged by a respective one of the first data log block and the second data log block.

27. The system of claim 16, wherein each cargo container tag is arranged to measure specified conditions in the cargo container, log the specified conditions, and report the specified conditions to the base station upon request.

28. The system of claim 27, wherein the specified conditions for each cargo container tag are collected by the base station and stored in an inventory database.

29. The system of claim 28, wherein the base station is further arranged to transmit an internet protocol (IP) message when any of the specified conditions reported by the cargo container indicates intrusion, tampering, or motion within the cargo container.

30. The system of claim 29, wherein the transmitted internet protocol message corresponds to one or more of an SMS message, an email message, and a voice message.

31. The system of claim 16, wherein the specified conditions include one or more of: an environmental condition of the cargo container, a door opening in the cargo container, a door closing in the cargo container, a lifting of the cargo container, a setting down of the cargo container, a hole being cut into the cargo container, motion inside the cargo container, light inside the cargo container, or a mechanical shock of the cargo container.

32. The system of claim 16, wherein the second cargo container tag is arranged to relay communications between the base station and the first cargo container tag.

33. The system of claim 16, wherein the base station device is arranged for communication with an external computing device over an internet protocol (IP) network, wherein a location search request is initiated by the external computing device, processed by the base station, and reported back to the external computing device via the internet protocol (IP) network.

34. The system of claim 1, wherein the first cargo container tag and the second cargo container tag are configured to analyze the contents of the cargo container in a cargo container analysis mode, wherein the first cargo container tag is configured to transmit a first packet in the cargo container analysis mode, and wherein the second cargo container tag is configured to capture radio signals in the radio signal spectrum corresponding to the first packet in the cargo container analysis mode, normalize the captured radio signals corresponding to the first packet to remove carrier phase rotation and amplitude variation, identify a signature with a complex correlation of the normalized captured radio signals of the first packet, and store the identified signature for the first packet as a baseline signature indicating contents of the cargo container for future comparison.

35. The system of claim 34, wherein the first cargo container tag is further arranged to transmit a second packet subsequent to the first packet in the cargo container analysis mode, and wherein the second cargo container tag is further arranged to capture radio signals in the radio signal spectrum corresponding to the second packet in the cargo analysis mode, normalize the captured radio signals corresponding to the second packet to remove carrier phase rotation and amplitude variation, identify a signature with a complex correlation of the normalized captured radio signals of the second packet, and compare the identified signature for the second packet to the baseline signature to determine a change in the contents of the cargo container.

36. The system of claim 34, wherein a communication protocol used for transmitting packets between the first cargo container tag and the second cargo container tag in the cargo container analysis mode corresponds to one of a half-ping protocol, a full-ping protocol, an external ping protocol, and a Doppler ping protocol.

37. The system of claim 1, wherein the first cargo container tag and the second cargo container tag are configured to analyze the contents of the cargo container in a cargo container analysis mode, wherein the first cargo container tag is configured to:
transmit an initial packet in the cargo container analysis mode at a first time,
capture radio signals in the radio signal spectrum corresponding to a subsequent packet in the cargo container analysis mode at a second time that is subsequent to the first time,
determine a distance measurement from the time difference between the first time and the second time when the captured radio signals correspond to a valid measurement, and wherein the second cargo container tag is further configured to:
capture radio signals in the radio signal spectrum corresponding to the first packet in the cargo container analysis mode,
adjust timing and phase of a digitally synthesized carrier frequency based on the captured radio signals from the first packet, and
transmit the subsequent packet in the cargo container analysis mode at the second time with the digitally synthesized carrier frequency as adjusted.

38. The system of claim 37, further comprising a base station that is configured to communicate with each cargo container tag to download the stored Doppler shift measurements, time stamps, and corresponding compass readings to determine a path of travel for the cargo container.

39. The system of claim 1, wherein the first cargo container tag and the second cargo container tag are configured to analyze Doppler measurements in a breadcrumb mode, wherein each cargo container tag is configured to:
transmit an initial packet during a first time interval with an external one of the pair of antennas in the breadcrumb mode when the cargo container is stationary;
capture radio signals from the radio signal spectrum during the first time interval, wherein the captured radio signals are associated with a baseline signature for the cargo container;
store the baseline signature for the cargo container with a first time stamp and a first compass reading;
periodically transmit a subsequent packet with the external one of the pair of antennas during second time intervals that are subsequent to the first time interval;
periodically capture radio signals with the external one of the pair of antennas from the radio signal spectrum during the second time intervals, wherein the capture radio signals include one or more of signals corresponding to packets transmitted from the other cargo container tag and a distribution of Doppler shifted signals corresponding to scattered signals resulting from packets transmitted from the other cargo container tag;
evaluate each periodically captured radio signals to identify a distribution of Doppler shift measurements; and
storing each distribution of Doppler shift measurements for the evaluated cargo container with a corresponding time stamp and corresponding compass reading.

40. A method for a base station to track locations and intrusions of cargo containers that are each associated with one or more cargo container tags, the method for the base station comprising:
selecting each cargo containers tag for interrogation, wherein each cargo container tag is associated with a unique identifier;
sending a transmission from the base station to the selected cargo container tag, wherein the transmission is encoded with the unique identifier for the selected cargo container tag;
capturing radio signals from a radio signal spectrum associated with an expected reply from the selected cargo container tag;
evaluating the captured radio signals from the radio signal spectrum to determine if a valid reply transmission was received from the selected cargo container tag;
determining a distance and a direction of the selected cargo container tag relative to the base station when the valid reply transmission is received based on the round-trip time-of-flight between the transmission and the received reply; and logging the distance and direction of the selected cargo container tag in a database.

41. The method of claim 40, further comprising, identifying an absolute position of the base station, determining a precise location of the selected cargo container tag based on the absolute position of the base station and the distance and direction of the selected cargo container relative to the base station, and logging the precise location of the selected cargo container tag in the database.

42. The method of claim 40, further comprising extracting additional data from the received reply message for the selected cargo container tag.

43. The method of claim 40, wherein the additional data corresponds to data for logging in the database.

44. The method of claim 40, wherein the additional data corresponds to an alarm conditions for the selected cargo container tag.

45. The method of claim 44, wherein the alarm condition corresponds to one or more of door open, fire detected, temperature exceeded high-temperature threshold, temperature below low-temperature threshold, water detected in the cargo container, humidity greater than threshold or humidity below threshold.

46. The method of claim 40, wherein the data is associated with either an environmental condition of the cargo container or an intrusion status associated with the cargo container.

47. A method for a cargo container tag to monitor conditions associated with a cargo container and communicate at least some monitored conditions to a base station, the method for the cargo container tag comprising:

periodically activating the cargo container tag from a low power state to an active state, wherein the cargo container tag is assigned to a unique identifier that is internally stored in the cargo container tag;

during the active state:

monitoring a condition associated with the cargo container;

logging the monitored condition;

capturing radio signals in a radio signal spectrum associated with an expected transmission from the base station;

evaluating the captured radio signals to determine if a valid transmission is received for the cargo container tag, wherein the valid transmission is encoded with the unique identifier for the cargo container tag;

when the valid transmission is not received, returning to the low power mode;

when the valid transmission is received:

detecting a carrier phase for the valid transmission to identify a detected carrier phase;

comparing the detected carrier phase to a digitally synthesized carrier signal of the cargo container tag to identify a difference;

adjusting one or more of the carrier phase, carrier frequency and cadence of the digitally synthesized carrier signal in the cargo container tag based on the identified difference;

evaluating the received signals to determine if a valid command is received in the transmission;

processing the valid command when received in the transmission;

transmitting a reply transmission to the base station using the digitally synthesized carrier signal; and returning to the low power state after the reply transmission is completed.

48. The method of claim 47, wherein processing the valid command comprises determining if a change mode command has been received in the transmission, and selecting a new mode for operation based on parameters received for the change mode command.

49. The method of claim 47, wherein processing the valid command comprises determining if a record signature command has been received in the transmission, and storing a signal profile from a prior capture as a signature for subsequent use.

50. The method of claim 49, wherein the signature is associated with one of an door open signature, a door closed signature, a cargo container is elevated above ground signature, a cargo container is on the ground signature, or a cargo container is on a railroad car signature.

51. The method of claim 47, wherein processing the valid command comprises determining if a report data command has been received in the transmission, identifying requested data from the report data command, and encoding the requested data in the reply transmission.

52. The method of claim 47, wherein processing the valid command comprises enabling an anti-theft mode for the cargo container tag when the command indicates to activate the anti-theft mode.

53. The method of claim 47, wherein processing the valid command comprises disabling the anti-theft mode for the cargo container tag when the command indicates to deactivate the anti-theft mode.

54. The method of claim 47, further comprising processing an anti-theft mode for the cargo container tag according to an anti-theft mode process when no valid command is found and the anti-theft mode is active.

55. The method of claim 54, the anti-theft mode process for the cargo container tag comprising evaluating sensory data for the cargo container to generate report data, encoding the report data in a transmission for a paired cargo container tag, and transmitting the report data command to the paired cargo container tag in a transmission.

56. The method of claim 55, the anti-theft mode process for the cargo container tag further comprising capturing radio signals from the radio signal spectrum at a time interval where a reply from the paired cargo container tag is expected, evaluating the captured radio signals from the radio signal spectrum, and determining if a valid reply transmission is detected in the captured radio signals.

57. The method of claim 56, the anti-theft mode process for the cargo container tag further comprising calculating a distance between the cargo container tag and the paired cargo container tag to provide a distance measurement based on the round-trip time of flight between the transmission to the paired cargo container tag and the received reply transmission from the paired cargo container tag, and logging the distance measurement.

58. The method of claim 56, the anti-theft mode process for the cargo container tag further comprising evaluating the valid reply transmission to identify signatures, evaluating the identified signatures to detect events or conditions, and logging one or more of the identified signatures, detected events, or detected conditions.

59. The method of claim 55, the anti-theft mode process for the cargo container tag further comprising detecting a compromised status of the cargo container and reporting the compromised status of the cargo container back to the base station at a next communication.

60. An inventory management system that is arranged for monitoring cargo containers in a predefined area, the system comprising:
- a central processing unit that is arranged to process communications received from base station devices over a communication network;
- a plurality of base station devices that are each arranged at different locations within the predefined area, wherein each of the plurality of base station devices is arranged for communicating with the central processing unit over the communication network, and also for communicating with cargo container tags located within the predefined area,
  - wherein a selected one of the base station devices is configured to encode a transmission sequence with a cargo container tag identifier, and
    - transmit the encoded transmission sequence in a first wireless broadcast; and
  - wherein each of the plurality of locators is configured to receive one or more reply transmission sequences after transmission of wireless broadcast is initiated,
    - correlate each received reply transmission sequence with the cargo container tag identifier to generate a correlation vector for each received transmission sequence,
    - extract information associated with a cargo container from the received reply transmission sequence, wherein the information includes one or more of an environmental condition of the cargo container,
    - determine a time of arrival for each corresponding correlation vector, and
    - forward each time of arrival, corresponding correlation vector, and any extracted information to the central processing unit for processing;
- a first cargo container tag that is arranged to receive the wireless transmission sequence, wherein the cargo container tag is associated with a cargo container that is positioned within the predefined area, and arranged to:
  - receive and capture information from at least a portion of the wireless broadcast;
  - correlate the captured information with an internally stored reference sequence, wherein the internally stored reference sequence is associated with a designated group;
  - identify a correlation when the received and captured information correlates with the internally stored reference sequence;
  - monitor a condition associated with the cargo container;
  - encode a reply sequence with a cargo container identifier and the monitored condition after a correlation is identified;
  - determine a precise time interval for transmitting the encoded reply sequence after the correlation is identified; and
  - transmit the encoded reply sequence in a second wireless broadcast, wherein the transmission of the encoded reply sequence is transmitted at the precisely determined time interval to avoid transmission collisions; and
- a second cargo container tag is also associated with the cargo container that is positioned within the predefined area, wherein the second cargo container tag is arranged to monitor a condition within the cargo container, and wherein the second cargo container tag is arranged in communications with the first cargo container tag to communicate the monitored condition.

61. The system of claim 60, wherein the central processing unit is further arranged to time synchronize observations associated with the correlation vectors received from the plurality of base stations.

62. The system of claim 60, wherein the central processing unit is further arranged to perform a best fit location estimate for each responding base station based on the correlation vectors and time of arrivals from each of the plurality of locators associated with the corresponding responding transponder.

63. The system of claim 60, wherein the central processing unit is further arranged to activate an alert for a cargo container when the extracted information from one or more base stations indicates one or more of an unauthorized breach of the cargo container, an unauthorized movement of the cargo container, an unauthorized movement within the cargo container, and an impermissible environmental condition for the cargo container.

64. The system of claim 60, wherein the monitored condition for the cargo container comprises one or more of temperature, humidity, and movement.

65. The system of claim 60, wherein the central processing unit is arranged for interfacing with an external computer system for processing user initiated requests.

66. The system of claim 60, wherein the one or more of first cargo container tag and the second cargo container tag is configured to determine if an electronic seal in the cargo container has been breached.

67. The system of claim 60, wherein the one or more of first cargo container tag and the second cargo container tag includes a motion sensor.

68. The system of claim 60, wherein the one or more of first cargo container tag and the second cargo container tag includes a temperature sensor.

69. The system of claim 60, wherein the one or more of first cargo container tag and the second cargo container tag includes a humidity sensor.

70. The system of claim 60, wherein the one or more of first cargo container tag and the second cargo container tag includes a compass sensor.

71. The system of claim 70, wherein readings from the compass sensor of each cargo container tag are periodically logged along with a timestamp when a tracking mode is enabled for the respective cargo container tags so that a path of travel for the cargo container tag is approximately recorded.

72. The system of claim 70, wherein Doppler shifts readings between active cargo container tags are periodically logged along with the compass sensor readings and the timestamps for the respective cargo container tags.

73. The system of claim 60, wherein the one or more of first cargo container tag and the second cargo container tag includes a light sensor.

* * * * *